United States Patent
Roehm et al.

(10) Patent No.: US 12,545,873 B2
(45) Date of Patent: Feb. 10, 2026

(54) SELF-ENCLOSED BIOREACTOR FOR VASCULARIZED TISSUE CONSTRUCTS

(71) Applicant: CFD RESEARCH CORPORATION, Huntsville, AL (US)

(72) Inventors: Kevin Daniel Roehm, Huntsville, AL (US); Carrie Lynn German, Huntsville, AL (US); Balabhaskar Prabhakarpandian, Madison, AL (US); Wesley David Grove, Huntsville, AL (US)

(73) Assignee: CFD RESEARCH CORPORATION, Huntsville, AL (US)

(*) Notice: Subject to any disclaimer, the term of this patent is extended or adjusted under 35 U.S.C. 154(b) by 900 days.

(21) Appl. No.: 17/732,239

(22) Filed: Apr. 28, 2022

(65) Prior Publication Data
US 2023/0348830 A1    Nov. 2, 2023

(51) Int. Cl.
- C12M 1/00 (2006.01)
- C12M 3/00 (2006.01)
- C12N 5/00 (2006.01)

(52) U.S. Cl.
CPC ............ C12M 21/08 (2013.01); C12M 23/30 (2013.01); C12N 5/0018 (2013.01); C12N 5/0062 (2013.01); C12N 5/0068 (2013.01); C12M 23/40 (2013.01); C12M 27/18 (2013.01); C12N 2533/90 (2013.01)

(58) Field of Classification Search
CPC .............................. C12M 25/14; C12M 29/10
See application file for complete search history.

(56) References Cited

U.S. PATENT DOCUMENTS

| | | |
|---|---|---|
| 9,023,642 B2 | 5/2015 | Kleis et al. |
| 9,758,762 B2 | 9/2017 | Meiron et al. |
| 9,783,768 B2 | 10/2017 | Larcher et al. |
| 9,902,929 B2 | 2/2018 | Wu |
| 10,214,714 B2 | 2/2019 | Maria de Peppo |
| 10,214,718 B2 | 2/2019 | Berteau et al. |

(Continued)

OTHER PUBLICATIONS

H. Wobma, G. Vunjak-Novakovic; "Tissue Engineering and Regenerative Medicine 2015: A Year in Review"; Tissue Engineering—Part B: Reviews; Apr. 2016; vol. 22(2); pp. 101-113; https://doi.org/10.1089/ten.teb.2015.0535; Epub Feb. 23, 2016; PMID: 26714410; PMCID: PMC4817587.

(Continued)

Primary Examiner — Nathan A Bowers
(74) Attorney, Agent, or Firm — MASCHOFF BRENNAN

(57) ABSTRACT

A bioreactor can include: a tissue culture chamber; at least one inlet port into the tissue culture chamber; an inlet port member located in each inlet including an inlet tube extending into the tissue culture chamber; at least one outlet port into the tissue culture chamber; an outlet port member located in each outlet including an outlet tube extending into the tissue culture chamber; an optical cover; and a hydrogel can be located in the tissue culture chamber having at least one lumen fluidly coupling the inlet tube to the outlet tube, wherein an inlet interface region of the hydrogel is constrained around the inlet tube and an outlet interface region of the hydrogel is constrained around the outlet tube.

30 Claims, 38 Drawing Sheets
(12 of 38 Drawing Sheet(s) Filed in Color)

(56) References Cited

U.S. PATENT DOCUMENTS

| | | | |
|---|---|---|---|
| 2008/0261306 A1* | 10/2008 | Neumann | A61L 27/3808 |
| | | | 435/395 |
| 2008/0311650 A1* | 12/2008 | Jakob | C12M 25/14 |
| | | | 435/395 |
| 2013/0143230 A1* | 6/2013 | Tolias | C12Q 1/025 |
| | | | 435/7.1 |
| 2013/0344531 A1* | 12/2013 | Akra | C12M 21/08 |
| | | | 435/29 |
| 2015/0212071 A1 | 7/2015 | Berry et al. | |
| 2016/0130543 A1* | 5/2016 | Daniele | C12M 29/10 |
| | | | 264/41 |
| 2017/0096627 A1 | 4/2017 | Smith et al. | |
| 2018/0030409 A1 | 2/2018 | Lewis et al. | |
| 2018/0066220 A1* | 3/2018 | Nath | C12M 33/12 |
| 2019/0022283 A1 | 1/2019 | Lewis et al. | |
| 2019/0225925 A1 | 7/2019 | Vunjak-Novakovic et al. | |
| 2020/0088719 A1 | 3/2020 | Gevaert et al. | |
| 2020/0181556 A1 | 6/2020 | Eberth et al. | |
| 2020/0332242 A1 | 10/2020 | Russell | |
| 2024/0026260 A1* | 1/2024 | Takeuchi | C12N 5/06 |

OTHER PUBLICATIONS

I. Sukmana; "Microvascular guidance: A challenge to support the development of vascularised tissue engineering construct"; The Scientific World Journal; Apr. 2012; vol. 2012(5110); https://doi.org/10.1100/2012/201352.

M. Lovett, K. Lee, A. Edwards, D.L. Kaplan; "Vascularization strategies for tissue engineering"; Tissue Engineering - Part B: Reviews; vol. 15(3); Jul. 2009; pp. 353-370; https://doi.org/10.1089/ten.teb.2009.0085.

D.B. Kolesky, K.A. Homan, M.A. Skylar-Scott, J.A. Lewis; "Three-dimensional bioprinting of thick vascularized tissues"; Proceedings of the National Academy of Sciences of the U.S.A; Mar. 22, 2016; 113(12); pp. 3179-3184; https://doi.org/10.1073/pnas.1521342113; Epub Mar. 7, 2016; PMID: 26951646; PMCID: PMC4812707.

B. Grigoryan, S.J. Paulsen, D.C. Corbett, D.W. Sazer, C.L. Fortin, A.J. Zaita, P.T. Greenfield, N.J. Calafat, J.P. Gounley, A.H. Ta, F. Johansson, A. Randles, J.E. Rosenkrantz, J.D. Louis-Rosenberg, P.A. Galie, K.R. Stevens, J.S. Miller; "Multivascular networks and functional intravascular topologies within biocompatible hydrogels"; Science. May 3, 2019; 364(6439); pp. 458-464; https://doi.org/10.1126/science.aav9750; PMID: 31048486; PMCID: PMC7769170.

D.B. Kolesky, R.L. Truby, A.S. Gladman, T.A. Busbee, K.A. Homan, J.A. Lewis; "3D bioprinting of vascularized, heterogeneous cell-laden tissue constructs"; Advanced Materials; May 21, 2014; vol. 26(19); pp. 3124-3130; https://doi.org/10.1002/adma.201305506; Epub Feb. 18, 2014; PMID 24550124.

J.S. Miller, K.R. Stevens, M.T. Yang, B.M. Baker, D.H.T. Nguyen, D.M. Cohen, E. Toro, A.A. Chen, P.A. Galie, X. Yu, R. Chaturvedi, S.N. Bhatia, C.S. Chen; "Rapid casting of patterned vascular networks for perfusable engineered three-dimensional tissues"; Nature Materials. vol. 11; Jul. 1, 2012; pp. 768-774; https://doi.org/10.1038/nmat3357.

M.A. Skylar-Scott, S.G.M. Uzel, L.L. Nam, J.H. Ahrens, R.L. Truby, S. Damaraju, J.A. Lewis; "Biomanufacturing of organ-specific tissues with high cellular density and embedded vascular channels"; Science Advances. Sep. 6, 2019; vol. 5(9); eaaw2459; https://doi.org/10.1126/sciadv.aaw2459; PMID: 31523707; PMCID: PMC6731072.

R.H. Wenger, V. Kurtcuoglu, C.C. Scholz, H.H. Marti, D. Hoogewijs; "Frequently asked questions in hypoxia research"; Hypoxia (Auckl). Sep. 18, 2015; vol. 3(35-43); https://doi.org/10.2147/HP.S92198; PMID: 27774480; PMCID: PMC5045069.

C.A. V Rodrigues, T.G. Fernandes, M.M. Diogo, C. Lobato Da Silva, J.M.S. Cabral; "Stem cell cultivation in bioreactors"; Biotechnology Advances; Nov.-Dec. 2011; vol. 29(6); pp. 815-829; https://doi.org/10.1016/j.biotechadv.2011.06.009; EPUB Jun. 25, 2011; PMID: 21726624.

J.A. King, W.M. Miller; "Bioreactor Development for Stem Cell Expansion and Controlled Differentiation"; Current Opinion in Chemical Biology; Aug. 11, 2007; vol. 4; pp. 394-398; https://doi.org/10.1016/J.CBPA.2007.05.034; EPUB Jul. 25, 2007; PMID 17656148; PMCID: PMC2038982.

K.M. Panchalingam, S. Jung, L. Rosenberg, L.A. Behie; "Bioprocessing strategies for the large-scale production of human mesenchymal stem cells: a review"; Stem Cell Research & Therapy; Nov. 23, 2015; vol. 6:(225) pp. 1-10; https://doi.org/10.1186/S13287-015-0228-5.

M.J. Powers, K. Domansky, M.R. Kaazempur-Mofrad, A. Kalezi, A. Capitano, A. Upadhyaya, p. Kurzawski, K.E. Wack, D.B. Stolz, R. Kamm, L.G. Grifith; "A Microfabricated Array Bioreactor for Perfused 3D Liver Culture"; Biotechnol Bioeng; May 5, 2002; vol. 78(3); pp. 257-269; https://doi.org/10.1002/bit.10143; PMID:11920442.

Egger D, Spitz S, Fischer M, Handschuh S, Glösmann M, Friemert B, Egerbacher M, Kasper C.; "Application of a Parallelizable Perfusion Bioreactor for Physiologic 3D Cell Culture"; Cells Tissues Organs; 2017; vol. 203(5): pp. 316-326; doi: 10.1159/000457792; Epub Mar. 15, 2017; PMID: 28291964.

S.M. Warren, A.M. Sailon, A.C. Allori, E.H. Davidson, D.D. Reformat, R.J. Allen; "A novel flow-perfusion bioreactor supports 3D dynamic cell culture"; Journal of Biomedicine and Biotechnology; vol. 2009; Dec. 9, 2009; https://doi.org/10.1155/2009/873816.

C.L. German, S. V. Madihally; "Applications of Computational Modelling and Simulation of Porous Medium in Tissue Engineering"; Computation; vol. 4(1); p. 7; Feb. 6, 2016; https://doi.org/10.3390/COMPUTATION4010007.

C.C. Michel; "Starling: the formulation of his hypothesis of microvascular fluid exchange and its significance after 100 years"; Experimental Physiology; Translation and Integration. vol. 82(1) Jan. 1997; pp. 1-30; doi: 10.1113/expphysiol.1997.sp004000; PMID: 9023503.

R. McMurtrey; Analytic models of oxygen and nutrient diffusion, metabolism dynamics, and architecture optimization in three-dimensional tissue constructs with applications and Insights in Cerebral Organoids; .-Tissue Eng Part C Methods; Mar. 2016; vol. 22(3); pp. 221-249; https://doi.org/10.1089/ten.tec.2015.0375.

C. Wang, H. Lu, M.A, Schwartz; "A novel in vitro flow system for changing flow direction on endothelial cells"; Journal of Biomechanics,; vol. 45(7); 2012; pp. 1212-1218; https://doi.org/10.1016/j.jbiomech.2012.01.045.

P.M. Hinderliter, K.R. Minard, G. Orr, W.B. Chrisler, B.D. Thrall, J.G. Pounds, J.G. Teeguarden; "ISDD: A computational model of particle sedimentation, diffusion and target cell dosimetry for in vitro toxicity studies"; Particle and Fibre Toxicology; 7; Nov. 30, 2010; https://doi.org/10.1186/1743-8977-7-36.

S. Pradhan, I. Hassani, I, Seeto WJ, Lipke EA; "PEG-fibrinogen hydrogels for three-dimensional breast cancer cell culture"; Whitepaper; Wiley Online Library; published Oct. 14, 2016; 17 pages; DOI:10.1002/jbm.a.35899.

M. Radisic, J. Malda, E. Epping, W. Geng, R. Langer, G. Vunjak-Novakovic; "Oxygen Gradients Correlate with Cell Density and Cell Viability in Engineered Cardiac Tissue"; Whitepaper; Willey InterScience; published Nov. 3, 2005; 12 pages; DOI: 10.1002/bit.20722.

K. Sekine, Y. Kagawa, E. Maeyama, H. Ota, Y. Haraguchi, K. Matsuura, T. Shimizu; "Oxygen consumption of human heart cells in monolayer culture"; Biochemical and Biophysical Research Communications; 452(3); Sep. 26, 2014; pp. 834-839; https://doi.org/10.1016/j.bbrc.2014.09.018.

C. Magliaro, G. Mattei, F. Iacoangeli, A. Corti, V. Piemonte, A. Ahluwalia; "Oxygen Consumption Characteristics in 3D Constructs Depend on Cell Density"; Frontiers in Bioengineering and Biotechnology; vol. 7, Issue 251; Oct. 10, 2019; https://doi.org/10.3389/fbioe.2019.00251.

M.K. Gelber, G. Hurst, T.J. Comi, R. Bhargava; Model-guided design and characterization of a high-precision 3D printing process for carbohydrate glass:; Additive Manufacturing; vol. 22; Aug. 2018; pp. 38-50. https://doi.org/10.1016/j.addma.2018.04.026.

M.K. Gelber, R. Bhargava; "Monolithic multilayer microfluidics via sacrificial molding of 3D-printed isomalt"; Lab on a Chip; vol. 15, Issue 7; Apr. 7, 2015; pp. 1736-1741.

(56) References Cited

OTHER PUBLICATIONS

Kevin D. Roehm, Sundararajan V. Madihally; "Bioprinted chitosan-gelatin thermosensitive hydrogels using an inexpensive 3D printer"; Biofabrication; Nov. 30, 2017; 10(1):015002.
A. Przekwas, T. Friend, R. Teixeira, Z. Chen, P. Wilkerson; "Spatial modeling tools for cell biology", Final Technical Report; Oct. 2006; located at: https://apps.dtic.mil/sti/citations/ADA460852; 115 pages.

* cited by examiner

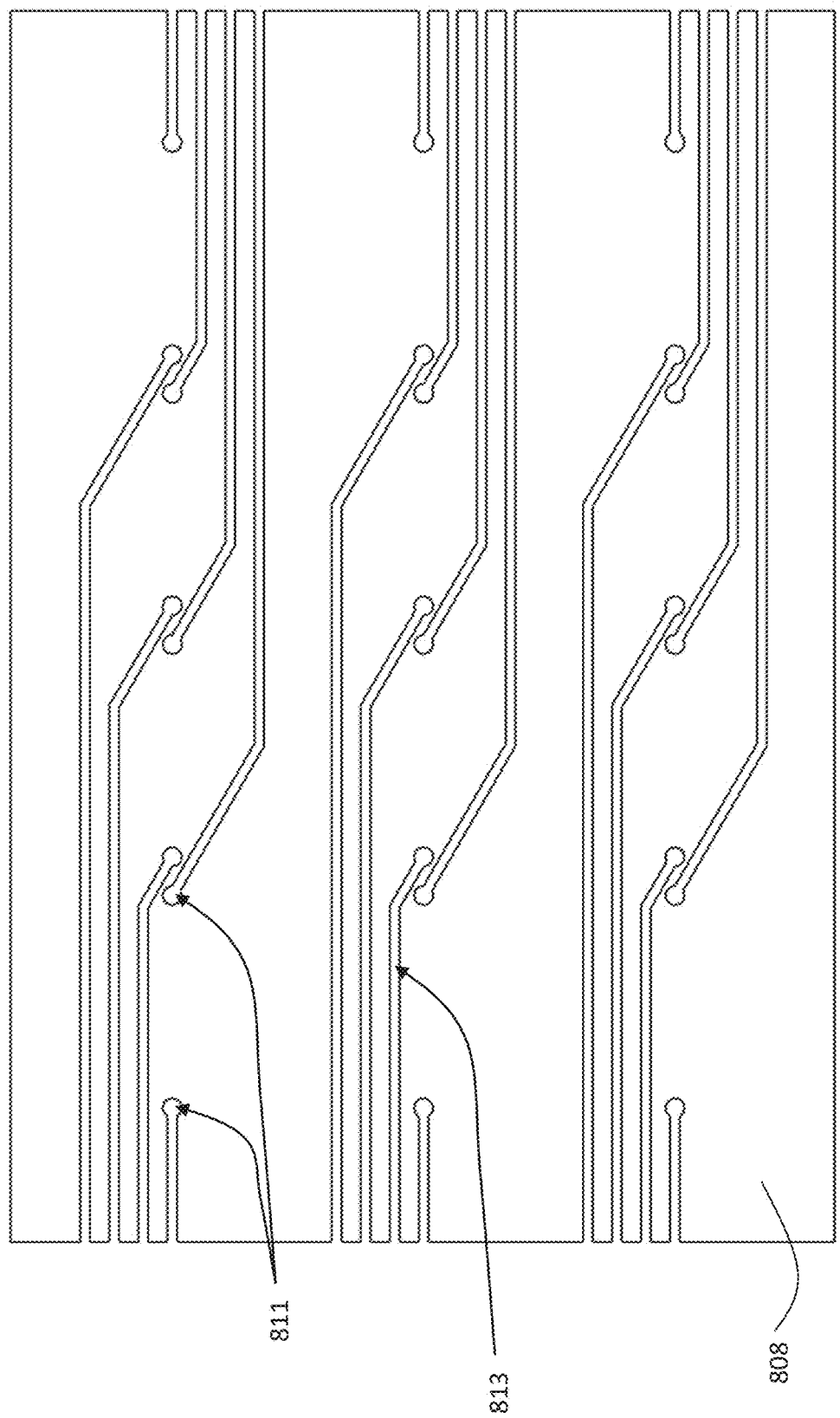

SELF-ENCLOSED BIOREACTOR FOR VASCULARIZED TISSUE CONSTRUCTS

U.S. GOVERNMENT RIGHTS

This invention was made with government support under W81XWH-17-C-0202 and W81XWH-19-C-0045 awarded by the United States Army. The government has certain rights in the invention.

BACKGROUND

Field

The present disclosure relates tissue culture devices that grow vascularized tissue constructs, and the design and use thereof.

Description of Related Art

Bioreactors have been in use for hundreds of years as culture vats for the production of food products including alcoholic beverages, cheese, and yogurt. More recently, bioreactors have garnered significant attention for the culture of mammalian cells. Bioreactors, especially those incorporating high surface area packing, are useful for culturing large numbers of human cells, especially stem cells [C. A. V Rodrigues et a., Stem cell cultivation in bioreactors, Biotechnol. Adv. 29 (2011) 815-829; J. A. King et al., Bioreactor Development for Stem Cell Expansion and Controlled Differentiation, Curr. Opin. Chem. Biol. 11 (2007) 394]. These reactors are typically well sealed and often utilize hermetic connections which can maintain sterility throughout the process and are commercially available. Without the use of a bioreactor, adherent and suspension cell culture takes place in batch flasks which have a flat base that permit a high surface area to volume ratio and a thin layer of liquid with significant head space for oxygen transfer. The simplest method for expanding cell culture is a multi-layered cell factory, which places a significant number of layers close to one another with a common feed. This takes up less space than traditional flasks without materially altering the procedure for growth. Some bioreactors further increase the surface area per volume available for culture of cells, such as roller bottles, hollow fiber reactors, packed bed reactors, and stirred suspension reactors, among others. Stirred suspension reactors are popular and can be used for both adherent and suspension cells with the former cultured on microcarriers, small beads to which cell can attach [K. M. Panchalingam et al., Bioprocessing strategies for the large-scale production of human mesenchymal stem cells: a review, Stem Cell Res. Ther. 2015 61. 6 (2015)]. These reactors are sealed, can be operated in either batch (no exchange of medium), semi-batch (intermitted exchange of medium), or continuous mode (continuous flow of medium) and incorporate computer control to maintain glucose levels, monitor waste products, and ensure the pH remains within defined limits. However, these reactors are purely focused on permitting cell division without creation of tissues.

Previously, there has been significant progress in the field of tissue engineering for repairing and restoring vessels, tissues and organ functions [H. Wobma et al., Tissue Engineering and Regenerative Medicine 2015: A Year in Review, Tissue Eng.—Part B Rev. 22 (2016) 101-113]. The lack of ability to vascularize thick tissue constructs has been a major limitation for tissue repair and regeneration. As a result, tissue engineering has been limited to tissues that are relatively thin (e.g., μm-mm) scale or avascular tissues, such as cartilage, skin or bladder [I. Sukmana, Microvascular guidance: A challenge to support the development of vascularized tissue engineering construct, Sci. World J. 2012 (2012)]. Two main problems that have hindered the development of vascularized tissues: (a) supply of nutrients and oxygens to cells and tissues beyond 100-200 μm; and (b) waste/metabolite removal. These problems can be attributed primarily to the fact that oxygen diffusion is slower than oxygen consumption and the mass transfer and transport rate of oxygen fail to overcome this deficit. These problems are especially critical for thick tissue constructs, such as those larger than 1 cm in thickness.

Accordingly, research into tissue construct vascularization strategies continues for thick tissue constructs for optimized oxygen and nutrient diffusion rates based on the overall construct size. Approaches to overcome the above-mentioned problems have ranged from development of scaffold functionalization to bioreactor designs [M. Lovett, et al., Vascularization strategies for tissue engineering, Tissue Eng.—Part B Rev. 15 (2009) 353-370] and to 3D printing techniques [D. B. Kolesky, et al, Three-dimensional bioprinting of thick vascularized tissues, Proc. Natl. Acad. Sci. U.S.A 113 (2016) 3179-3184]. However, these improvements are deficient in approximating or matching the body and have low in vivo relevance. As a result, there are still problems in tissue repair applications, drug testing and disease modeling scenarios.

Though scaffold free tissue engineering approaches exist, the culture of cells in scaffolds is a cornerstone of the field. Many early scaffolds resembled sponges and were formed by casting natural or synthetic polymers (e.g. casting a lipophilic material followed by freezing and lyophilization or casting in the presence of a solid porogen that is later removed, such as casting polymer dissolved in organic solvent with salt that is later soaked in water to remove the porogen). These methods can create general crosslinking and porosity to permit penetration of both cells and nutrients. However, these techniques are limited to hundreds of micrometers of thickness, and are insufficient for thick tissue constructs. The thickness limitation gave rise to an interest in generating flow channels as vascular mimetics. Creation of flow channels has been accomplished in numerous ways, from simple introduction of a shaft into a casting chamber to 3D printing vasculature directly [B. Grigoryan et al., Multivascular networks and functional intravascular topologies within biocompatible hydrogels, Science (80-). 364 (2019) 458-464] or through co-printing of soluble, sacrificial bioinks alongside permanent inks [M. Lovett (2009); D. B. Kolesky et al., 3D bioprinting of vascularized, heterogeneous cell-laden tissue constructs, Adv. Mater. 26 (2014) 3124-3130; J. S. Miller et al., Rapid casting of patterned vascular networks for perfusable engineered three-dimensional tissues, Nat. Mater. 11 (2012) 768-774].

Bioreactors often utilize one of these sponge-like tissue scaffolds with interconnected pores. The pores permit attachment of adherent cells and permit flow of medium through the scaffold's interconnected architecture. These bioreactors often incorporate diffuser plates to homogenize flow from inlet tubing across the tissue construct [M. Fischer et al., Application of a Parallelizable Perfusion Bioreactor for Physiologic 3D Cell Culture Related papers Development and Characterization of a Parallelizable Perfusion Bioreactor for 3D Cell Culture, (2017); S. M. Warren et al., A novel flow-perfusion bioreactor supports 3D dynamic cell culture, J. Biomed. Biotechnol. 2009 (2009)]. In some instances, the reactor and diffuser plate have been designed with the assistance of computational fluid dynamics [C. L. German, et al., Applications of Computational Modelling and Simulation of Porous Medium in Tissue Engineering, Comput. 2016, Vol. 4, Page 7. 4 (2016)]. In other instances, culture of vascularized hydrogels has been accomplished by an interface of needles penetrating into the hydrogel, which includes a jig-like guide for insertion of the needles which ensures they maintain a desired spatial position [Kolesky, D. B., Homan, K. A., Skylar-Scott, M. A., & Lewis, J. A. (2016). Three-dimensional bioprinting of thick vascularized tissues. Proceedings of the National Academy of Sciences of the United States of America, 113 (12), 3179-3184. doi.org/10.1073/pnas.1521342113]. However, these jigs lack the sealed architecture necessary for long term, sterile culture present in the previously described bioreactors.

Thus, there is a need for a functional, fully sealed bioreactor that can maintain vascularized constructs in culture for extended culture periods.

SUMMARY

In some embodiments, a tissue culture device can include a body, an inlet port, an inlet port member, an outlet port, an outlet port member, and an optical cover. The body can be shaped for defining a tissue culture chamber having a primary chamber cavity, an inlet cavity, and an outlet cavity. There can be at least one inlet port extending through the body into the inlet cavity of the tissue culture chamber. An inlet port member can be located in each inlet port, where each inlet port member can include an inlet tube extending into the inlet cavity. There can be at least one outlet port extending through the body into the outlet cavity of the tissue culture chamber. There can be an outlet port member that is located in each outlet port, where each outlet port member can include an outlet tube extending into the outlet cavity. There can be an optical cover coupled with the body to define a wall of the primary chamber cavity of the tissue culture chamber, wherein the optical cover is optically transmissive. In some aspects, the body includes an inlet shoulder containing the inlet cavity, an outlet shoulder containing the outlet cavity, each inlet port is through the inlet shoulder, and each outlet port is through the outlet shoulder. The optical cover can be shaped as a lid that is removably couplable with the body, such as when the lid is threadedly coupled with the body. The lid can include a viewing recess having a bottom wall being optically transmissive into the tissue culture chamber.

In some embodiments, a hydrogel can be located in the tissue culture chamber, inlet cavity, and outlet cavity, so as to be around the inlet tube and outlet tube. The inlet cavity can be configured to constrain the hydrogel around the inlet tube and the outlet cavity is configured to constrain the hydrogel around the outlet tube. The device can be configured so that there is a fluid tight seal at an interface of the hydrogel and the inlet tube and a fluid tight seal at an interface of the hydrogel and the outlet tube. In some aspects, there can be at least one lumen in the hydrogel that fluidly couples the inlet tube and the outlet tube together through the hydrogel.

In some embodiments, a bioreactor can include a body, an inlet port, an inlet port member, an outlet port, and outlet port member, an optical cover, and a hydrogel in a tissue culture chamber. The body can be shaped to define a tissue culture chamber that includes at least one inlet port through the body into the tissue culture chamber and at least one outlet port through the body into the tissue culture chamber. There can be an inlet port member located in each inlet port, where each inlet port member including an inlet tube extending into the tissue culture chamber. There can be an outlet port member located in each outlet port, where each outlet port member can include an outlet tube extending into the tissue culture chamber. The optical cover can be coupled with the body to define a wall of the primary chamber cavity of the tissue culture chamber, where the optical cover is optically transmissive to allow viewing into the tissue culture chamber. A hydrogel can be located in the tissue culture chamber having at least one lumen fluidly coupling the inlet tube to the outlet tube, wherein an inlet interface region of the hydrogel is constrained around the inlet tube and an outlet interface region of the hydrogel is constrained around the outlet tube. The tissue culture chamber can include a primary chamber cavity, an inlet cavity, and an outlet cavity. Each inlet port can extend through the body into the inlet cavity of the tissue culture chamber. Each inlet port member can include an inlet tube extending into the inlet cavity. Each outlet port can extend through the body into the outlet cavity of the tissue culture chamber. Each outlet port member can include an outlet tube extending into the outlet cavity. In some aspects, the body includes an inlet shoulder containing the inlet cavity and an outlet shoulder containing the outlet cavity, and each inlet port can be positioned through the inlet shoulder and each outlet port can be positioned through the outlet shoulder. In some aspects, the optical cover is shaped as a lid that is removably couplable with the body, and the lid can include a viewing recess having a bottom wall being optically transmissive into the tissue culture chamber. The configuration can provide a fluid tight seal at an interface of the hydrogel and the inlet tube and a fluid tight seal at an interface of the hydrogel and the outlet tube.

In some embodiments, the bioreactor can include cells in the hydrogel. In some aspects, the cells can be vascular endothelial cells on lumen walls of the lumen. In some aspects, the cells can be tissue cells within the hydrogel matrix. The tissue cells can be organ cells, which can be any organ. The organ cells in the hydrogel provide a tissue construct that simulates that organ. In some aspects, the cells are stem cells, red blood cells, white blood cells, platelet cells, epithelial cells, nerve cells, muscle cells, cartilage cells, bone cells, connective tissue cells, skin cells, endothelial cells, fat cells, sex cells, organ cells, or combinations thereof.

In some embodiments, the lumen in the hydrogel are designed to optimize oxygen and/or nutrient perfusion to the cells and removal of waste products from the cells. The lumen network having at least one lumen can be configured in diameter and spacing between adjacent lumen based on the organ, such as the function of the organ in oxygen uptake, oxygen consumption, nutrient uptake, nutrient consumption, and waste removal. The design can optimize the ability for oxygen and/or nutrients to diffuse from media in the at least one lumen to the organ cells in the hydrogel. The resulting hydrogel can have no dead cell spaces in the tissue construct, such that all of the cells are sufficiently oxygenated and nourished. As such, the hydrogel can be substantially devoid of dead cells or regions having dead cells.

In some embodiments, the bioreactor can include the hydrogel having at least one lumen that includes a sacrificial material therein. The sacrificial material can be removed prior to use of the lumen network in the hydrogel.

In some embodiments, a bioreactor system can be provided. The bioreactor system can include the bioreactor of one of the embodiments and another system component. The system component can be an imaging system having at least one camera optically coupled with the tissue culture chamber. The system component can be a pressure system fluidly coupled with the inlet tube and/or outlet tube. The system component can be a media system comprising a media for flowing through the at least one lumen. The system component can be a collection system configured for receiving output media from the outlet tube. The system component can be an analytical system configured to analyze output samples from the outlet tube.

In some embodiments, a method of manufacturing a bioreactor can be provided. The method can include providing the tissue culture device of one of the claims, which can be manufactured. A hydrogel can be formed in the tissue culture chamber, where the tissue culture chamber includes at least one lumen fluidly coupling the inlet tube to the outlet tube of the tissue culture device, wherein an inlet interface region of the hydrogel is constrained around the inlet tube and an outlet interface region of the hydrogel is constrained around the outlet tube.

In some embodiments, methods of manufacture can include forming a sacrificial material in the hydrogel in the shape of the at least one lumen. The sacrificial material can be removed from the hydrogel to result in the at least one lumen being fluidly coupled with the inlet tube and outlet tube.

In some embodiments, the methods of manufacture can include printing, casting, depositing, or otherwise forming the sacrificial material on a portion of the hydrogel. Then, the hydrogel can be formed with the sacrificial material therein.

In some embodiments, the methods of manufacture can include determining a type of tissue for a tissue construct. The computational protocols can be implemented in order to obtain a design for the at least one lumen in the hydrogel for the tissue construct based on the type of tissue. Then, the hydrogel can be formed to include the design for the at least one lumen in the hydrogel. For example, the design can include a diameter of each lumen, spacing between a plurality of the lumen, number of lumen, shape of lumen, and many other parameters.

In some embodiments, a method of designing a tissue construct can be performed to obtain a design of a lumen network in the hydrogel of the tissue construct. In order to design the lumen network, the tissue to simulate with the tissue construct is identified, which allows for identifying the type of information needed to make the design. The method can include inputting biological data for the tissue into a computing system that has a computation model for vascularized tissue. The computation model can be used for determining lumen networks for specific types of tissues based on properties of the identified tissue. The computing system can be used for computing a vascular network design for the tissue construct based on the biological data and computational model for the tissue. Then, a data representation of the vascular network design can be generated. The data representation can be used for building the hydrogel having the design lumen network. In some examples, the biological data can include at least one selected from the group consisting of geometry, fluid flow rate, oxygen consumption rate, oxygen concentration, glucose concentration, nutrient concentration, glucose consumption rate, nutrient consumption rate, waste generation rate, and combinations thereof. In some examples, the vascular network design can include at least one lumen from an input to an output of the vascularized tissue, wherein the at least one lumen is designed based on at least one of diameter of each lumen, spacing between adjacent lumen, lumen shape, lumen network, lumen orientation, lumen branching, and number of lumen in the tissue construct. In some aspects, the method can include generating a visual model of the vascular network design, which can allow for visual analysis of the vascular network. Also, the method can include graphically illustrating the visual model of the vascular network design on a display screen. The computing system can transmit the visual model of the vascular network design to a manufacturing controller or other computing entity, such as for manufacturing or data analysis.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The patent or application file contains at least one drawing executed in color. Copies of this patent or patent application publication with color drawing(s) will be provided by the Office upon Request and payment of the necessary fee.

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8E shows a top view of the microfluidic channel plate.

Figure 1A:
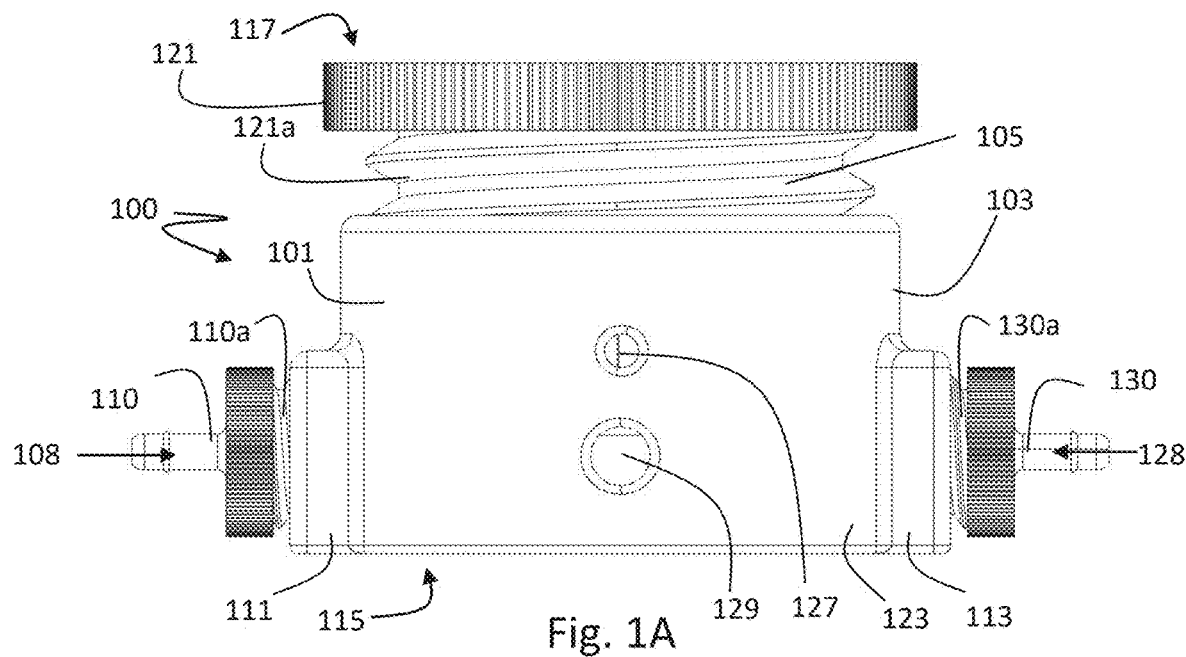
FIG. 1A illustrates a front view of an embodiment of a bioreactor.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention includes a bioreactor for use in the fields of tissue engineering, cell/tissue physiology, assays, and other biological applications. The bioreactor can be configured to mimic the structure, fluid flow characteristics, and physiological behavior of vascularized tissues of the human body. The bioreactor can be used for growing various types of tissues with vascular pathways therein that are fluidly coupled to the bioreactor fluid pathways. The bioreactor can be used to prepare three dimensional (3D) tissue constructs.

The engineered 3D tissues can be used in various applications, such as for transplantation into a body, studying environmental conditions, and evaluation of drug delivery, efficacy, and toxicity as well as any assay using a vascularized tissue construct. The 3D tissue can be designed by advanced 3D models of human tissues and organs, and thereby the 3D tissue that is prepared can simulate a particular human physiology, such as the vascular shape, pattern, size, vessel distribution, blood or biological fluid perfusion through the tissue, and other features to mimic live tissue. The vasculature can be specific and designed to mimic a specific tissue or organ, or generalized to generally provide vasculature based on a sample of multiple tissues or organs. Also, advanced techniques can allow for customization of a subject's tissue or organ for the 3D tissue. The bioreactor can be used for growing vascularized tissues for all of the soft tissues and organs of the human body, including heart, liver, lung, among others, and can be generally applied to any type of animal.

In some aspects, the bioreactor can be used in methods to grow large (e.g., thickness greater than a few millimeters, or greater than a centimeter) tissue constructs (e.g., 3D) that have vasculature-simulating flow channels incorporated therein for improved/optimal oxygen and nutrients transport to cells and transport of waste from the cells of the tissue construct. The bioreactor can provide optimal growth of tissue constructs by having tissue construct vasculature for flow of cell culture medium to cells and outflow to transport waste generated by cells away from those same cells. Accordingly, the tissue construct can be tailored with vasculature that is physiologically relevant to provide perfusion, nutrient distribution or waste removal in a manner specific to the type of tissue in the tissue construct. That is, the type of tissue being simulated can determine the placement, distribution, size and other parameters of the vasculature proved in the tissue construct.

Further, oxygenated cell culture media can pass through the tissue vasculature to provide sufficient oxygen and nutrients to meet cell metabolic needs throughout the thickness of the tissue construct. This functionality can be obtained by designing the vasculature to be sufficient for the tissue, which can include the number of vessels, size of vessels, and distribution of vessels in the tissue construct. The tissue can be modeled while in a subject, and then the tissue construct can be generated with the proper vasculature to provide the tissue with the oxygen as needed for the specific tissue type. The vascularized thick tissue construct is biomimetic and closely represents the in vivo morphology of the human body, whether tailored for a specific human or to mimic the generalized morphology of a population of humans.

The bioreactor can be configured to generate tissue constructs for transplantation or to study a variety of normal or diseased tissues and organs as well as the response to chemical agents (e.g., drugs, toxins, industrial, etc.). For example, the tissue constructs grown using the bioreactor and methods detailed herein may be utilized to evaluate and measure drug delivery parameters based on introduction of the drug into the media that is passed through the vasculature and that diffuses into the tissue construct. The bioreactor can be configured to maintain sterility while forming a fluid (e.g., gas/liquid) tight coupling with the vasculature of the tissue construct. The bioreactor and tissue construct can have an interface between the bioreactor construct and the soft channels within the tissue construct. This allows the bioreactor to receive fluid from an external flow apparatus (e.g., tubing, valves, pumps, etc.) and provide the fluid to the soft channels within the tissue construct.

In some embodiments, a reactor is configured to include a tissue chamber connected on opposing sides by an inlet and an outlet. The space between the inlet and outlet includes the tissue chamber and an interface region. The inlet interface region can include a hollow tube, such as a needle, being fluidly coupled with the inlet port and extending a length sufficient to be at the inlet/chamber interface. The inlet hollow tube is coupled with an inlet port member that can be removably inserted into the structure to form a fluid tight seal with the tissue chamber. Accordingly, the inlet is fluidly coupled with the tissue chamber via the inlet hollow tube. Similarly, the outlet interface region can include another hollow tube (e.g., needle) being fluidly coupled with the inlet port and extending a length sufficient to be at the outlet/chamber interface. The outlet hollow tube is coupled with an outlet port member that can be removably inserted into the structure to form a fluid tight seal with the tissue chamber. Accordingly, the outlet is fluidly coupled with the tissue chamber via the outlet hollow tube.

A hydrogel can be formed in the tissue chamber and around the inlet and outlet hollow tubes. There are various methods for forming the hydrogel with vasculature connecting the inlet and outlet hollow tubes. In some aspects, the hydrogel can include a sacrificial material in one or more pathways between the inlet hollow tube or outlet hollow tube, and the sacrificial material can be removed to leave the one or more fluid pathways that are fluidly coupled with the inlet and outlet. Alternatively, the hydrogel can be 3D printed to have the one or more fluid pathways therein. The 3D printing can be performed for printing to form the hydrogel for the tissue construct body around lumens. Also, 3D printing a sacrificial material that can be removed by a degradation process can be used to obtain the lumens in the tissue construct. In another alternative, a sacrificial material can be 3D printed into the vasculature shape of the desired lumen, and then the hydrogel is cast around the sacrificial 3D printed structure before the sacrificial material is removed. In yet another alternative, a single lumen can be formed between the inlet and outlet by a hydrogel cast around a cylinder that is removed or around a tube that can be retained or removed. Similarly, multi-lumen constructs can be prepared by casting around cylinders that can be removed to obtain the lumen passages in the tissue construct. The sacrificial material can be dissolved, liquified, or otherwise removed from the hydrogel to leave the vascular lumen(s). Various other techniques can be used to form the vascular lumen(s) in the hydrogel.

Figure 1B:
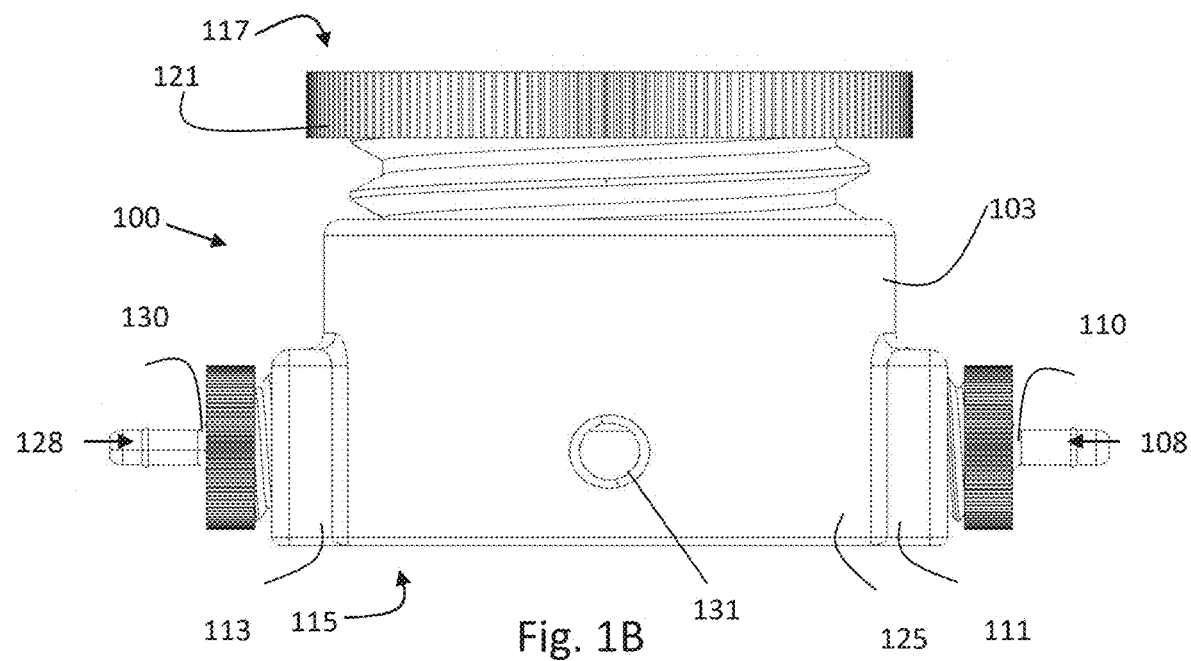
FIG. 1B illustrates a back view of the bioreactor.

FIGS. 1A-11I illustrate an embodiment of a bioreactor 100 for use in preparing a vascularized tissue construct in a tissue chamber 102. FIG. 1A shows a front view of the bioreactor 100 and FIG. 1B shows a back view of the bioreactor 100. The bioreactor 100 can include a body 101 with an assay section 103 and an optical lid section 105. The bioreactor 100 can include an inlet port 108 with an inlet port member 110 coupled into an inlet shoulder 111 and an outlet port 128 with an outlet port member 130 coupled into an outlet shoulder 113. The inlet port member 110 includes threading 110a that threads into inlet threading and the outlet port member 130 includes threading 130a that threads into outlet threading as shown in FIG. 1B. The assay section 103 forms the bottom 115 and the optical lid section 105 forms the top 117, and a front 123 and back 125 are provided. The optical lid section 105 can be a lid 121 with threading 121a that threads into threading 103a of the assay section 103. The front 123 can include a front bottom port 129 and a front top port 127. The front bottom port 129 can be used for viewing inside of the tissue chamber 102. The front top port 127 can be fluidly coupled with an annular conduit 160 that encircles the tissue chamber 102, which can be used for providing a fluid, whether heated or cooled or with any agent. While not shown, the annular conduit 160 can be coupled with the tissue chamber 102, and can be used to provide agents to the tissue or modulate the pressure inside the tissue chamber, such as positive pressure or negative pressure (vacuum), which can be varied during experiments. The back 125 can include a back port 131, which can be used for viewing inside the tissue chamber 102 from the back. However, it should be recognized that the orientation is arbitrarily defined, and the inlet and outlet may be reversed, and the front and back may be reversed.

Figure 1C:
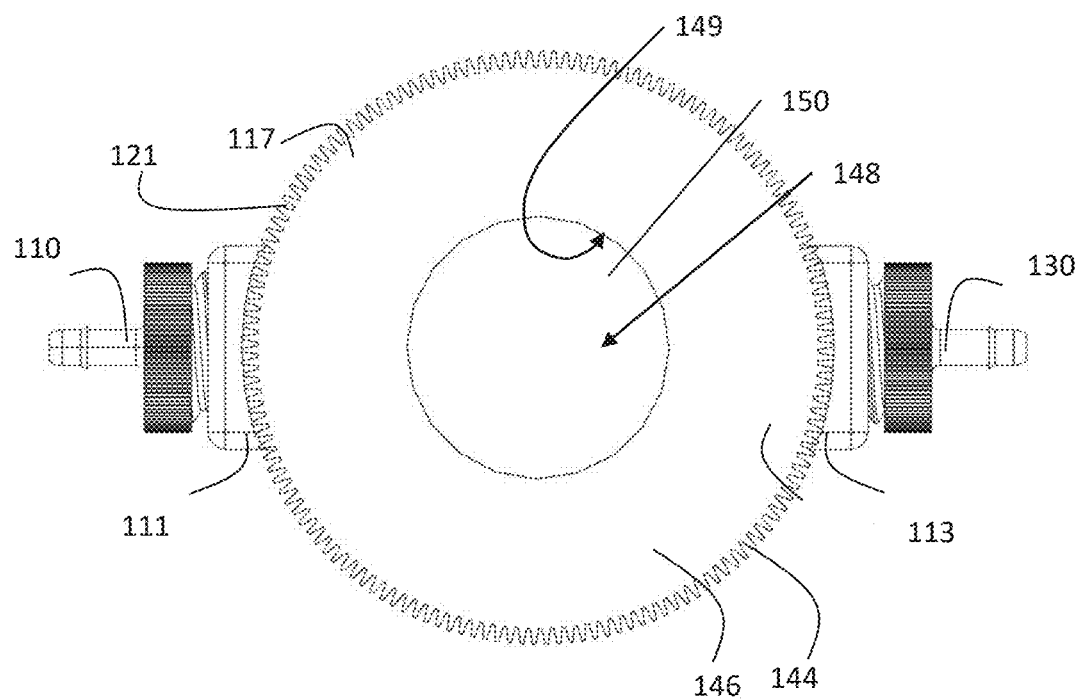
FIG. 1C illustrates a top view of the bioreactor.
Figure 1D:
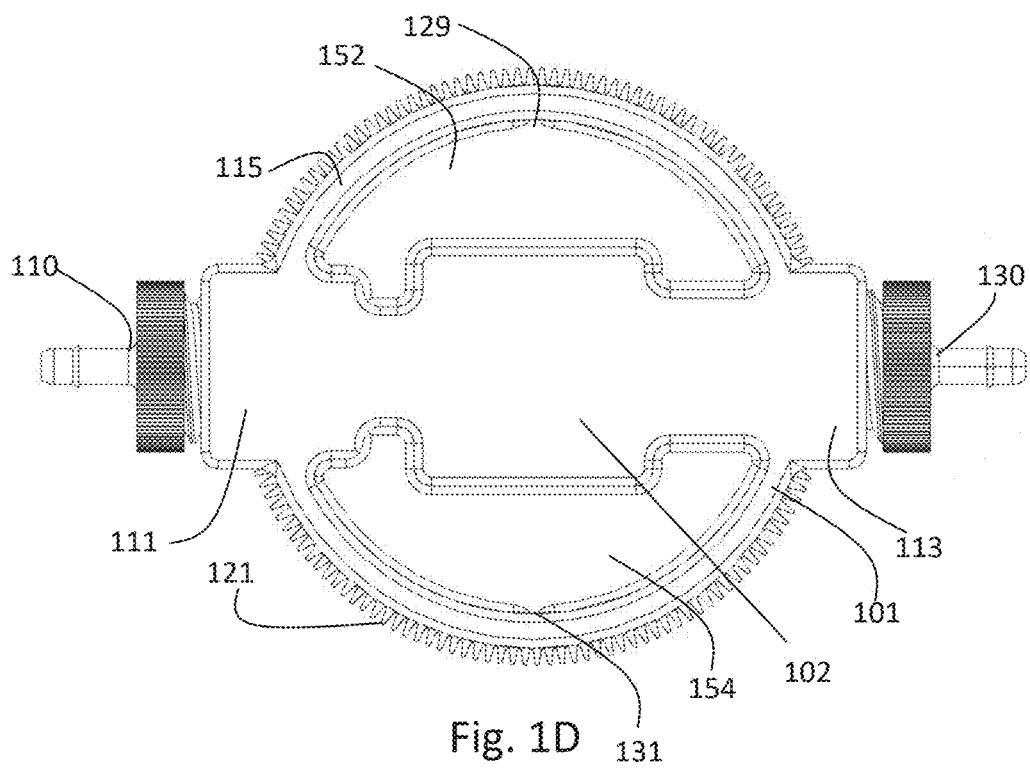
FIG. 1D illustrates a bottom view of the bioreactor.

FIG. 1C shows a top view of the bioreactor 100 and FIG. 1D shows a bottom view of the bioreactor 100. The top view shows the optical lid section 105 (e.g., optically transmissive) includes a lid 121 that screws into the main body 101 (e.g., assay section 103). The lid 121 includes a grip texture 144 around the perimeter. The lid 121 includes an annular top section 146 that may be clear or opaque. The lid 121 includes a center optical port 148 defined by port walls 149 with a port base 150 that is optically transmissive into the tissue chamber 102. The bottom 115 includes a front recess 152 having the front bottom port 129 extending through the body 101 and a back recess 154 having the back port 131 extending through the body 101. This allows for the front bottom port 129 and back port 131 to include optical components inserted therethrough to view the tissue chamber 102 from the front and the back. Also, camera components may be placed in the front recess 152 or back recess 154 with data cables extending through the front bottom port 129 and back port 131, which can be coupled to a controller (e.g., computer) for image acquisition.

Figure 1E:
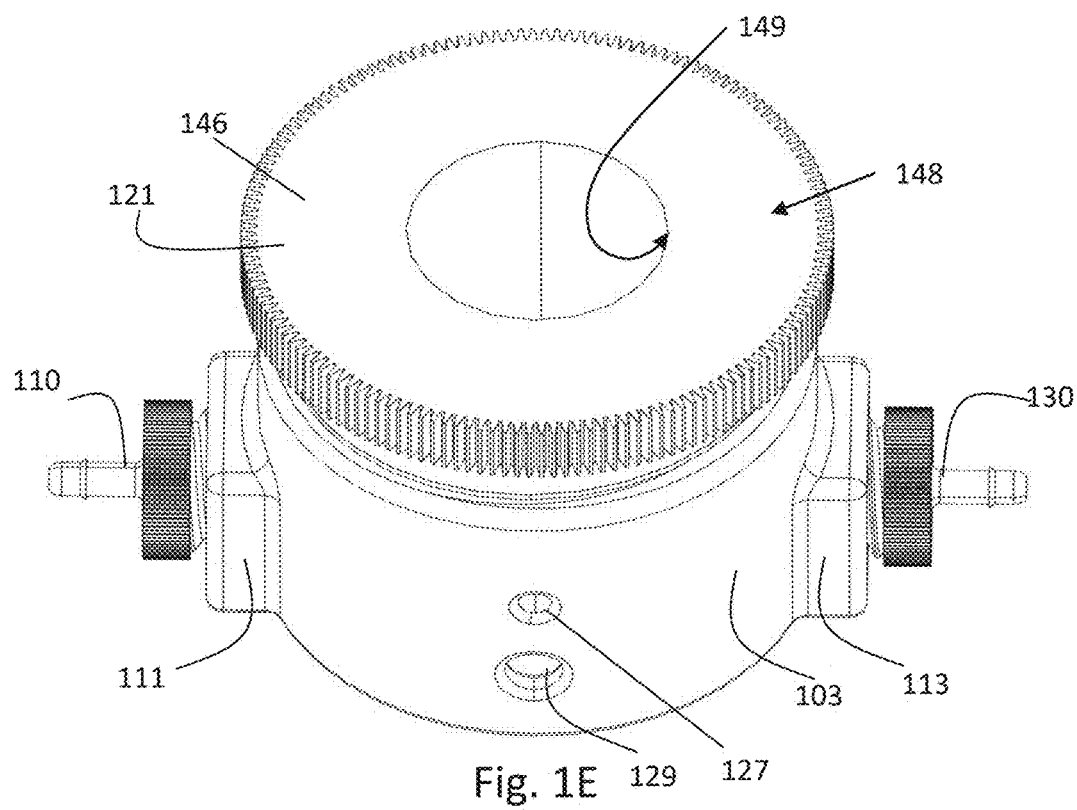
FIG. 1E illustrates a top perspective view of the bioreactor.
Figure 1F:
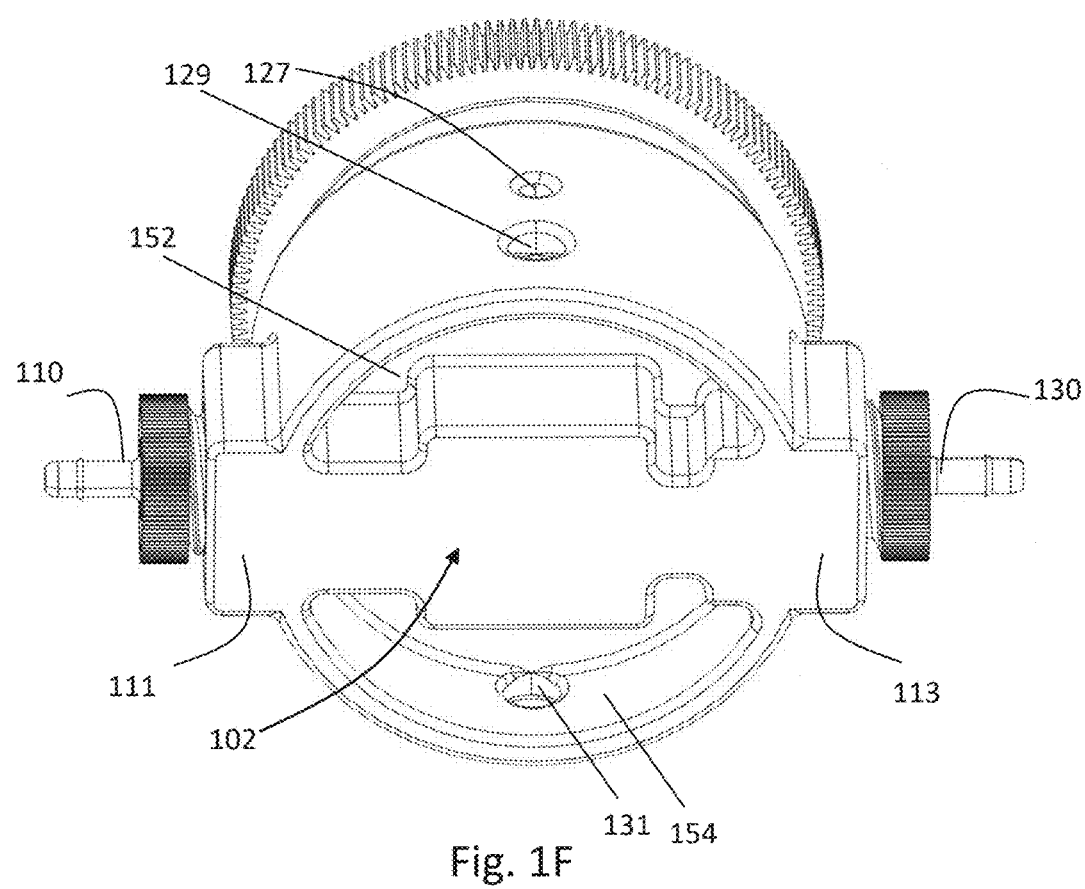
FIG. 1F illustrates a bottom perspective view of the bioreactor.

FIG. 1E shows a top perspective view of the bioreactor 100 and FIG. 1F shows a bottom perspective view of the bioreactor 100.

Figure 1G:
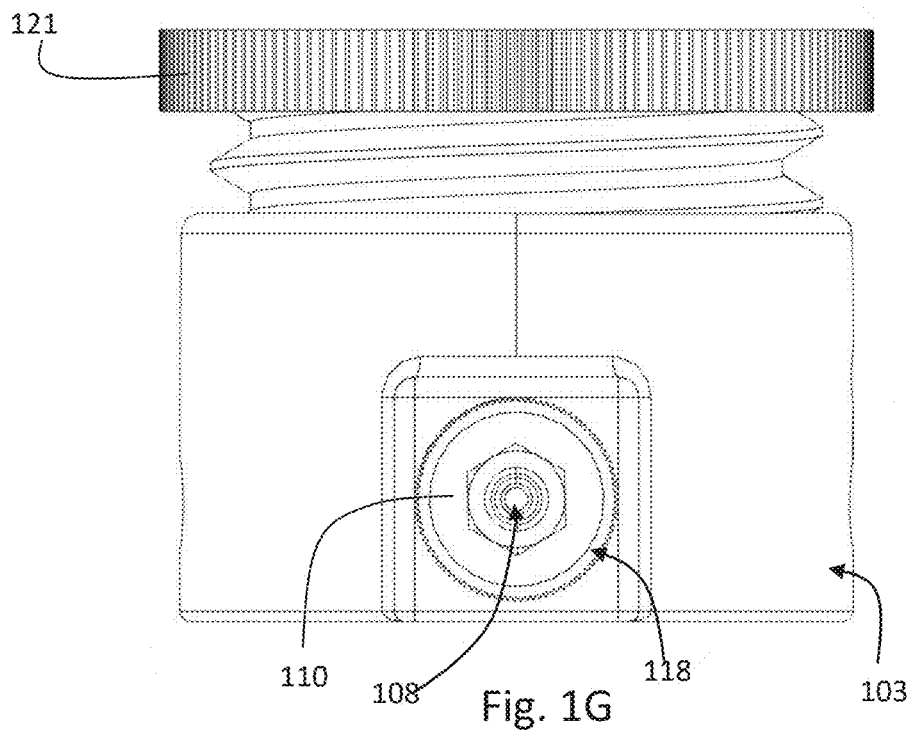
FIG. 1G illustrates a view that can be the inlet side or the outlet side of the bioreactor.

FIG. 1G can be the inlet side or the outlet side of the bioreactor 100. For example, the inlet port 108 can be viewed in the inlet port member 110.

Figure 1H:
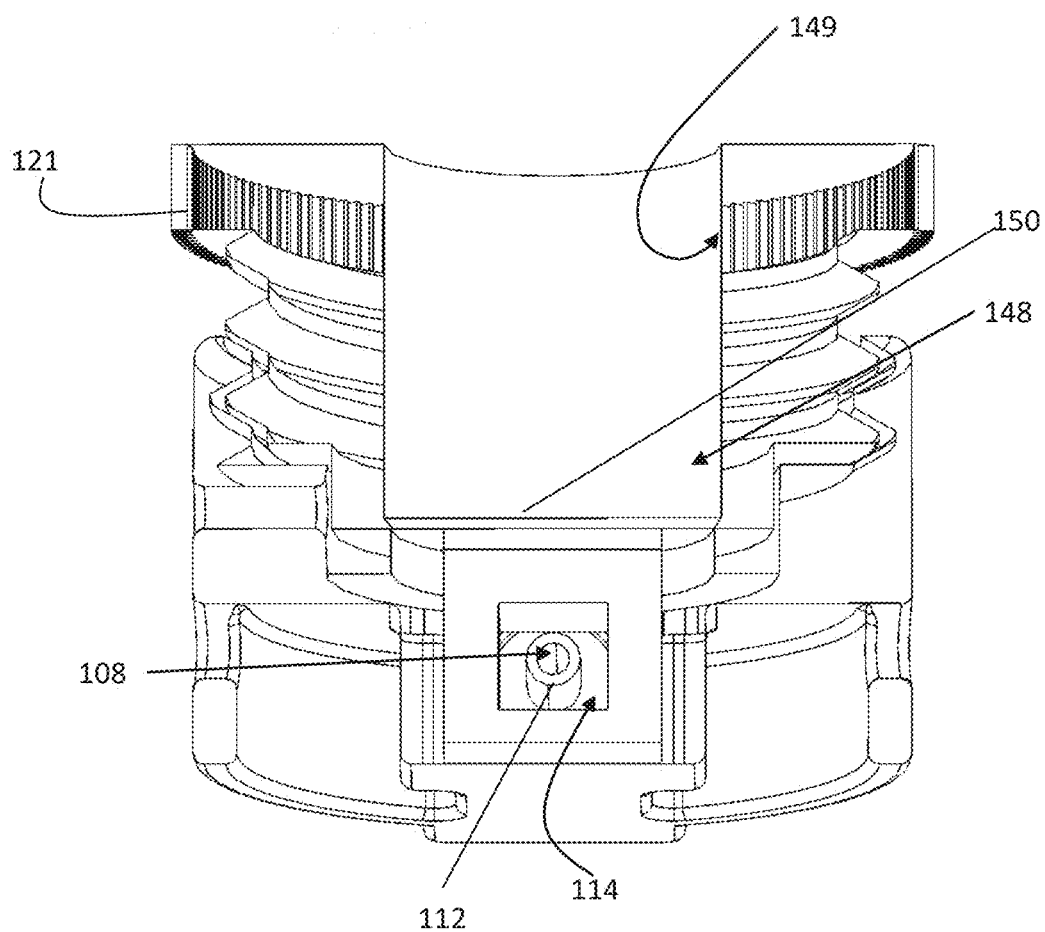
FIG. 1H illustrates the perspective view of the inlet side of the bioreactor showing the inlet port having the interface tube in the inlet cavity.

FIG. 1H shows the perspective view of the inlet side of the bioreactor 108 showing the inlet port 108 having the interface tube 112 in the inlet cavity 114. The inlet cavity 114 is fluidly coupled with the tissue chamber 102 so that hydrogel can be in the inlet cavity 114 around the interface tube 112. The dimensions of the inlet cavity 114 and interface tube 112 can vary, with a smaller relative inlet cavity 114 providing enhanced fluid tight coupling because of the restriction to deformation of the hydrogel due to the walls of the inlet cavity 114 around the inlet tube 112.

Figure 1I:
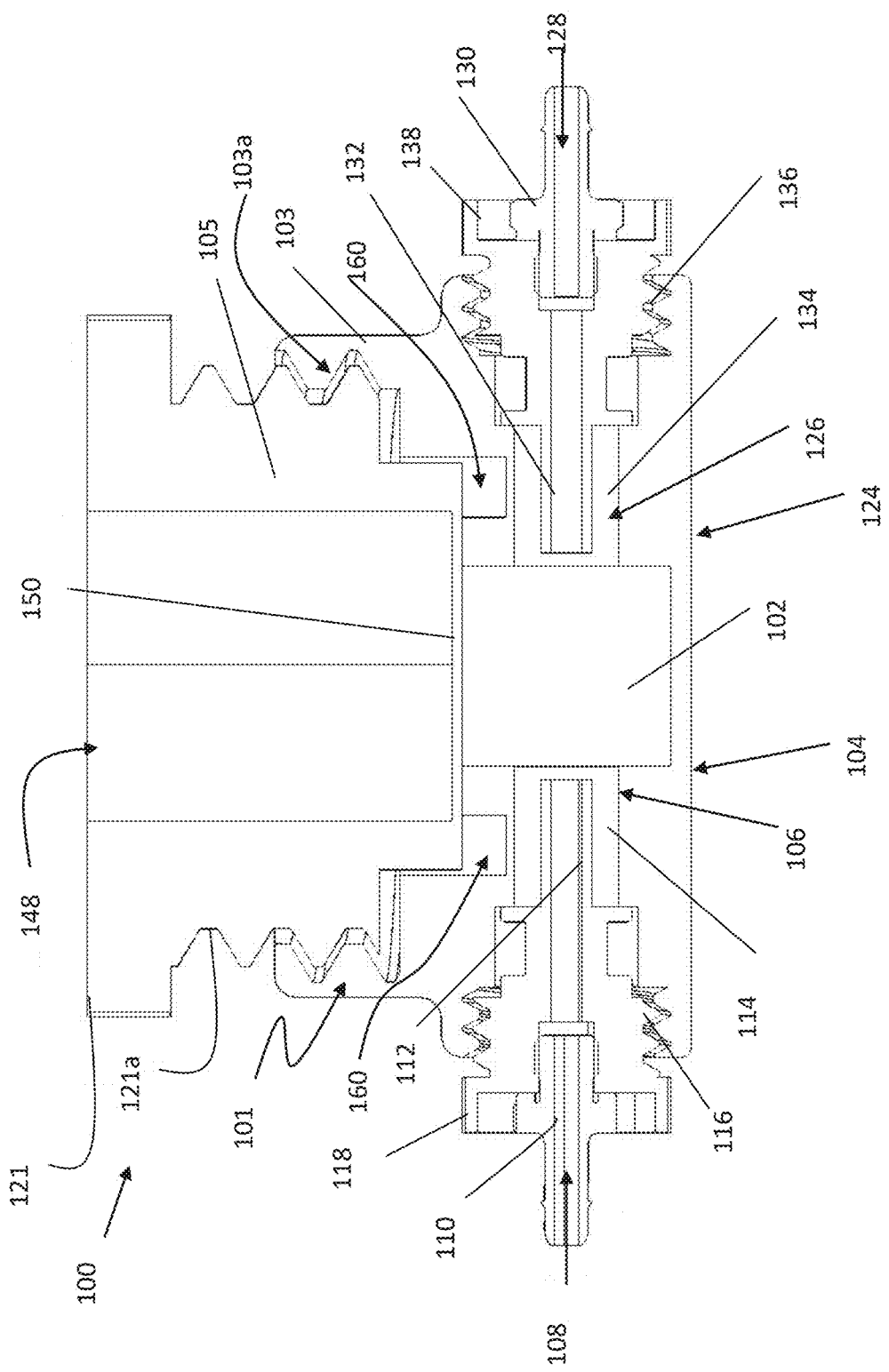
FIG. 1I illustrates a front cross-sectional view of the bioreactor.

FIG. 1I shows a front cross-sectional view of the bioreactor 100. The tissue chamber 102 can have an inlet side 104 having an inlet interface region 106 where the tissue chamber 102 is fluidly coupled with an inlet port 108. The inlet port 108 can be defined by an inlet port member 110 having the inlet port 108 therein. The inlet port member 110 can include an inlet interface tube 112 in the inlet interface region 106. The inlet interface region 106 forms an inlet cavity 114 around the inlet interface tube 112 so that the hydrogel can be formed at least partially around the inlet interface tube 112. The inlet port cavity 114 is within the inlet shoulder 111. The inlet port member 110 can include inlet threading 116 to couple with the inlet receiver region of the bioreactor 100. Also, the inlet port member 110 can include a grip 118, which is a larger region configured for finger/thumb griping, to facilitate insertion and removal of the inlet port member 110 from the inlet receiver region formed into the body of the bioreactor 100.

The tissue chamber 102 can have an outlet side 124 having an outlet interface region 126 where the tissue chamber 102 is fluidly coupled with an outlet port 128. The outlet port 128 can be defined by an outlet port member 130 having the outlet port 128 therein. The outlet port member 130 can include an outlet interface tube 132 in the outlet interface region 126. The outlet interface region 126 forms an outlet cavity 134 around the outlet interface tube 132 so that the hydrogel can be formed at least partially around the outlet interface tube 132. The outlet port member 130 can include outlet threading 136 to couple with the outlet interface region 126 or outlet receiver region of the bioreactor 100. Also, the outlet port member 130 can include a grip 138, which is a larger region configured for finger/thumb griping, to facilitate insertion and removal of the outlet port member 130 from the inlet receiver region formed into the body of the bioreactor 100.

The body 101 of the bioreactor 100 can include an assay section 103 and an optical lid section 105. The assay section 103 includes the tissue chamber 102 formed therein as a recess so that the lid section 105 forms the top as a lid 121. The assay section 103 also includes the interface regions 106/126 and receiver regions configured to receive the port members 110/130. The assay section 103 and optical lid section 105 each have a threading for coupling together. The optical lid section 105 has a viewing element to allow for visualization into the tissue chamber 102, which viewing element can include the center optical port 148 formed therein, which can be a recess with a clear base 150 (e.g., lens), or have any optical components, such as focusing lenses, located therein.

The bioreactor 101 can be used to grow thick 3D vascularized tissues. An example embodiment can include obtaining the bioreactor 101 with the optical lid section 105 separated from the assay section 103. The inlet port member 110 and inlet port member 130 can be separated from the body 101 to allow access into the chamber via the top and the sides. Sacrificial vasculature bodies can be loaded in the inlet or outlet and extend through the interface regions and tissue chamber, and the port members 110/130 are screwed or otherwise inserted into the body 101. The hydrogel can be cast around the sacrificial vasculature bodies in the tissue chamber 102 which can include the cavities 114/134 of the interface regions 106/126. The hydrogel forms a fluid tight seal around the interface tubes 112/132, which have the sacrificial vasculature bodies at least partially therein. The sacrificial vasculature bodies can then be removed by being dissolved or melted, which form the vasculature lumen in the hydrogel so that there is a fluid tight seal. That is, the hydrogel forms the fluid tight seal with the interface tubes 112/132 so that the vasculature lumen have fluid tight seals with the interface tubes 112/132, and thereby any fluids provided into the inlet pass through the vasculature lumen in the hydrogel and then through the outlet.

The tissue chamber 102 is shown to include the shoulder chambers as the cavities 114/134 of the interface regions 106/126. These shoulder chambers provide the space for the hydrogel to form the fluid tight seal with the interface tubes 112/132, which limits the ability of the hydrogel to expand. Typically, hydrogels can be somewhat softer or flexible materials due to the nature of their composition. These shoulder chambers provide an expansion restraint so that the hydrogel cannot flex or deform. This can result in providing the fluid tight seal so that pressurized fluids do not leak from the interface tubes 112/132 due at least in part to the hydrogel being constrained by the walls of the cavities 114/134. The body 101 of the assay section 103 is a rigid material that does not expand when fluid flows therethrough. The encasement by the shoulder chambers formed by the cavities 114/134 prevents fluid pressure from expanding the lumen or vasculature portion therein. The ability to have the fluid tight seal with the inlets and tissue vasculature is an improvement over leaky couplings. Unconstrained hydrogels can expand and leak when subjected to fluid pressure, and thereby the shoulder chambers provide an surprising and unexpected improvement in fluid tightness for lumen interfaces between rigid materials of the bioreactor and the softer hydrogel material therein.

The distance from a cavity wall to the tube to provide the constraint to the hydrogel can vary depending on the hydrogel. Softer hydrogels can include the walls closer, while more rigid hydrogels can include the walls further from the tube outer surfaces. For example, for a softer hydrogel, the closest distance from a wall to the outer tube surface can be 0.5 mm to 1 cm, 0.75 mm to 7.5 cm, 1 mm to 5 cm, or 2 mm to 3 mm. For example, for a harder hydrogel, the closest distance from a wall to the outer tube surface can be 2 mm to 2 cm, 4 mm to 1.5 cm, 6 mm to 1 cm, or about 7.5 mm. However, narrower dimensions can also be used for more rigid hydrogels. Also, dimension of the length of the tube in the cavity can vary from about 1 mm to 10 cm In an example embodiment, the bioreactor can be configured with a total height of about 32 cm, a body width of 33 cm, a total length from inlet to outlet of about 57 cm, the port member can have a diameter of 2.5 cm, the tissue chamber can have a height of 10 cm, the primary cavity of the tissue chamber can have a width of 10 cm, the inlet and outlet cavities can have a length of about 7 cm and a height of 5 cm, the inlet and outlet tube can protrude into the cavities by about 6.35 cm. However, it should be recognized that the dimensions may vary, such as by 1%, 5%, 10%, 25%, 50%, 75%, or 100%. The features of the bioreactor can be increased in size to be scaled the same as the organ being simulated.

Figure 2A:
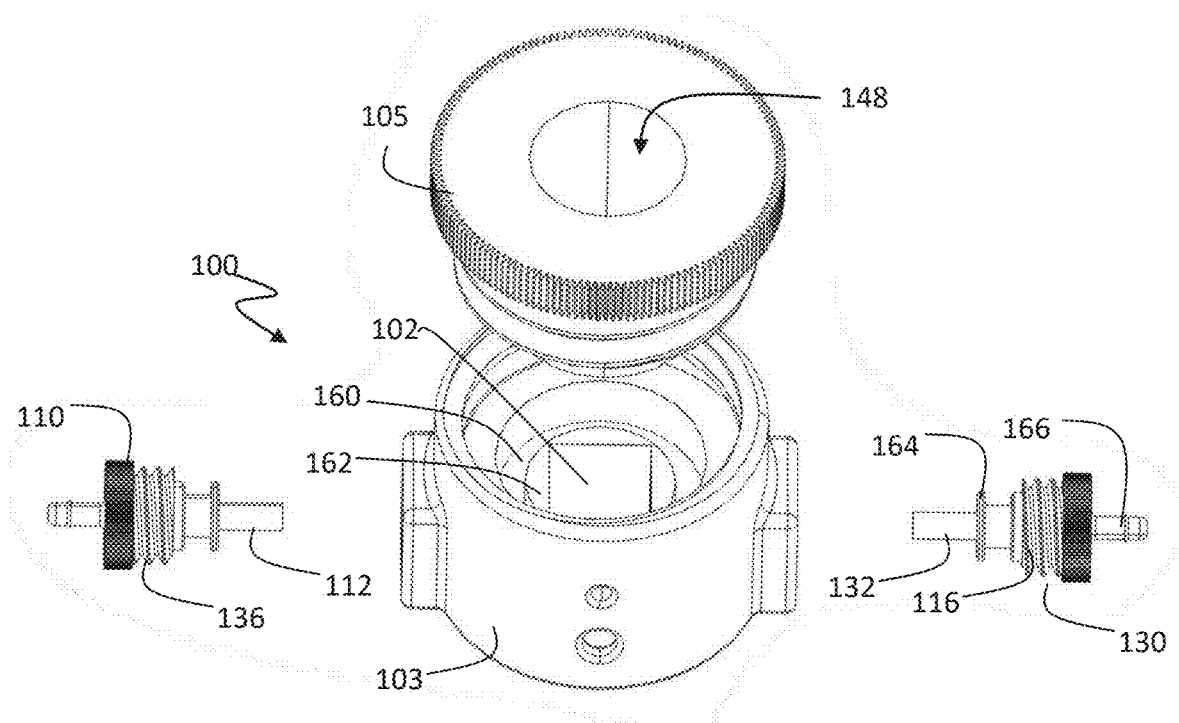
FIGS. 2A-2B illustrate exploded views of the bioreactor.
Figure 2B:
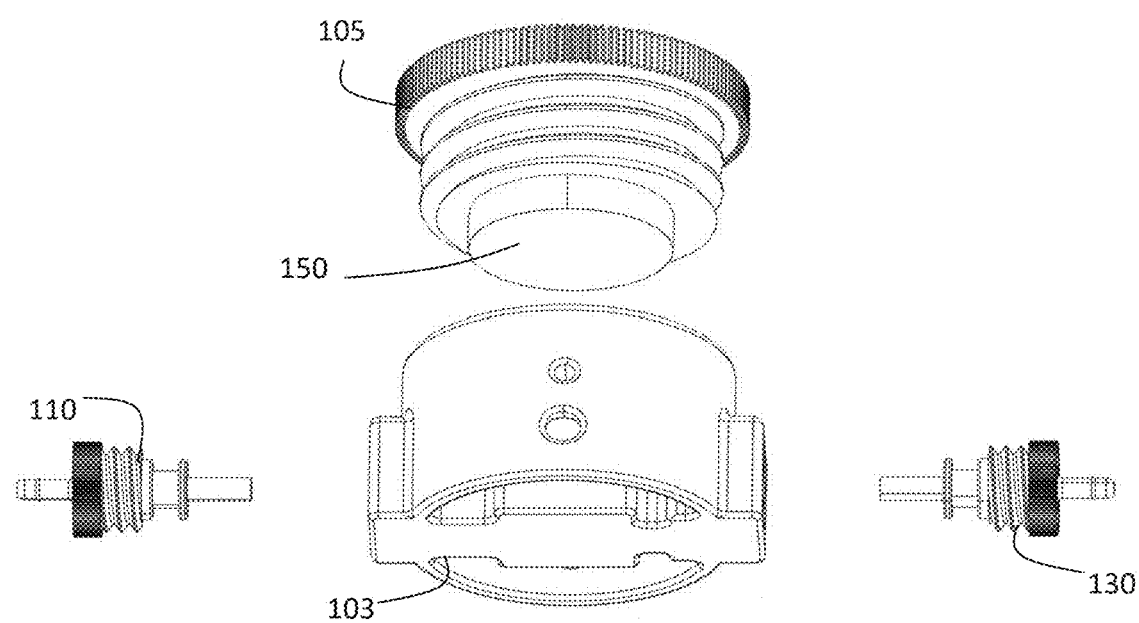

FIGS. 2A-2B shows exploded views of the bioreactor 100 showing the separate assay section 103, optical lid section 105, inlet port member 110, and outlet port member 130. The assay section 103 shows the tissue chamber 102 surrounded by the annular conduit 160. A lid support 162 separates the annular conduit 160 from the tissue chamber. The port members 110/130 can include seals 164 that seal with the respective port. The port members 110/130 can include tube couplers 166 for coupling inlet and outlet tubes.

Figure 3A:
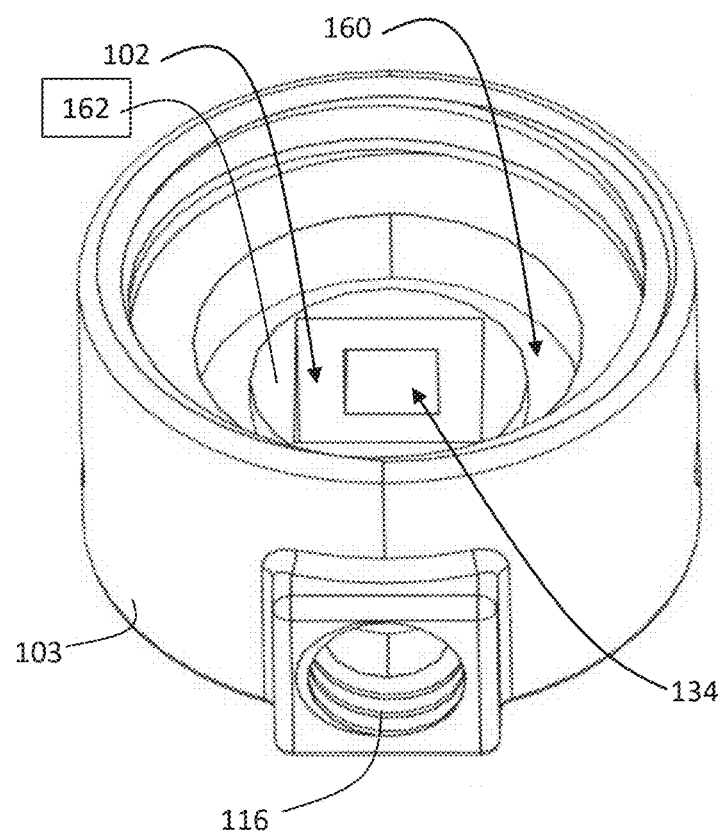
FIG. 3A illustrates a perspective view of the assay section of the bioreactor.
Figure 3B:
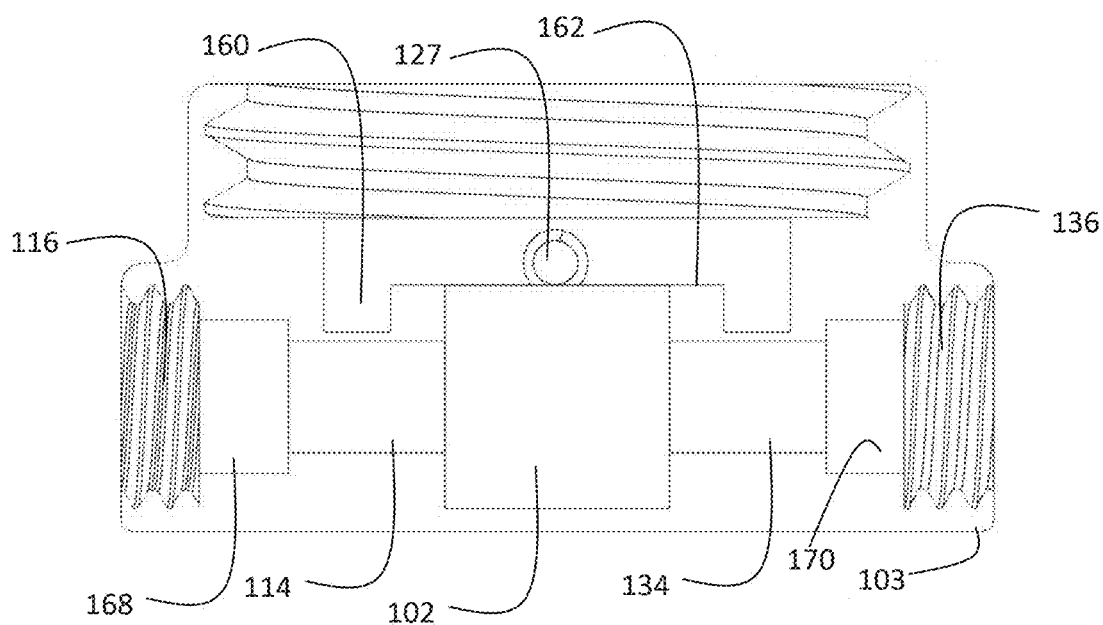
FIG. 3B illustrates a cross-sectional side view of the assay section of the bioreactor.

FIG. 3A includes a perspective view of the assay section 103 and FIG. 3B includes a cross-sectional side view of the assay section 103. Accordingly, the structural elements that form the tissue chamber 102, annular conduit 160, inlet threading 116, inlet cavity 114, outlet cavity 134, outlet threading 136, and threading 103a. The inlet receiver region 168 and outlet receiver region 170 are also shown.

In some embodiments, the hydrogel can be formed to have simulated vasculature by having the lumen network formed therein in the shape to mimic vasculature. The vasculature lumen network in the hydrogels can provide a vasculature tissue mimic and surrounding tissue mimic due to the nature of the hydrogels and the lumen(s) formed therein. The fluid tightness of the interface tubes 112/132 with the hydrogel lumen in the cavities 114/116 allows for flow from the rigid inlet bioreactor flow paths/tubes into the flexible hydrogel vasculature lumen network as a flow path to the rigid outlet flow paths/tubes. The interface occurs at the rigid/flexible transition between the two different types of materials.

The bioreactor can be used to generate a tissue construct that can be utilized to generate tissue for transplantation into a patient or to study a variety of normal or diseased tissues and organs. Also, analytes, such as beneficial or harmful chemicals or biological materials can be introduced into the medium for testing with the tissue construct. The tissue construct that is grown using the methods and bioreactor detailed herein may be utilized to evaluate and measure drug delivery to tissues from the vasculature (e.g., the most likely route of delivery). The bioreactor also is configured so that the tissue construct can maintain sterility, is gas tight, and interfaces the ridged bioreactor port member material and external flow apparatus (e.g., tubing, valves, pumps, etc.) to the soft and flexible channels within the tissue construct formed by the hydrogel and cells.

In some embodiments, the bioreactor includes at least one fluid inlet, at least one fluid outlet, and a 3D hydrogel tissue construct containing cells with at least one flow channel configured as a vascular lumen, and a tubular (e.g., hollow needle) channel configured to form a fluid tight interface with the hydrogel tissue construct, which provides a fluid tight interface between harder materials of the bioreactor and flexible materials of the hydrogel. The bioreactor with the fluid tight coupling of the bioreactor inlet and bioreactor outlet with one or more flow channels in the hydrogel tissue construct, is sealed and permits complete control of the gaseous environment within the reactor. The fluidic tight seal can be further strengthened by modulating the dimensions of the shoulder cavities or use of other constraint members (e.g., braces, collars, etc.) to constrain the hydrogel from flexing that can help negate any compromise of the fluidic tight seal. The vascular lumen network can be designed using simulation software that is capable of analyzing the fluid flow, oxygen, and nutrient (e.g., glucose) distribution throughout the hydrogel tissue construct and can optimize the vascular paths in shape, diameter, and spacing throughout the hydrogel tissue construct based on the specific oxygen and glucose consumption of cells of the tissue that is being mimicked.

Figure 4:
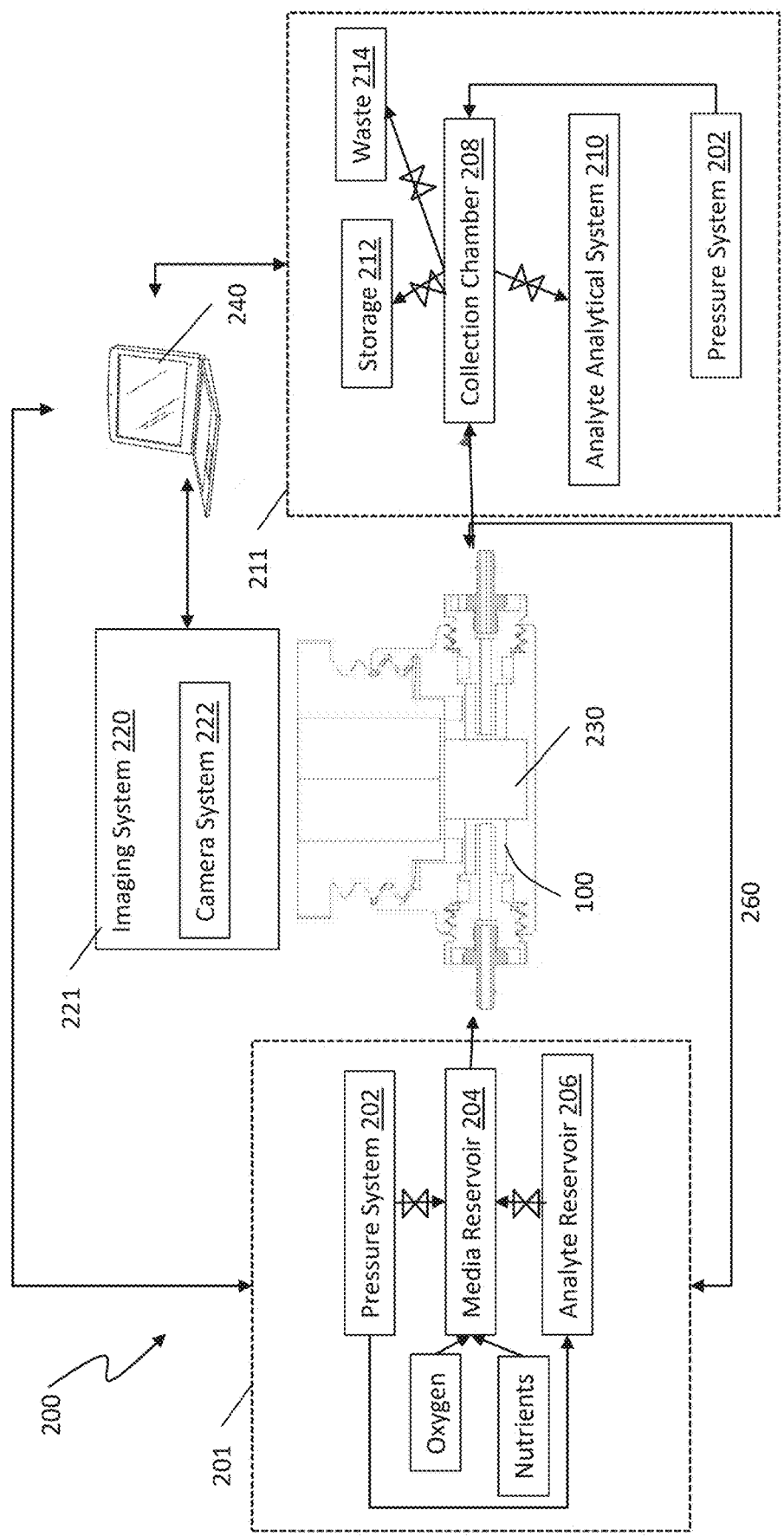
FIG. 4 illustrates a schematic representation of a tissue system that can be used with the bioreactor.

FIG. 4 illustrates a tissue system 200 that can be used with the bioreactor 100. The tissue system 200 can include media module 201, a collection module 211 and an imaging module 221 operably coupled with the bioreactor 100. The media module 201 is configured to provide media with oxygen and nutrients from a media reservoir 204 to the tissue construct 230 in the tissue chamber 102 of the bioreactor 100, such as with a pressure system 202. The pressure system 202 can include any number or suitable types of pumps with valves to control pressure and fluid flow. The pressure system 202 can operate under control of the controller 240. The media can also be supplemented with an analyte from the analyte reservoir 206, which can be tested on the tissue construct 230, such as chemicals, drugs, pesticides, herbicides, toxins, poisons, growth factors, proteins, peptides, nucleic acids, siRNA, miRNA, or the like.

The collection module 211 is coupled to the outlet of the bioreactor 100 to obtain substances unused from the media reservoir, metabolic products generated by the cells in the tissue construct 230, and any waste or other substances. The collection chamber 208 can receive the output (e.g., liquid and gas) from the bioreactor 100, and provide the output to an analyte analytical system 210 configured to analyze the analyte or any biological reaction thereto, such as metabolites, conjugation products, or proteins encoded by a nucleic acid analyte. The analytical system 210 can include any type of one or more devices used to analyze biological parameters in fluids, whether physicochemical analysis (e.g., mass spectroscopy, liquid chromatography, etc.) or biological analysis (e.g., gene sequencing, nucleic acid hybridization, ELISA, western blot, northern blot, etc.). The collection module 201 can operate under control of the controller 240. A pressure system 202 and valves can direct the output to the analytical system 210, storage, 212, or waste 214. The collection module 211 can operate under control of the controller 240.

The imaging system 220 includes at least a camera system 222 for visually imaging the tissue construct 230 with still or video images. The imaging system 220 can also include hardware and software for controlling operation of the camera system 222 and image or video acquisition as well as obtaining image or video data, and the processing thereof. The imaging system 220 can operate under control of the controller 240. The camera system 222 can include one or more types of cameras, which can be in any configuration and use any band of light wavelengths, such as visible, IR, UV, or combinations thereof as well as for still images and video feeds. The camera system 222 may also be configured as a microscope, such as a fluorescent microscope, for image acquisition.

Bioreactor Design

The design of the bioreactor can be conducted in a 3D CAD program (e.g. Solid Works). The exact design of the bioreactor, such as dimensions of main tissue chamber and shoulder chambers, can be determined by the design of the tissue construct to be placed within the tissue chamber of the bioreactor. The number of vascular lumen network inlets and outlets in the tissue construct can be used to determine the configuration of the bioreactor. The location of the vasculature lumens within the tissue construct, as well as construct size are utilized to determine the size and placement of interfaces within the bioreactor. The bioreactor can be designed with features to consider the constraint of intra-interface spacing necessitated by the physical interface requirements (e.g., two interfaces cannot be located close enough to interfere spatially). The bioreactor can be designed to provide the vascularized tissue construct with: 1) sterility, 2) overcoming potential evaporative losses leading to shrinkage of the construct, 3) providing interfacing between the bioreactor and hydrogel vascular lumen network (e.g., flow paths), and 4) a fluid tight interface to inhibit leakage from the reactor when placed in a flow loop. The bioreactor described herein can be designed for constructs from a few millimeters to a few centimeters, or up to a size of full organs or smaller mimics thereof.

The connections of the body components of the design bioreactor can be configured to include grooves for high temperature silicone O-rings to maintain sterility and ensure a gas tight seal between the lid, interfaces, and body of the reactor. The interfaces can be configured to be moveable, which permits the interfaces to move in and out of the bioreactor body. Also, the lid and base of the bioreactor can be made as thin as possible to facilitate fluorescent microscopy of the reactor and visual observation. These features are shown in the FIGS. 1A-1D. An example bioreactor can include a dimension of about 32 mm from base to top of lid, and can be about 58 mm long and 33 mm wide. The inlet port can have a diameter of about 2.5 mm. The depth of the viewing tunnel in the lid can be 10 mm. The width/diameter of the tissue chamber can be about 10 mm. The length of the shoulder chambers can be about 7 mm, and the length of the interface tubes can be 6.35 mm. The reactor described herein, unlike many used for culture of large numbers of cells is intended for tissue constructs with scales from a few millimeters to several centimeters, or even larger sizes are contemplated.

Bioreactor fabrication may be accomplished by 3D printing or traditional machining or injection molding through the creation of a multi part mold for the bioreactor body and separate, linear molds for the interfaces and lid.

Vascular Tissue Construct Design

In some embodiments, the vasculature lumen network is computationally designed. A computer can be programmed with instructions that causes computations based on real vasculature data to obtain synthetic vasculature data that defines a synthetic vasculature network. The shape of the one or more lumen, with or without branches, can be designed to account for the flow of nutrients from the vascular lumen into and through the hydrogel. The data can include parameters that consider the flow of oxygen or one or more nutrients in order to simulate diffusion from a real vessel in a real tissue. The data processing can include obtaining data for oxygen diffusion from a blood vessel through the hydrogel, so that the distribution of blood vessels can be optimized in order to optimize oxygenation of the cells within the hydrogel body. For example, the data processing can include computing the amount of oxygen that is needed for a number of cells a certain distance from a lumen wall, and then designing the vasculature lumen network to provide sufficient oxygen to the cells. This calculation can also be performed with different nutrients. Iterative calculations can be used for oxygen and any number of nutrients to obtain a design of the vasculature lumen network suitable for a certain tissue condition for oxygen and nutrient perfusion. The design based on cell oxygen and/or nutrient requirements allows for long term growth of the vascularized tissue. In some instances, the vascularized tissues can be grown in the bioreactor for one or more weeks to one or more months, and possibly one or more years, or until the vascularized tissue is mature enough for implantation or use in various assays. Scaling can also be used to compute the vasculature lumen network to grown an entire synthetic organ from the tissue, which synthetic organ can be used for implantation or assays. Accordingly, the shape of the tissue chamber can be modulated in shape to approximate a shape of a certain tissue or organ to be mimicked.

In an example, a protocol can include: specifying tissue parameters; processing tissue parameters in a computational model; obtaining optimized vasculature structure from the computational model; create a hydrogel having the optimized vasculature structure; and growing a tissue construct with cells in the hydrogel.

For example, data from studies on tissues and organs can be used to model a synthetic vascularized tissue. The metabolic activity of tissues can be obtained, which can include the amount and rate of oxygen and nutrient uptake. The bioreactor system can then provide the oxygen and nutrients at the desired amount and rate for the tissue being mimicked. Accordingly, the combination of having computer-designed vasculature lumen network to maximize oxygen and nutrient diffusion to cells in the body of the hydrogel can be enhanced by also controlling the amount and rate of oxygen and nutrient being provided by a pressurized system to control the diffusion. This combination allows for enhanced simulation of the desired tissue to be studied. For example, the lumen diameter and/or lumen spacing of the lumen in the network can be designed based on the tissue, and then the control system can be programmed to provide the oxygen and nutrients in the fluid pumped into the bioreactor to simulate the oxygen and nutrient uptake and diffusion of the real tissue. This design can be performed in a tissue-specific manner to obtain a specific type of synthetic tissue, such as pancreas, spleen, liver, kidney, heart, brain, intestine, vessel, lung, or skin as well as others, which is treated with oxygen and nutrients in a tissue specific manner. The treatment of oxygen and nutrients can be based on the metabolic activity of the target tissue.

In some embodiments, real data is obtained in order to design the vasculature lumen network. For example, in vivo data from an animal, such as human, cow, rat, mouse, pig, horse, cat, dog, or other, can be obtained from various medical/biological analyses of the animal. The data can be input into the computer model to facilitate the design of the vasculature lumen network. The computations can be performed to determine vasculature shape, diameter, and spacing of one or more vessel types, such as large, medium, small, and micro vessels. Vasculature branching networks can also be designed. The designs can be calculated by determining the network shape and sizing to obtain homogeneous distribution of oxygen and nutrients in the tissue construct, which can avoid dead spots in the tissue construct that are ischemic or nutrient deficient. The computational design can enhance the ability of each cell in the synthetic tissue construct to obtain the same amount of oxygen and nutrients, or within some reasonable distribution. The design includes the dimensions of the tissue chamber, which allows for different chamber sizes for different tissue sizes or organs.

In some embodiments, a computation model is provided in a computer system for analysis of the geometry, flow rate, oxygen, glucose, and other solute concentrations in both steady state and time dependent manner in a vascularized hydrogel tissue construct in the bioreactor. The mathematical formulas used to describe the computational modeling embodiments of the present invention are not intended to limit the invention to the mathematical formulas used to describe the model. Other mathematical formulas than those presented herein can be expressed alone or in combination to arrive at the same mathematical results. Instead, the present examples show how one configuration is operational.

For example, vascularization of a tissue can range from inclusion of a single flow pathway to a complex network of interconnecting flow paths forming a "vascular network". In this case, tissue construct optimization considerations based on oxygen distribution included alterations to: (1) the number of vasculature channels transecting the construct; (2) the channel diameter(s) of each lumen; (3) orientation of the channels (e.g., straight, angled, branching, etc.) within manufacturing constraints; and permeability properties of the vascular channel walls.

In some embodiments, a computing system can be configured with software for modeling the vasculature systems within the tissue construct. The construct can initiate with generation of a 3D model of the tissue construct with an embedded tubular vascular network. The computation models of the designed vascularized tissue construct can be built using CFDRC tools (cfd-research.com), such as a multiscale and multi-physics modeling tool (e.g., CoBi (Computational Biology) A. Przekwas, T. Friend, R. Teixeira, Z. Chen, P. Wilkerson, Spatial modeling tools for cell biology, (2006)) The model can also be generated from multiscale computational models of in vitro tissue chips and bioreactors (e.g., Liver-on-Chip platforms for evaluation of hepatic drug metabolism and toxicology and Heart-on-Chip platforms for assessment of cardiac PK/PD or other parameters) within the CoBi framework.

The combination of a mass balance, Fick's 2nd Law, and oxygen solubility in media (Henry's Law) are used to characterize oxygen transport through the vessels and in the stagnant media.

Vessel Media Flow:

$$\frac{\partial C_{O2}}{\partial t} + v\frac{\partial C_{O2}}{\partial y} = D_\infty \frac{\partial^2 C_{O2}}{\partial y^2} - S_{v-t} \quad (1)$$

Stagnant Media:

$$\frac{\partial C_{O2}}{\partial t} = D_\infty \nabla^2 C_{O2} \quad (2)$$

Where $C_{O2}$ is the oxygen concentration and $D_\infty$ is the free diffusivity of oxygen in media, v is the media velocity in the vessel, and $S_{v-t}$ is the sink term representing oxygen transport from the vessel to the tissue.

FIGS. 5A-5E show the considerations of the tissue construct, as described below.

Tissue Construct:

Within the tissue region, the combination of a mass balance, Fick's 2nd Law, and a reaction term characterize transport and metabolism of oxygen.

$$\frac{\partial C_{O2}}{\partial t} = D_{eff}\nabla^2 C_{O2} + s_{v-t} - R_{O2} \quad (3)$$

Where $D_{eff}$ is the effective diffusivity of oxygen in the hydrogel (based on hydrogel porosity), and $R_{O2}$ is the rate of oxygen consumption. Convective transport in the tissue region is assumed to be negligible compared to diffusional transport.

Vessel-Tissue Oxygen Transport:

Assume that the oxygen is transported from the vessel to the tissue via a diffusive flux. More rigorous formulation would also involve convective flux term across the vascular wall according to Starling's hypothesis [B. Grigoryan et al., Multivascular networks and functional intravascular topologies within biocompatible hydrogels, Science (80-). 364 (2019) 458-464]. In the current model, the oxygen flux term is calculated as:

$$S_{v-t} = P \cdot A \cdot (C_{O2,v} - C_{O2,t}) \quad (4)$$

Wherein P is the effective permeability between vessel fluids and tissue, A is the vessel wall area and $C_{O2,v}$ and $C_{O2,t}$ are oxygen concentrations in the vessel and tissue respectively. The Mackie-Meares equation can be used to calculate the effective diffusivity based on changes in hydrogel porosity:

$$D_{eff} = D_\infty \left(\frac{\phi}{2-\phi}\right)^2 \quad (5)$$

Wherein $\Phi$ is hydrogel porosity. Porosity effects on oxygen distribution due to changes in matrix formulations will also be explored in silico.

Mathematical Models of Oxygen Metabolism:

Cellular oxygen consumption is typically characterized by Michaelis-Menten kinetics [Lovett et al. (2009)].

$$R_{O2} = \frac{V_{max} \times C_{O2}}{K_m + C_{O2}} \quad (6)$$

Where $V_{max}$ is the maximum reaction rate and $K_m$ is the concentration at which half of the maximum reaction rate is achieved, also known as the Michaelis-Menten constant.

Construct Optimization:

Parametric simulations can be performed to evaluate the effect of specific design parameters on oxygen and glucose distribution within the tissue construct and vascular channels. The overall average tissue concentration values are determined and plotted with respect to time for design parameters, including: channel diameter (d); channel flow rate (q); and spacing between channels(s) and thus the number of vascular channels transecting the construct (n×n).

The channel diameter represents the inner diameter of the vascular channels. The channel flow rate is the volumetric flow rate at the inlet of the vascular channel. Spacing between channels represents the distance from the outer diameter of one channel to the outer diameter of the next channel. The number of vascular channels in each row is equal to the number of channels in each column.

Figure 5A:
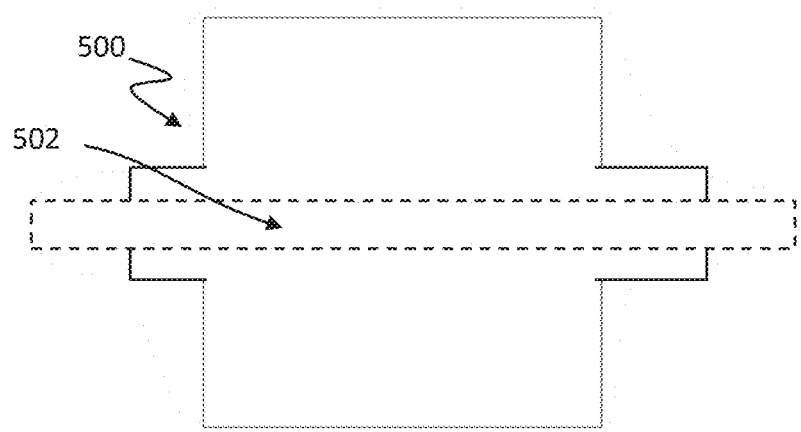
FIGS. 5A-5E illustrate examples of the tissue constructs that can be designed with the present protocols.
Figure 5B:
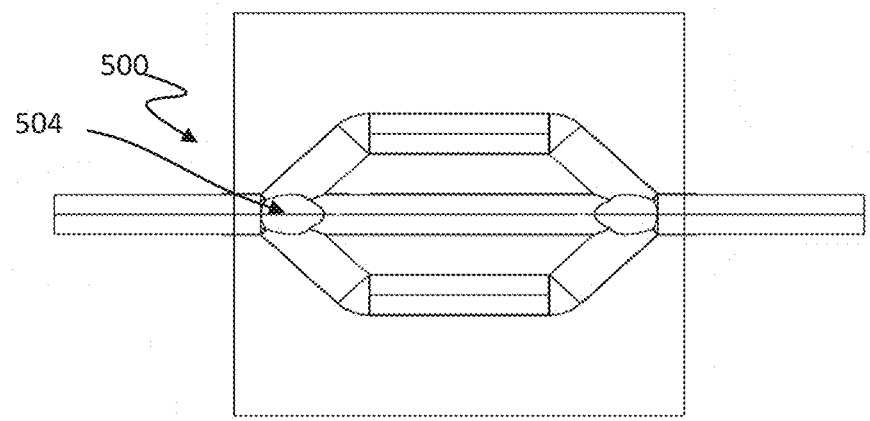
Figure 5C:
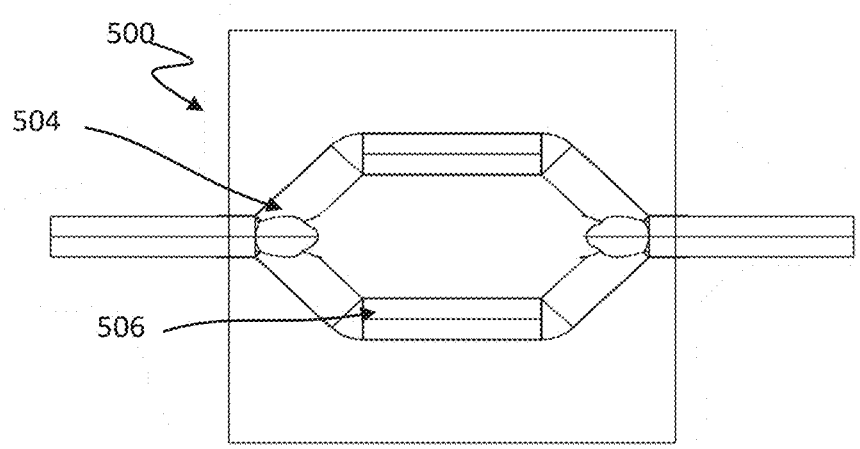
Figure 5D:
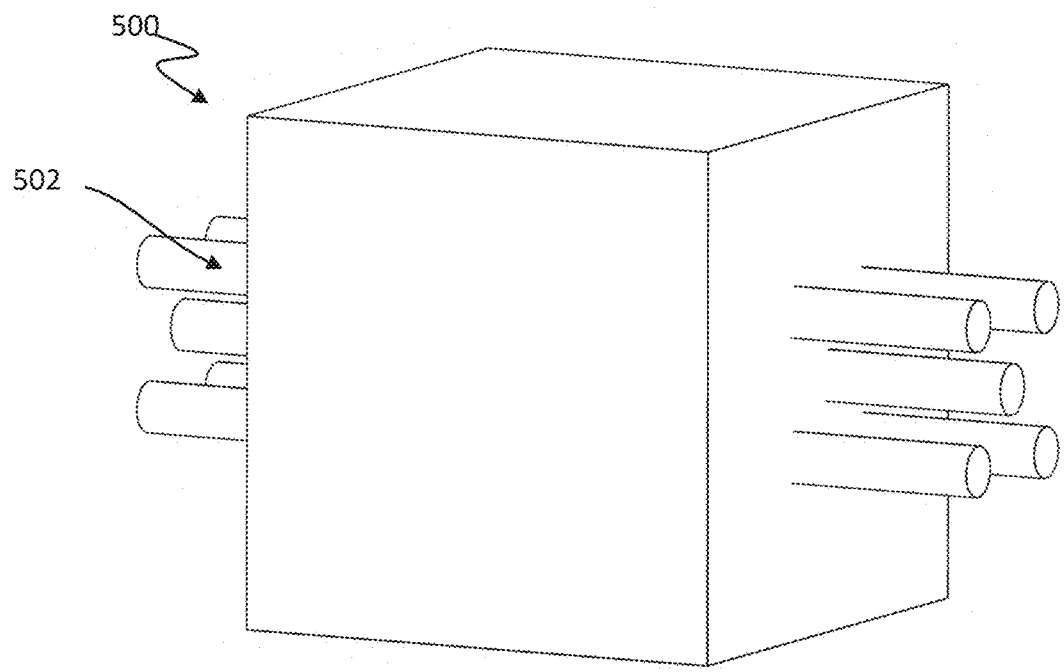
Figure 5E:
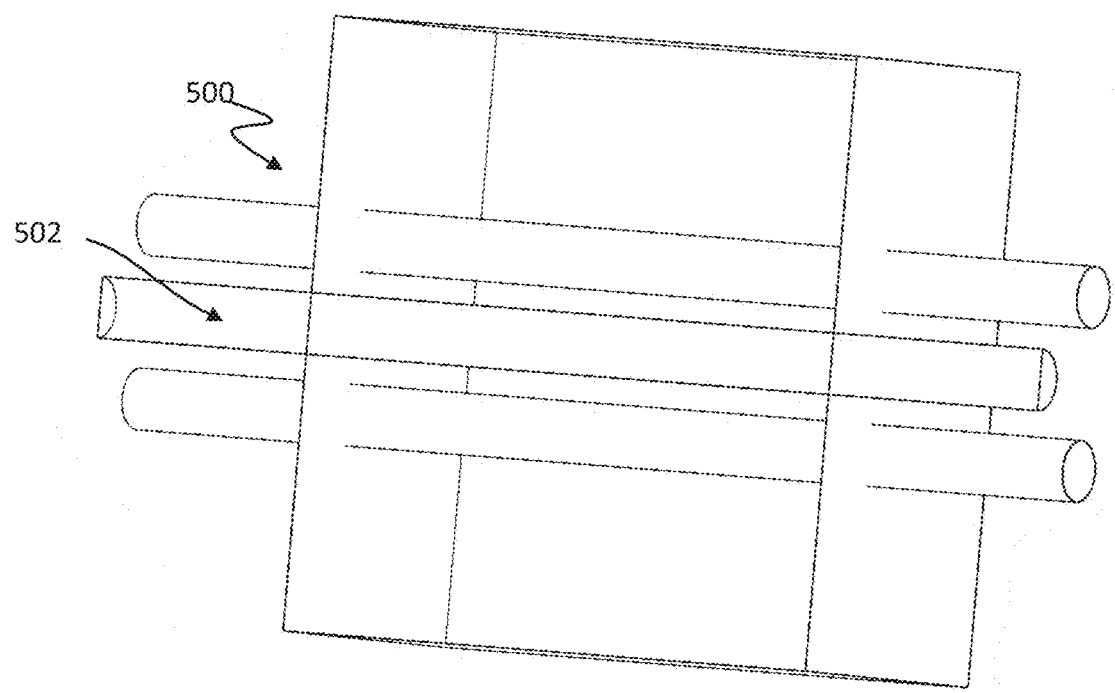

FIGS. 5A-5E illustrate examples of the tissue constructs that can be designed with the present protocols. FIG. 5A shows a tissue construct 500 having a single unbranched lumen 502. FIG. 5B show a tissue construct 500 having a branched lumen network 504, which shows three separate branches, but could include more or less channels. FIG. 5C shows a tissue construct 500 with a branched lumen network 504 without a center through channel, which cause the fluid to flow to the outwardly arranged lumen 506. FIGS. 5D-5E shows a tissue construct 500 with a plurality of separate single unbranched lumen 502. However, each of the plurality of individual single unbranched lumen 502 can be configured as in FIG. 5A, but could be a branched lumen network 504.

Figure 6:
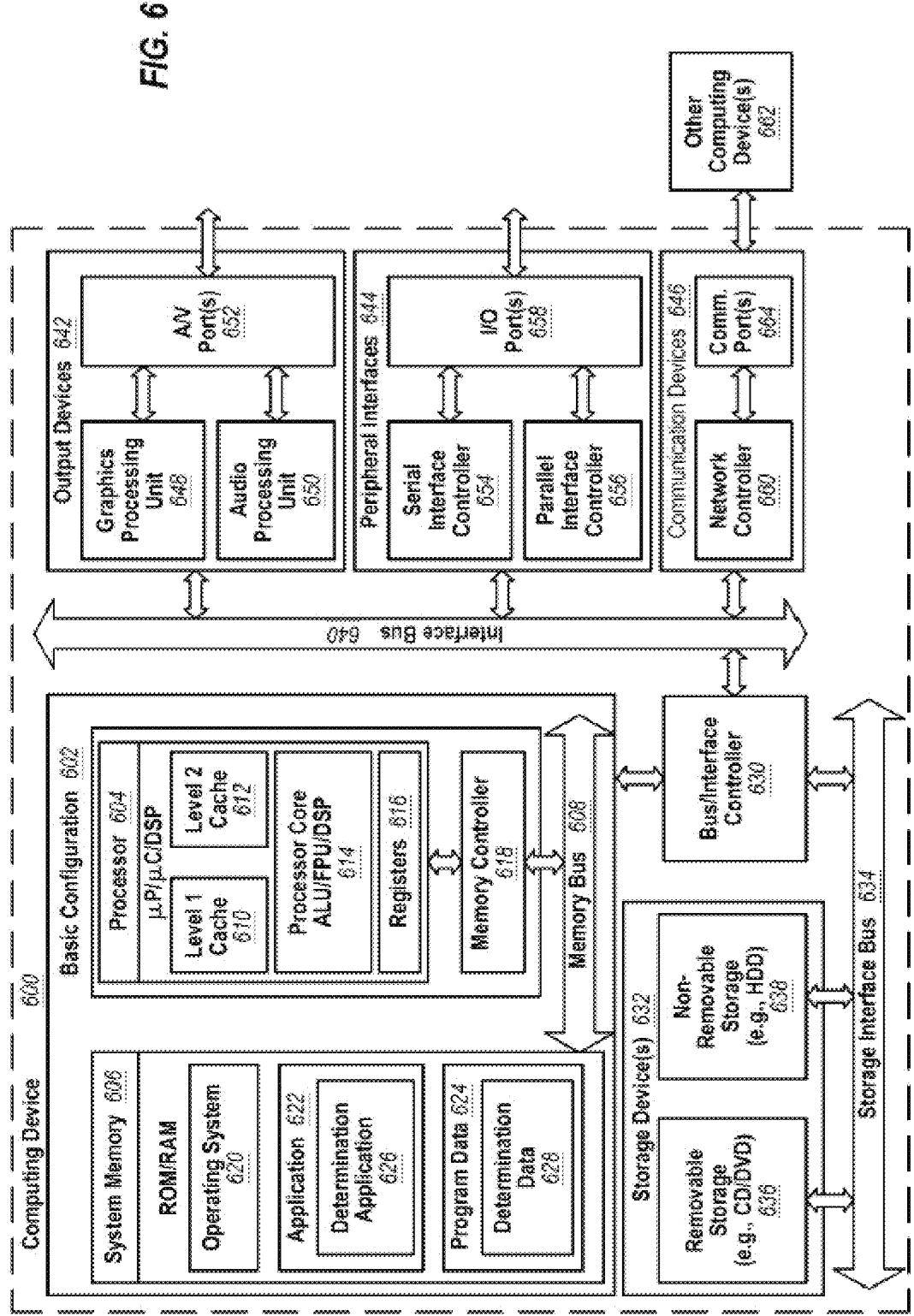
FIG. 6 illustrates a computing system that can be used for performing the calculations herein for designing a tissue construct, and can serve as the controller for any system component or for the entire system.

FIG. 6 illustrates a computing system 600 that can be used for performing the calculations herein for designing a tissue construct. It can also serve as the controller for any system component or for the entire system.

Figure 7:
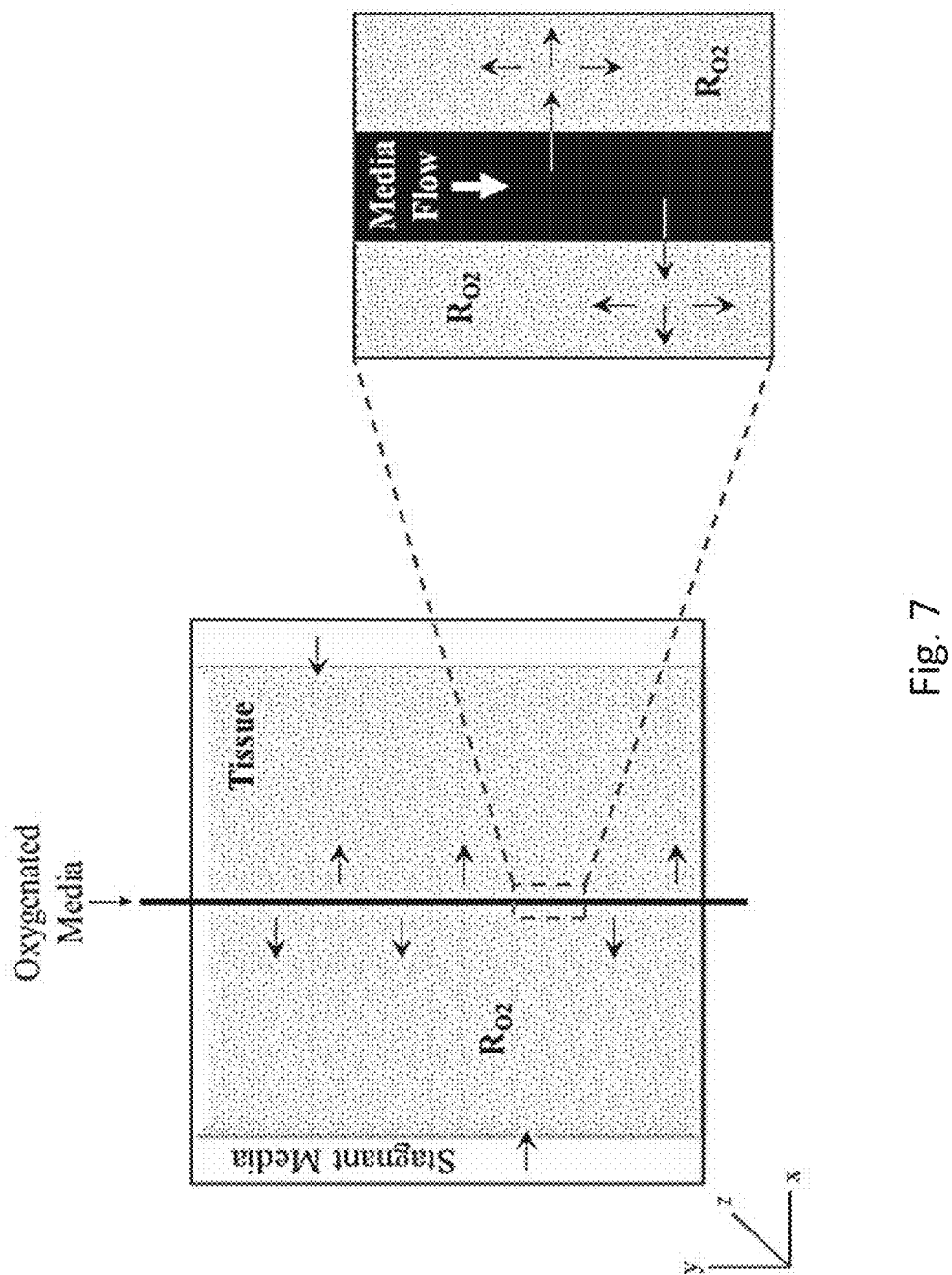
FIG. 7 illustrates the oxygen media flow within the lumen and oxygen permeation into the hydrogel.

FIG. 7 illustrates the oxygen media and media flow within the lumen in the hydrogels. Stagnant media on the outside (or it can be pressurized media, such as in annular conduit) can provide oxygen for diffusion into the tissue construct. However, the media flow may provide enhanced oxygen diffusion due to the pressure and configuration of the tissue construct.

Figure 8A:
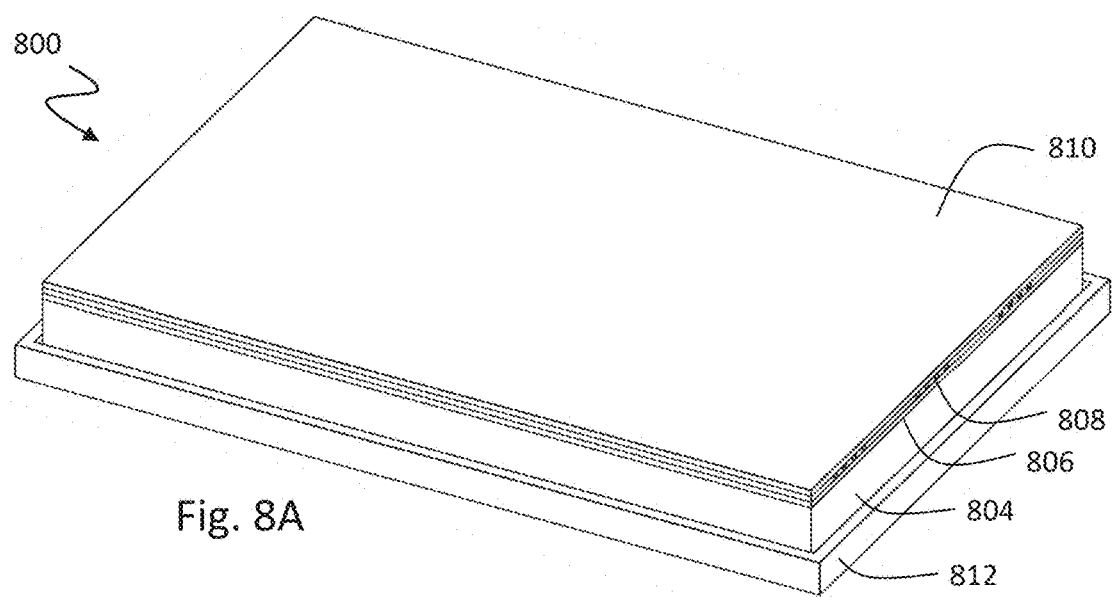
FIG. 8A includes a perspective view of the multi-bioreactor plate device.
Figure 8B:
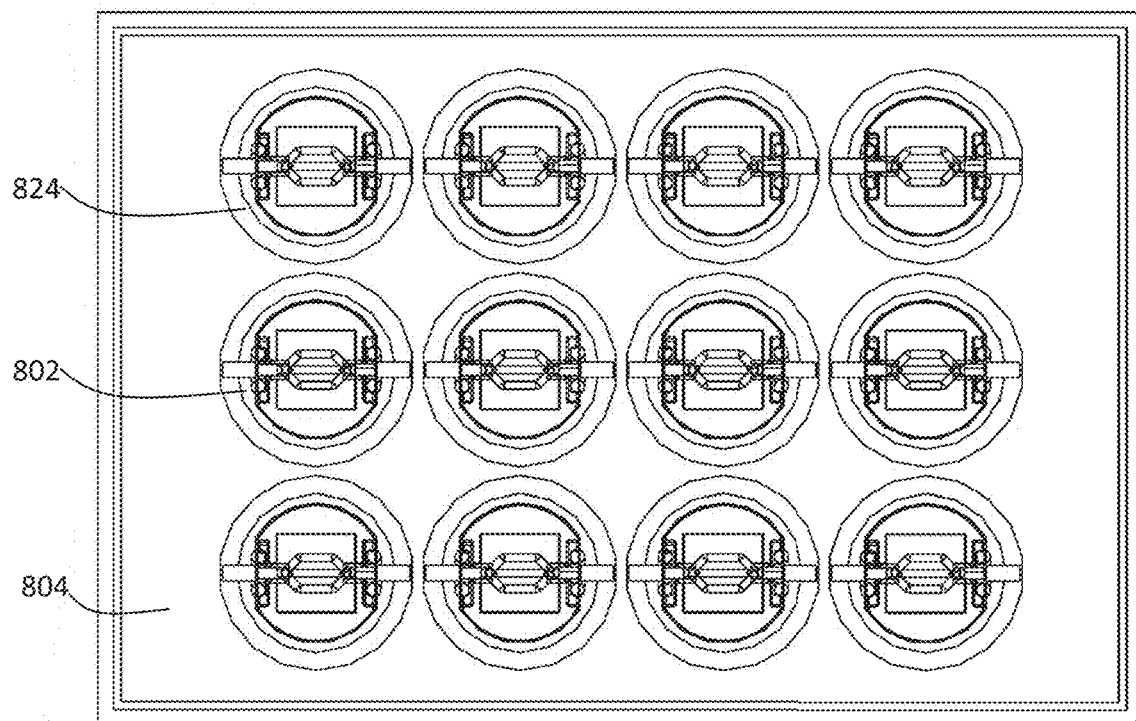
FIG. 8B shows a top cross-sectional view of the multi-bioreactor plate device, which shows the array of individual bioreactors.
Figure 8C:
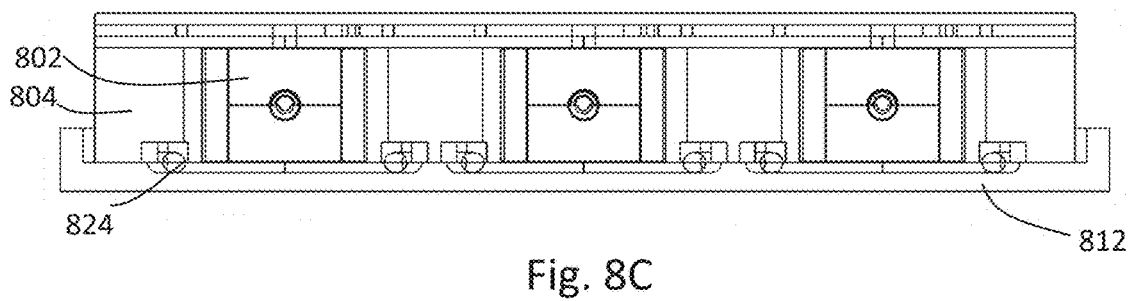
FIG. 8C shows a side cross-sectional view of the multi-bioreactor plate device.

FIGS. 8A-8I show a multi-bioreactor plate device 800. FIG. 8A includes a perspective view of the multi-bioreactor plate device 800. The multi-bioreactor plate device 800 includes a base plate 812, an array frame 804, a microfluidic port plate 806, a microfluidic channel plate 808, and a microfluidic plate lid plate 810. FIG. 8B shows a top cross-sectional view of the multi-bioreactor plate device 800, which shows the array of individual bioreactors 802. Seal rings 824 are also shown, which help provide fluid tightness. FIG. 8C shows a side cross-sectional view of the multi-bioreactor plate device 800. Additionally, microfluidic network tubing can be included connecting the individual bioreactors 802. This allows for a sequence of tissue constructs to be in a flow path for an assay. Accordingly, the tissues can be in order of a biological pathway for interaction of substances with different organs, and then passing the product from one organ to the next organ. Alternatively, each individual bioreactor 802 can be separate from the others without any fluidic connections, thereby providing for isolated tissue constructs that can be tested in parallel.

Figure 8D:
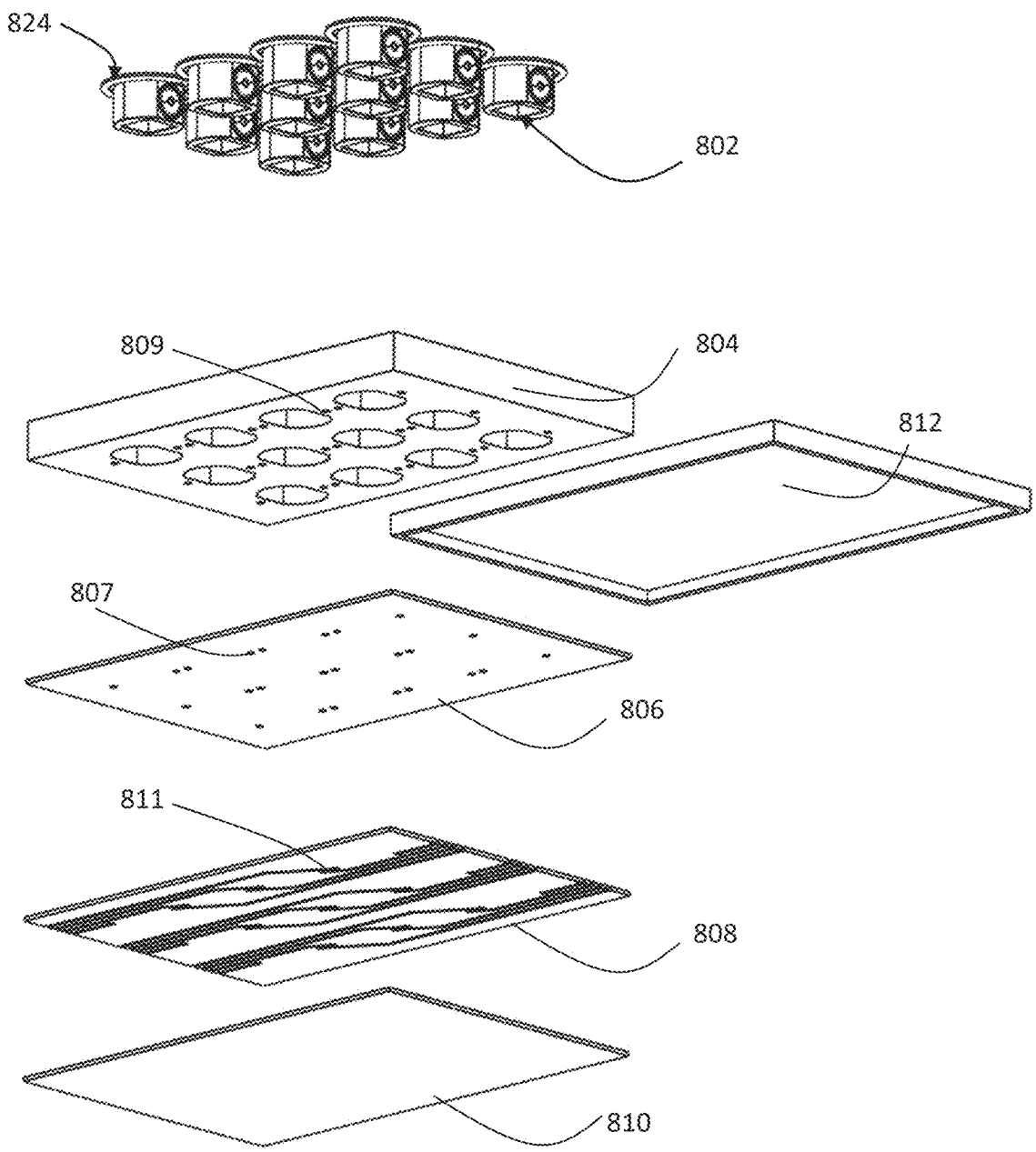
FIG. 8D shows an exploded view of the multi-bioreactor plate device, which shows the array of individual bioreactors, an array frame, a microfluidic port plate, a microfluidic channel plate, and a microfluidic plate lid plate.

FIG. 8D shows an exploded view of the multi-bioreactor plate device 800, which shows the array of individual bioreactors 802, an array frame 804, a microfluidic port plate 806, a microfluidic channel plate 808, and a microfluidic lid plate 810 as well as a base plate 812. Also, the microfluidic port plate 806 is shown to have microfluidic ports 807, which are aligned with microfluidic ports 809 in the array frame 804. Also, the microfluidic ports 807 are aligned with microfluidic conduit ports 811 in the microfluidic channels 813 of the microfluidic channel plate 808, which have outlets out of the device 800.

FIG. 8E shows a perspective view of the microfluidic channel plate 808 showing the microfluidic conduit ports 811 in the microfluidic channels 813.

Figure 8F:
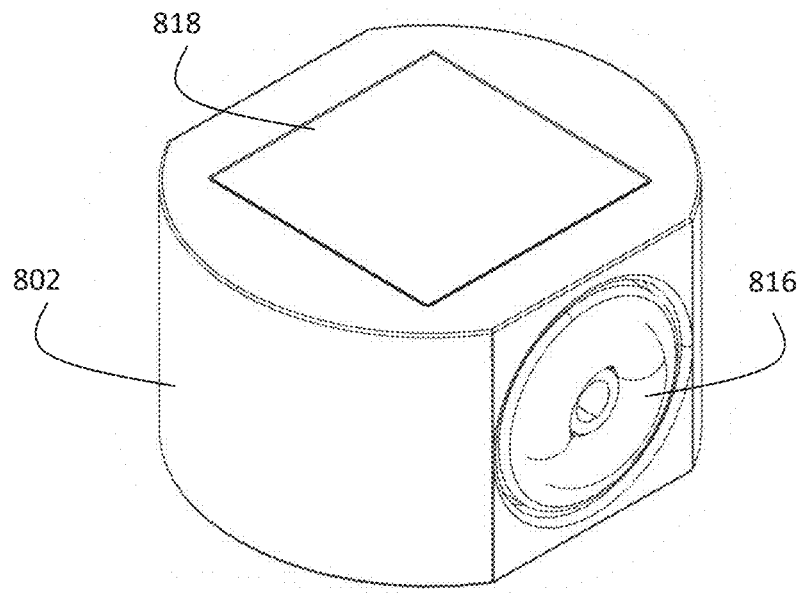
FIG. 8F shows a perspective view of the bioreactor.

FIG. 8F shows a perspective view of the bioreactor 802. One of the fluid ports 816 is shown. Also, a top opening 818 is shown. The opening allows the lid (e.g., microfluidic lid plate 810) to form the lid and the optical lens, which can be used for optical monitoring of the tissue construct. The bioreactor 802 can be configured in accordance with the descriptions for bioreactor 100 described herein. The side cavities for the hydrogel around the port tubes at the interface can be provided in bioreactor 802. The top opening 818 can also be used for introducing the tissue construct into the bioreactor chamber.

Figure 8G:
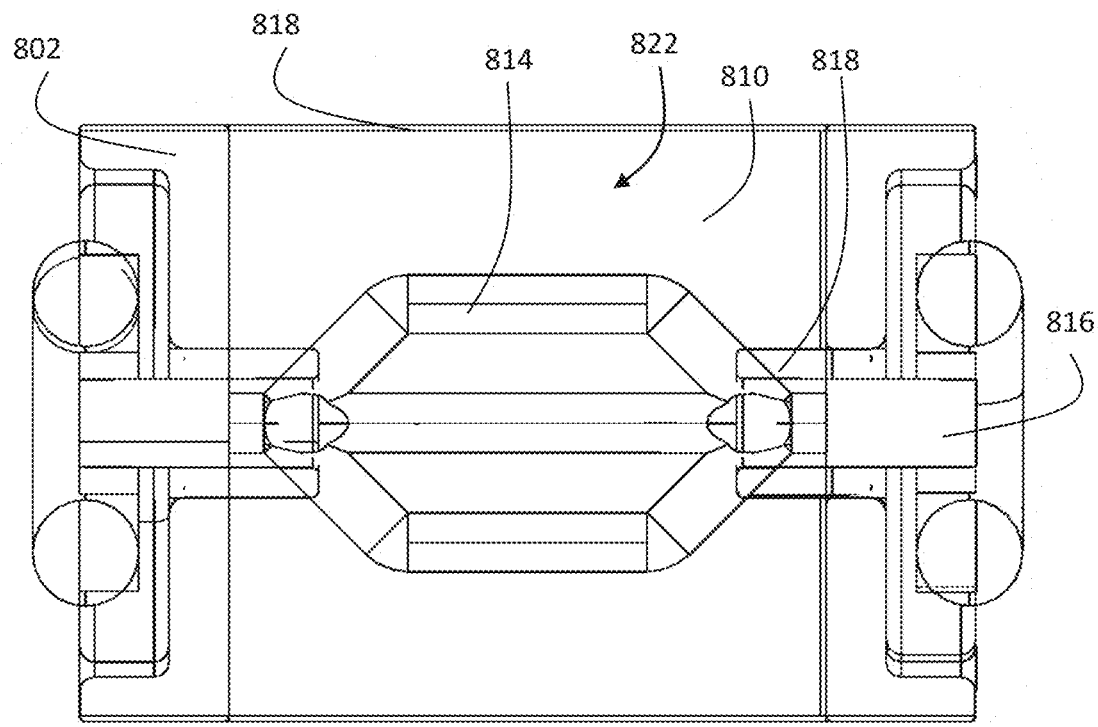
FIG. 8G shows a cross-sectional view of the bioreactor having the tissue construct with the branched lumen network.

FIG. 8G shows a cross-sectional view of the bioreactor having the tissue construct 810 with the branched lumen network 814 in the tissue chamber 822. The branched lumen network 814 is fluidly coupled with the fluid ports 816. The side cavities 818 for the hydrogel around the port tubes at the interface can be provided in bioreactor 802.

Figure 8H:
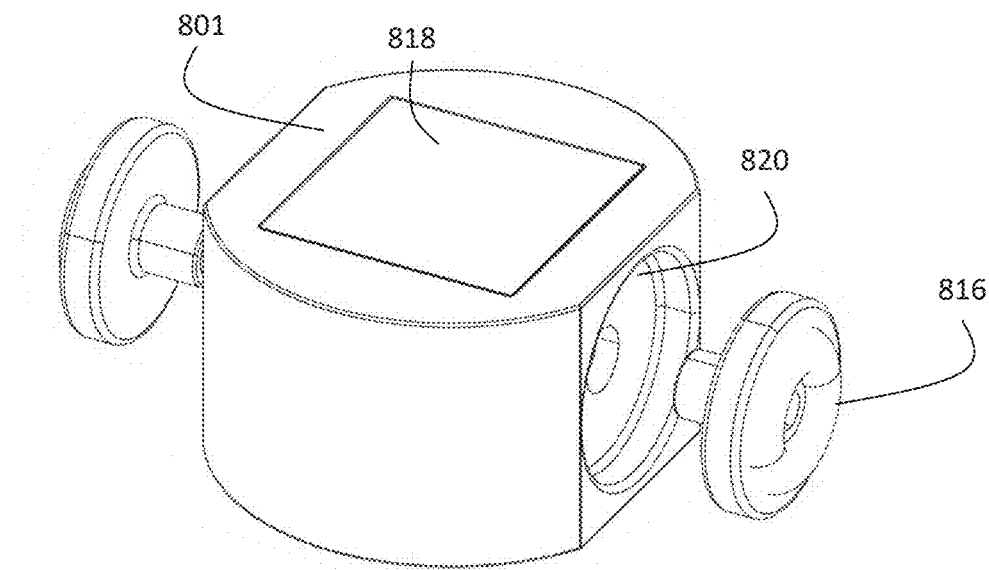
FIG. 8H shows a perspective exploded view of the bioreactor.

FIG. 8H shows a perspective exploded view of the bioreactor 802. This shows the fluid ports 816 separate from the bioreactor body 801. As such, the port receiver 820 is shown.

Figure 8I:
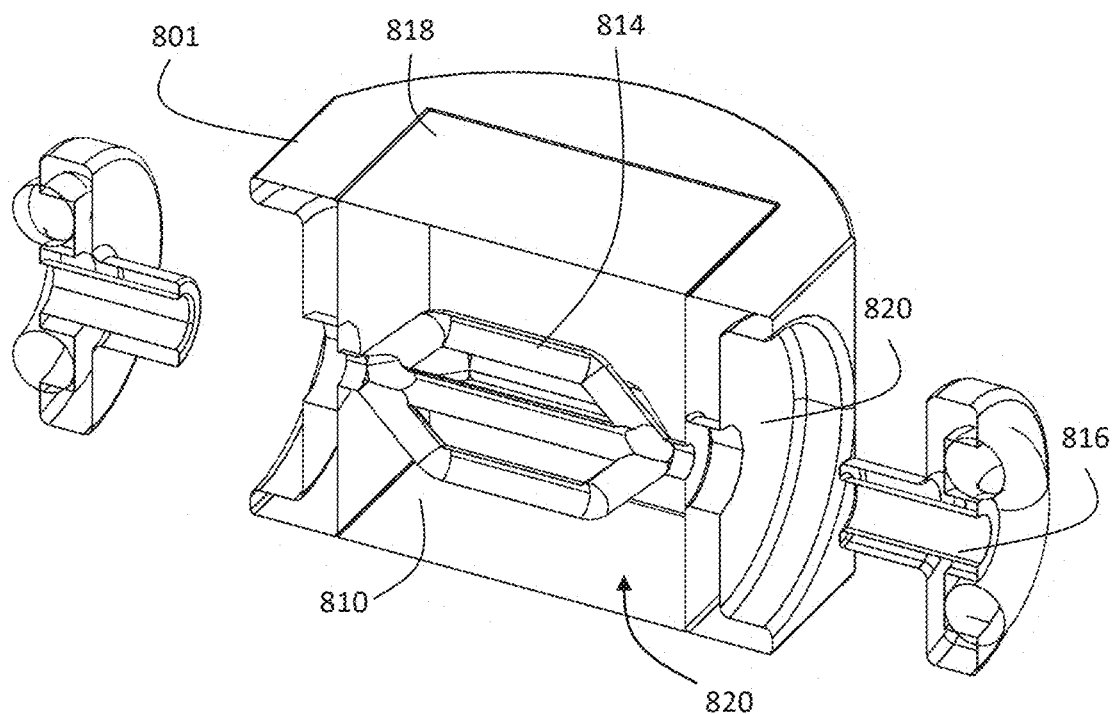
FIG. 8I shows a cross-sectional exploded view of the bioreactor having the tissue construct with the branched lumen network.

FIG. 8I shows a cross-sectional exploded view of the bioreactor having the tissue construct 810 with the branched lumen network 814.

Manufacturing

In some embodiments, the manufacture of a vascularized 3D tissue can include computationally designing a vasculature lumen network for a specific tissue in a specific tissue chamber size and shape. These parameters can be used to determine the size, shape, and placement of each lumen as well as the spacing between adjacent lumen, which can include lumen of different sizes. Then, the hydrogel can be prepared by obtaining one or more pre-hydrogel mixtures with or without seeded nutrients and/or with or without seeded live cells. The sacrificial material composition can also be obtained. The hydrogel can then be formed to include the sacrificial material therein in the shape, size, and spacing of the vascular lumen network. The sacrificial material is removed to realize the computationally designed vascularized specific tissue mimic. The oxygen and diffusion amounts and rates can then be used to support growth of the vascularized tissue in the bioreactor.

In some embodiments, the vasculature lumen network is loaded with a cell culture of vascular endothelial cells to mimic blood vessels. Also, the hydrogel can be loaded with vascular endothelial growth factor to facilitate vascular tissue growth. The body of the hydrogel bounding the lumen can include cells of certain tissues or organs in order to mimic those tissues or organs. There can be an interface between the blood vessel tissue and the tissue body. The body can include a plurality of different culture types to mimic the tissue of an organ. The types of cells in the hydrogel can be determined by selecting the organ that the 3D tissue culture is designed to mimic.

In some embodiments, the 3D vascular tissue construct can be obtained by bioprinting. Bioprinting is known as the process for creating living tissues, such as blood vessels, hard tissues, soft tissues, organs, such as liver, kidney, heart, brain, or skin as well as others, by additive manufacturing using 3D printing technologies with biological materials, including cells, matrices, and synthetic materials (e.g., hydrogels).

In some embodiments, media containing certain one or more cell types can be perfused through the body of the hydrogel, such as from the top (e.g., from annular conduit) as well as from the lumen network. The endothelial cells can be introduced to the surface of the lumen network to form the vascular cell layer. This allows for the body to include one or more cell types for simulating a tissue, and the surface of the lumen network to simulate the blood vessel network in the simulated tissues.

In some embodiments, the hydrogel can be prepared from any synthetic hydrogel. These hydrogels can be loaded with growth factors and other materials for cell growth. The hydrogels can also include natural materials that can form the matrix material. The hydrogels can be crosslinked or not. In some aspects, the hydrogel can include a collagen methacrylate, which includes a type-1 collagen that is engineered to include methacrylamide groups, which can be used with or without crosslinking. However, other types of hydrogels can be used.

In some embodiments, the hydrogel can include a natural component, such as substances obtained from natural tissues. In some aspects, the natural component can be placenta tissue, which is combined with the hydrogel base, such as gelatin methacrylate.

In some embodiments, the shape of bioreactor or constraining features therein can be modulated as understood in order to obtain the fluid tight coupling at the interface of the hard (harder) materials of inlet port members and outlet port members the bioreactor and the softer flexible hydrogel material. The bioreactor can be used to grow large constructions, which can be greater than 3 millimeters, greater than 1 cm, greater than 2.54 cm, greater than 10 cm, or larger, or the actual size of an actual organ being simulated. The vascularized tissue constructs that have flow channels incorporated therein can be used to simulate tissue vasculature. The vasculature can be designed and prepared to provide a lumen network with shape, sizing, and spacing for the optimal provision of oxygen and nutrients to the cells within the body of the hydrogel. The bioreactor can be used with a system to obtain optimal growth of tissue constructs, which requires flow of cell culture medium, a blood-like fluid that provides cells with nutrients and oxygen, and that can transport cell generated waste away from those same cells. Further, oxygenated cell culture medium, like blood, provides sufficient oxygen to meet cell metabolic needs. This arrangement of the vascularized tissue construct can be configured as a biomimetic of any tissue that closely represents the specific in vivo morphology of the target tissue, such as a tissue or organ from a human body.

The construction of the bioreactor can be performed by known methods supplemented with the information provided herein, which can build the cell culture device and hydrogel having the lumen network. The following methods describe some of the methods.

In some embodiments, a sacrificial structure of the lumen network can be fabricated, such as by printing, extrusion, casting, molding, or other method. Once obtained, the fabricated lumen network is placed in the tissue culture chamber of the device. Then, the hydrogel is formed around the lumen network structure, which may or may not include crosslinking. The hydrogel can be configured to have the desired hydrogel properties, such as porosity, elastic modulus, or other parameter. After the hydrogel is formed, the sacrificial structure is removed from the hydrogel, such as by dissolving or other removal. For example, the sacrificial structure can be water soluble so that changes in water temperature can dissolve the sacrificial structure to leave the lumen network.

In some embodiments, the vascularized construct is prepared by forming the hydrogel to have the lumen network there without a sacrificial material. The hydrogel can be formed during the process to have the lumen network. For example, the method can include stereolithography, holographic printing, embedded printing, multi-material printing, bioprinting, or the like. Then, the pre-vascularized construct can be placed in the tissue culture chamber and the inlet and outlet port members can be placed to form the connection to the lumen network.

In some embodiments, the vascularized construct is prepared by forming the hydrogel to have the lumen network directly in the tissue culture chamber without a sacrificial material. The hydrogel can be formed during the process to have the lumen network. For example, the method can include stereolithography, holographic printing, embedded printing, multi-material printing, bioprinting, or the like. The inlet and outlet port members can be placed in the culture device before or after forming the hydrogel, in order to form the connection to the lumen network.

Additionally, extrusion methods may be used to prepare the lumen in the hydrogel. In some embodiments, a coaxial extruder can be provided that includes core and shell extruder orifices, where the shell extruder is around the core extruder in a concentric configuration. This allows for the core and shell to be extruded simultaneously. The extrusion can include the shell being a lumen material and the core being gas or a sacrificial material. The coextrusion can be performed onto a substrate or into a hydrogel matrix. The coextrusion can form a first lumen structure with or without the sacrificial material. Then, a second lumen structure can be formed by penetrating the coaxial nozzle into the first lumen that was formed. This process can be repeated with the same size coaxial nozzles or different sized coaxial nozzles where the larger lumen are printed first and then successively smaller coaxial nozzles are printed into the larger lumen of a prior printed lumen.

Figure 17:
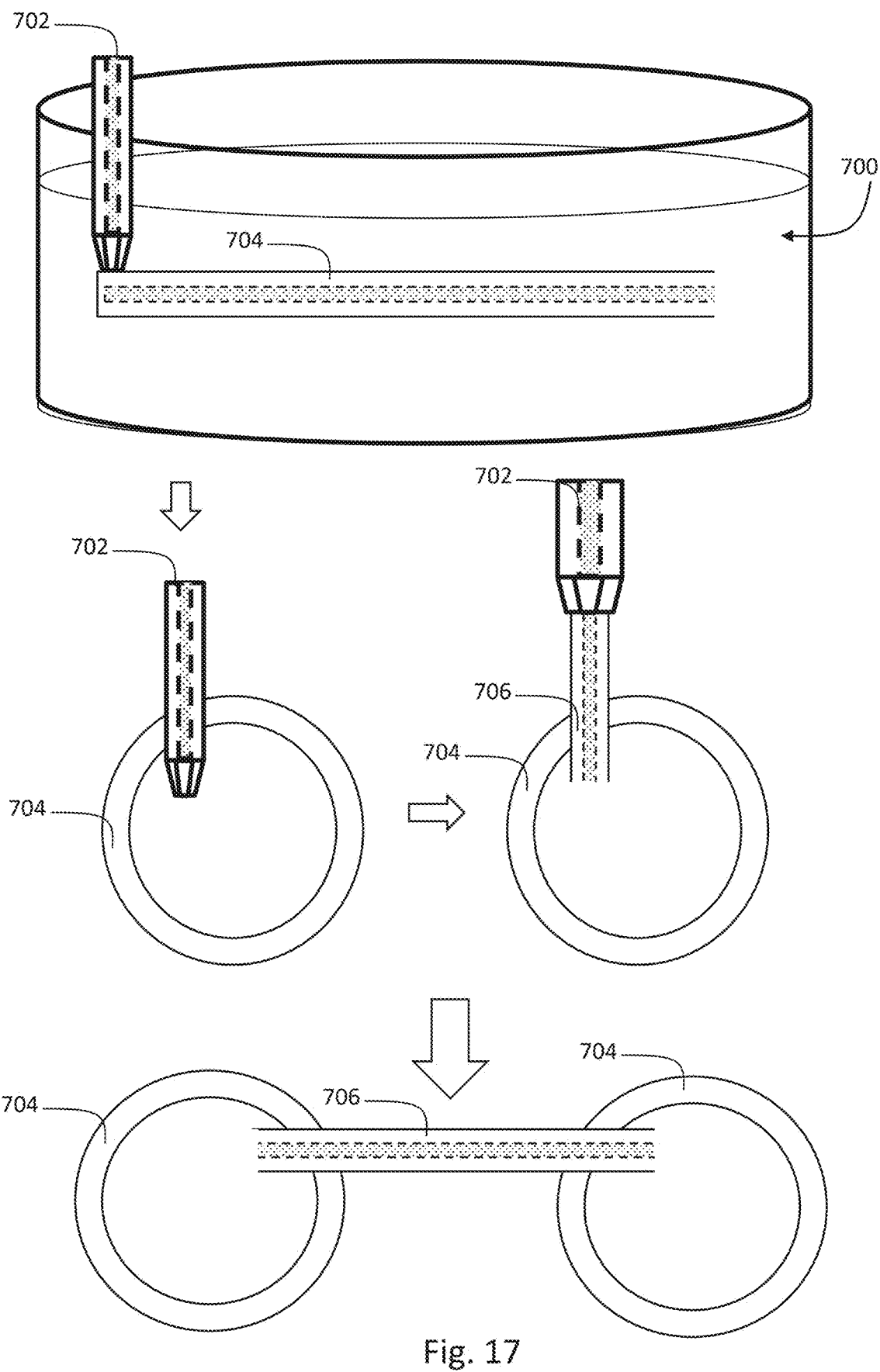
FIG. 17 includes a schematic representation of a protocol for a coaxial nozzle printing method for forming tubes and interconnected tubes in networks to simulate vasculature networks in a tissue construct.

FIG. 17 shows a scheme for forming lumen in a hydrogel matrix, in air, or in a support bath (e.g., support liquid). As shown, a support bath 700 is provided and a coaxial nozzle 702 extrudes or prints a tube 704 into the support bath 700. The tube 704 is configured as a shell and core with the shell being a tube forming material and the core being a sacrificial material, air, or a liquid that can be removed from the shell tube. The core may be printed as pressurized air to hold the outer shell as a tube having a lumen. Next, a smaller coaxial nozzle 702 can pierce the tube 704 into the lumen thereof, and then print another tube 706 to form a tube extending from the first tube 704. This shows how a branch can be formed in a network. Also, the smaller coaxial nozzle 702 printing the smaller lumen 706 can be pierced into a second tube 704 to then provide an end of the smaller tube 706 in the second tube 704. This can be used to cross-connect two different tubes. For example, this can be used to cross-connect an arterial tube (e.g., left) with a venous tube (e.g., right), which can make for a tube network connection. This tube network connection in the hydrogel forms the lumen network described herein for the vascularized tissue construct.

EXAMPLES

A bioreactor intended for a 1 $cm^3$ tissue construct with side shoulder cavities for constraint of the hydrogel surrounding the bioreactor interfaces is shown in FIGS. 1A-1I. The bioreactor was designed in DSW Solidworks and includes of a 1 $cm^3$ tissue chamber, such as cubed with side cavities having 7 mm side length and about 6 mm diameter.

The bioreactor was fabricated by SLA printing on a FormLabs Form 3 using Formlabs BioMed Clear resin. The UV curable resin is crosslinked via laser and the z-height is 100 µm. Parts were oriented with the major circular component oriented perpendicular to the build plate to reduce peel deformation. Printed parts are rinsed in 70% isopropanol for 20 minutes with agitation followed by additional hand cleaning and removal of support material. To improve imaging, the base was sanded and then covered with a thin layer of resin to improve optical clarity and reduce lensing effects.

The reactor was tested for quality assurance by dead end pressurization of the assembled reactor with nitrogen at 10-15 psi. The reactor was sprayed with a dilute surfactant solution and observed for bubble generation To produce the vascularized tissue construct, a hydrogel matrix of collagen with methacrylamide groups and placenta was cast about a tubular network, which was removed after crosslinking the vasculature. In some aspects, this was accomplished simply by inserting and later removing a PTFE sheathed 24 gage needle passed through both the inlet and outlet. For more complex flow paths, a 3D printed, sacrificial network with a single inlet and outlet was placed into the tissue chamber and the sacrificial network was removed by dissolution after casting. The vascular channels are generally less than 1 mm in diameter and near 1 mm at the inlet and outlet to match the internal diameter of the interfaces.

Figure 9:
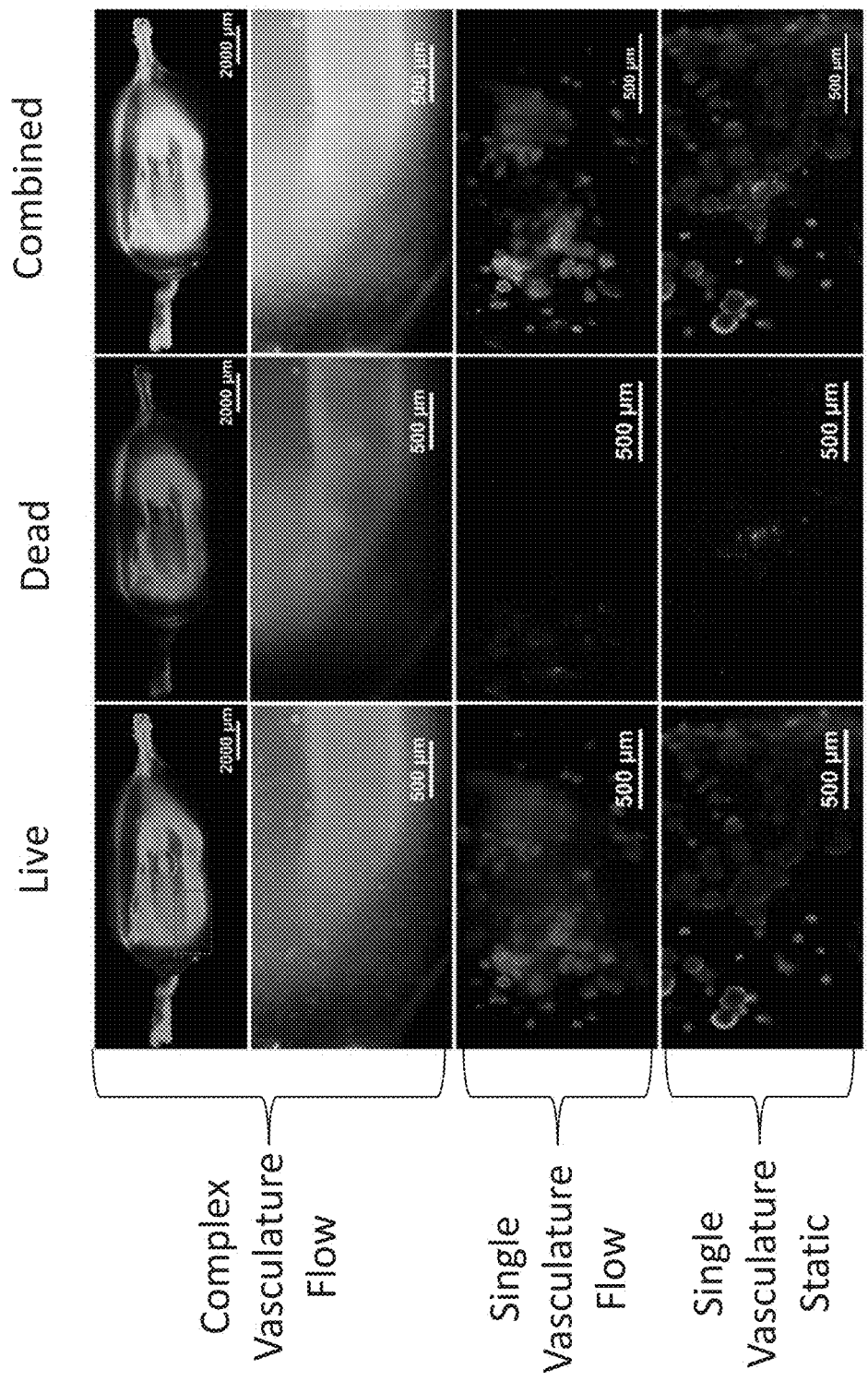
FIG. 9 illustrates the viability of cells contained in the bioreactor with complex vasculature and simple vasculature with a single flow path, and shows a simple vasculature with static culture.

Cells, such as the HEPG2 hepatic cell line, were mixed into a hydrogel precursor solution at a concentration of $1 \times 10^6$ cells/mL. After mixing, the cells were cast into the bioreactor, the reactor was cleared of excess hydrogel via needle and perfused with cell culture medium. The reactor was then connected to a flow loop 260 as shown in FIG. 4. The flow loop was first primed without the reactor and then connected to the reactor within a biological safety cabinet to maintain sterility before it was placed into a peristaltic pump to ensure flow through the closed loop. The viability of cells contained in the bioreactor with complex vasculature, simple vasculature (single flow path), and in a static culture are shown in FIG. 9. The reactor was demonstrated to enhance tissue viability through incorporation of more flow paths with continuous perfusion.

Computational design was also utilized. Optimization of the flow rate, number of channels, channel diameter, and orientation of channels can ensure sufficient oxygen tension throughout the construct to meet the metabolic needs of specific cell types.

FIGS. 10A-10C, 11A-11C, and 12A-12C demonstrate optimization of channel number and channel size for physiologically relevant flow rates. Further optimization of flow paths can be accomplished through modeling of pressure drop and local flow rate throughout the construct with the goal of maintaining specific values or tolerances.

Figure 10A:
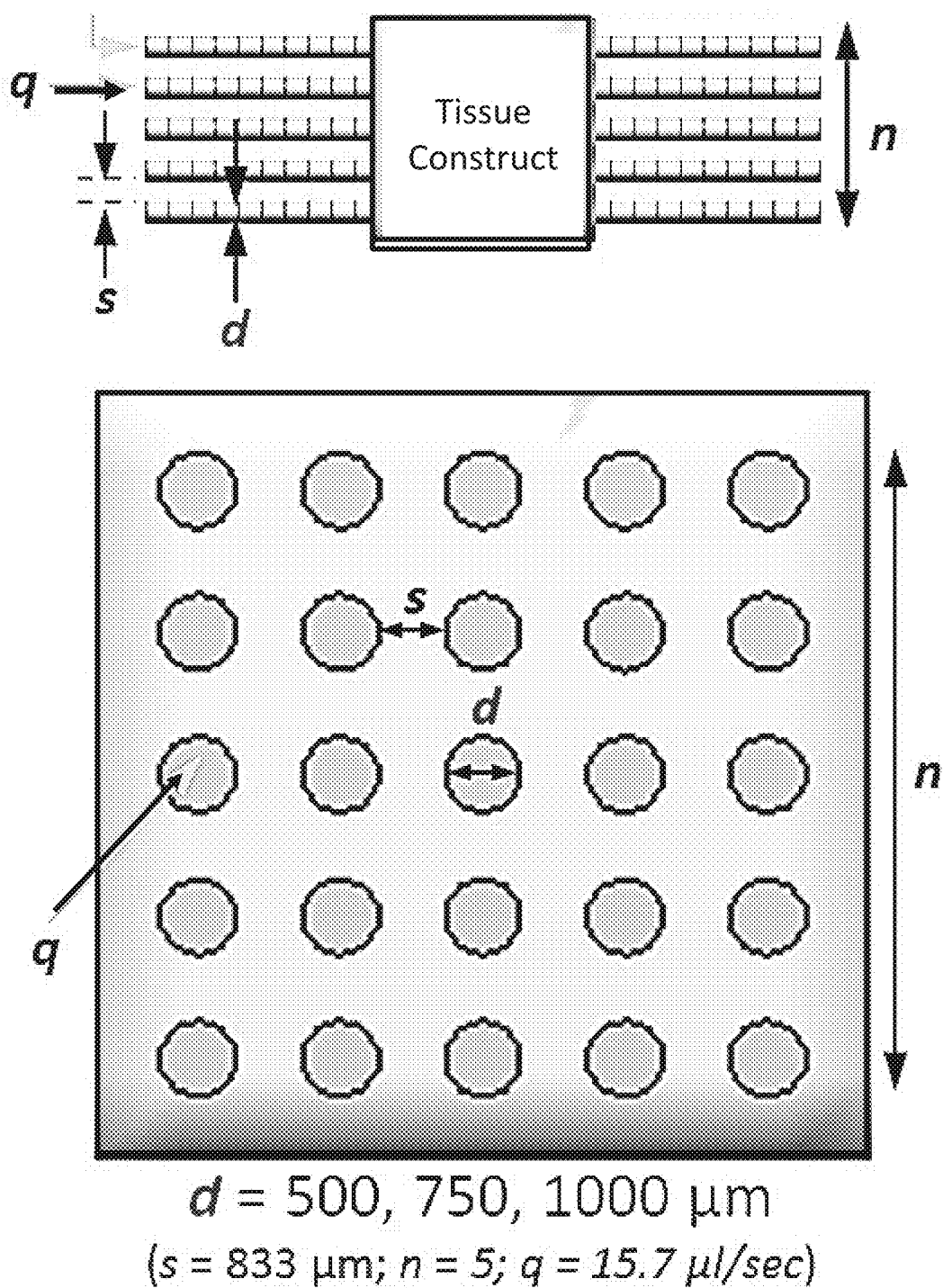
FIG. 10A illustrates an experimental tissue construct with variable parameters for studying cell oxygenation and other parameters.
Figure 10B:
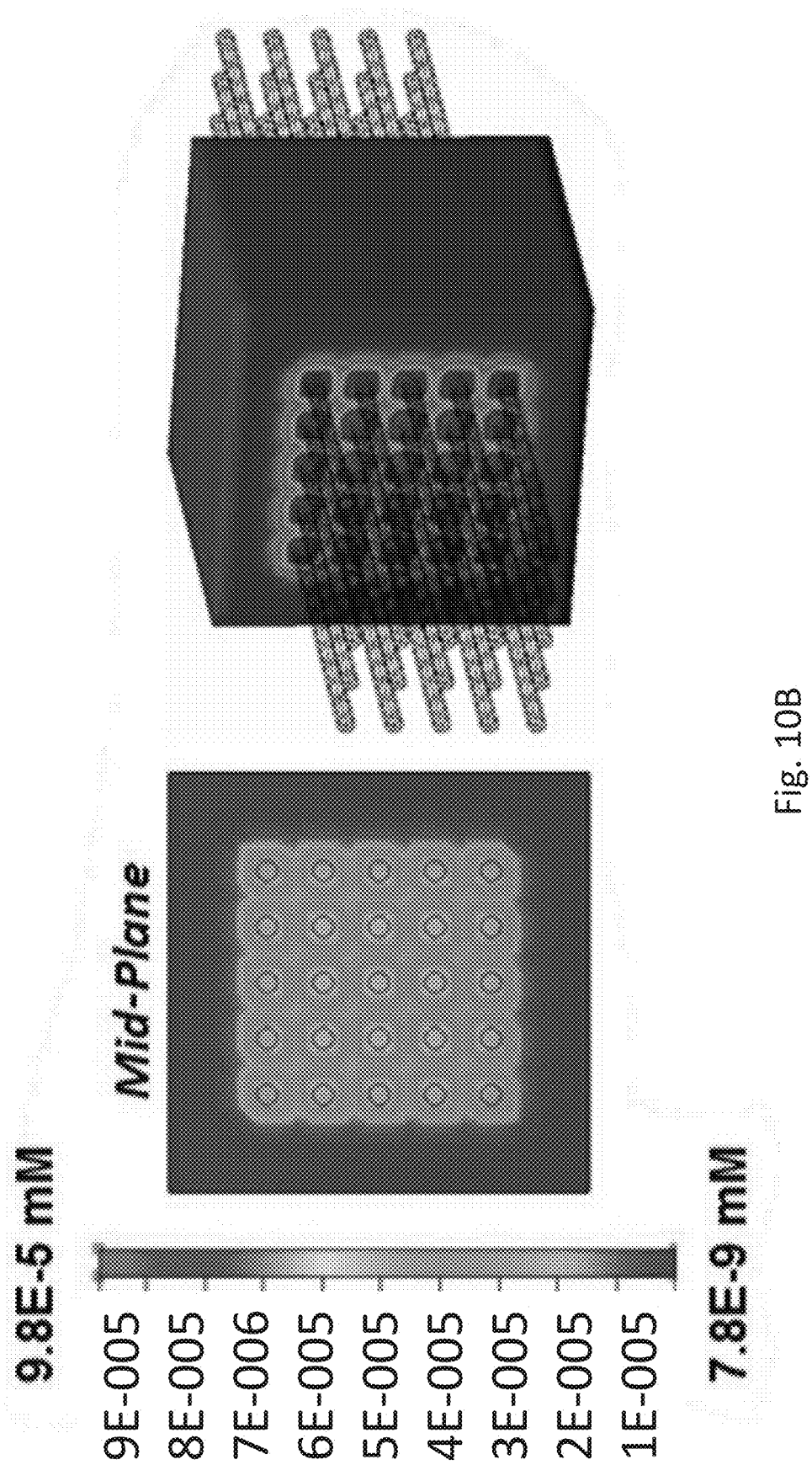
FIG. 10B illustrates oxygen diffusion from the vasculature pathways in the experimental tissue construct.
Figure 10C:
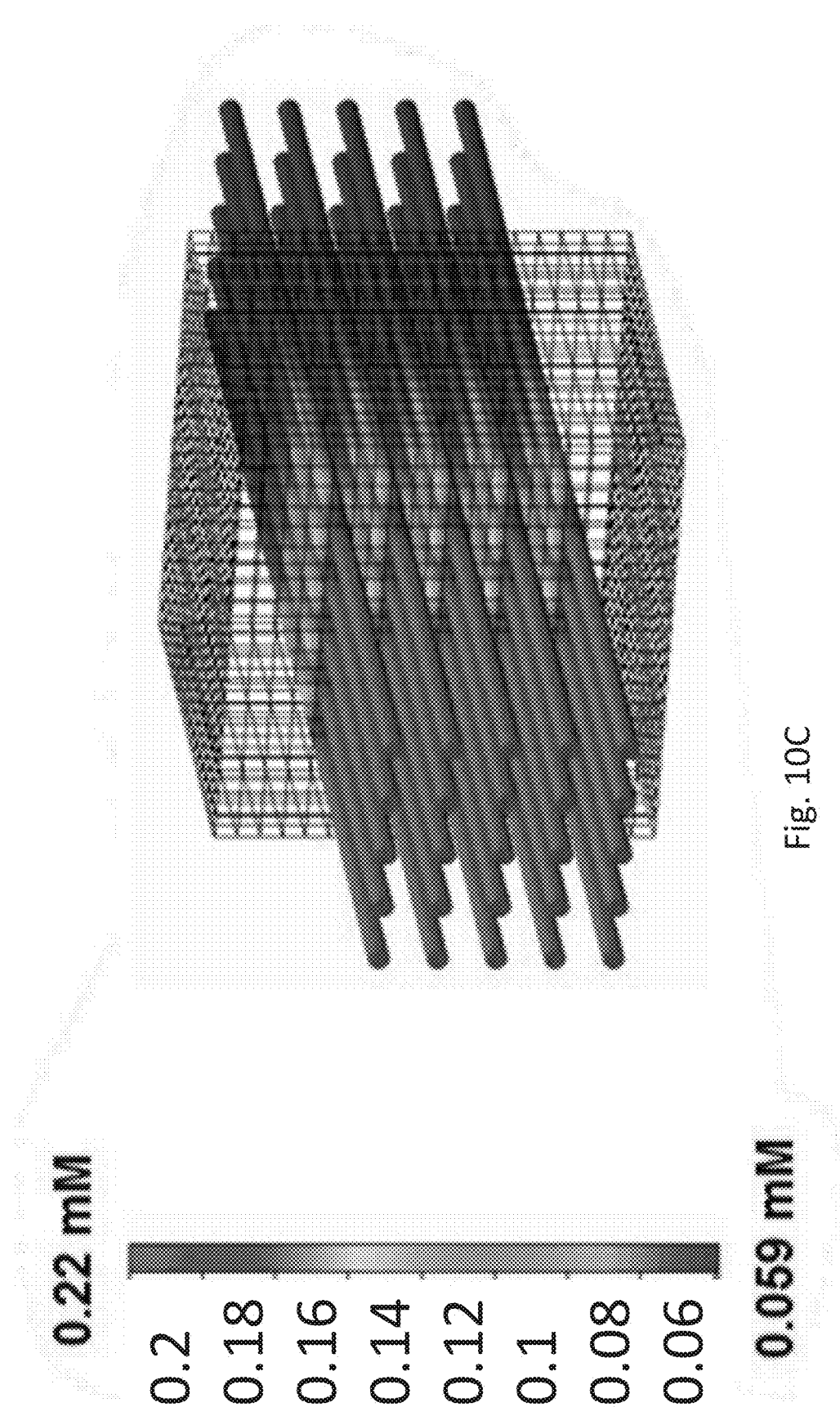
FIG. 10C illustrates the oxygen saturation from the inlet to the outlet.

FIG. 10A shows the tissue construct having the channels in an array, with a channel separation distance of "s" being 833 microns and a diameter of "d" being 500 microns, 750 microns, and 1000 microns for three different tissue constructs. The effect of channel diameter is studied. The flow rate "q" is 15.7 µL/sec. The number of rows "n" is five. FIG. 10B shows the result of the study showing the effect of channel diameter on oxygen perfusion through the tissue construct. The concentration of oxygen in the inlet medium was 0.22 mM, and the oxygen metabolism kinetics can be studied. The tissue construct was 1 cm in each dimension square. FIG. 10C shows the oxygen diffusion changing along the length of the channel from the 0.2 mM to 0.06 mM. The corresponding average tissue concentration (mM) showed saturation as 2.0E-5 mM for all studies.

Figure 11A:
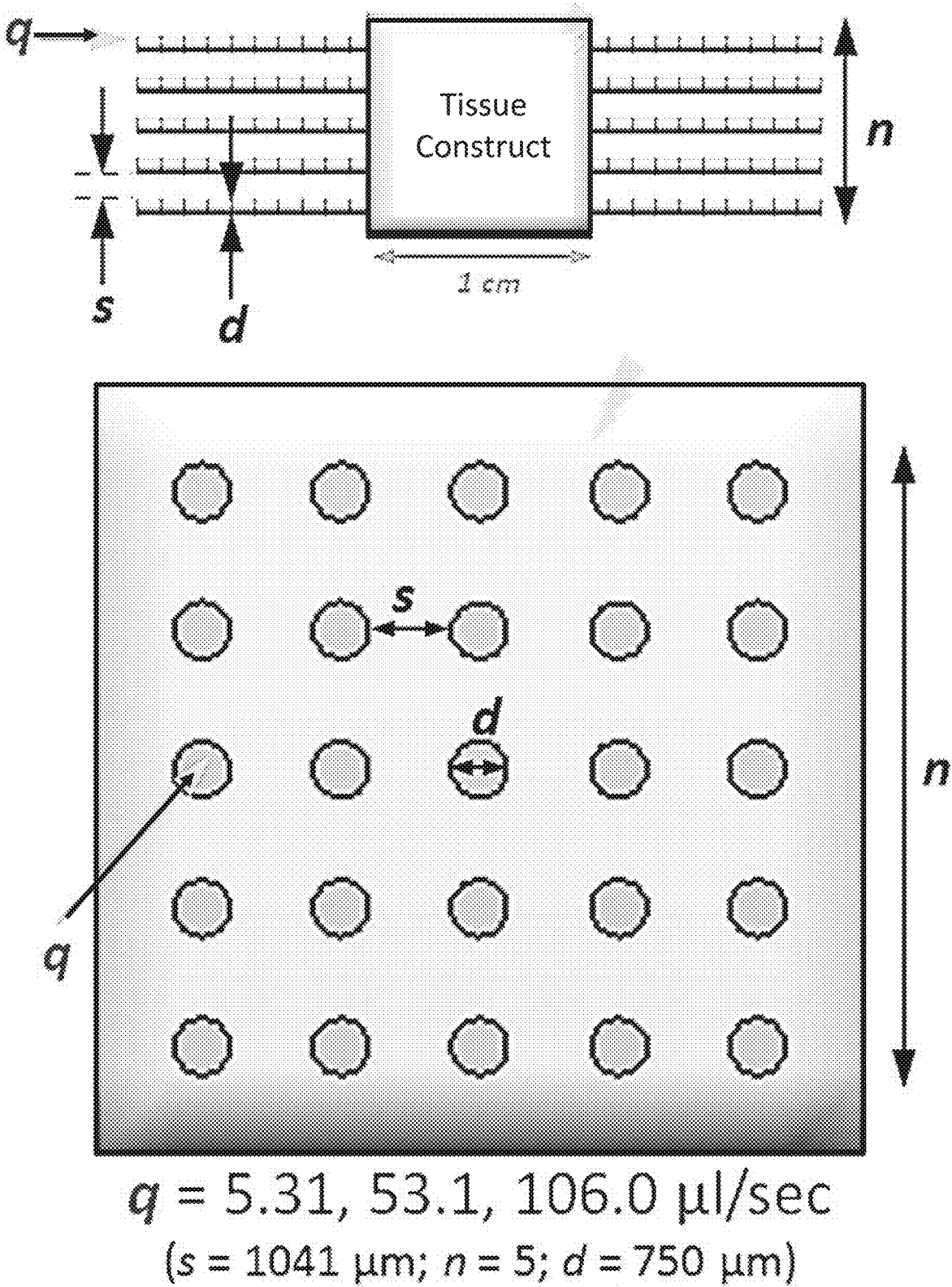
FIG. 11A illustrates an experimental tissue construct with variable parameters for studying cell oxygenation and other parameters.
Figure 11B:
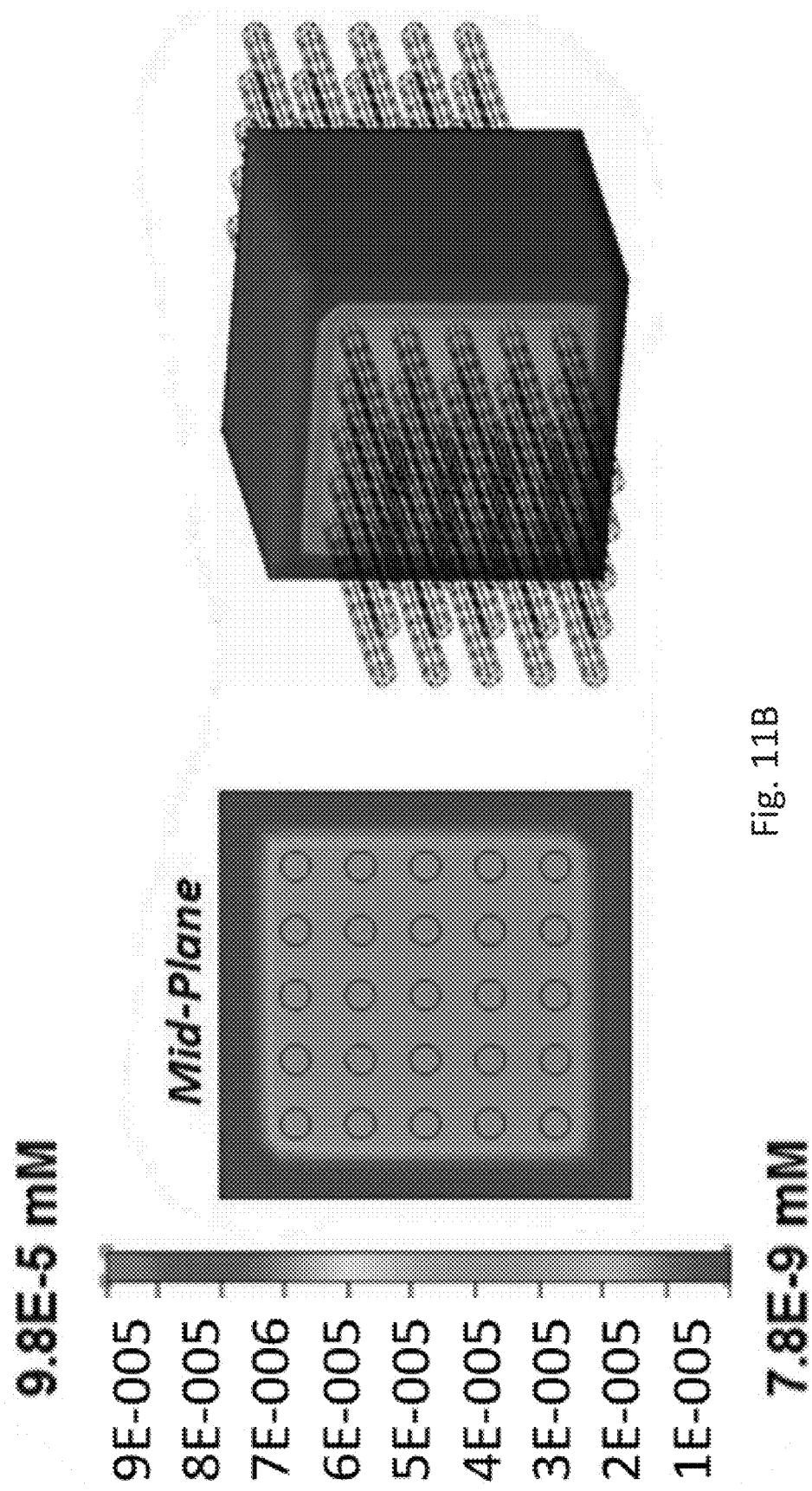
FIG. 11B illustrates oxygen diffusion from the vasculature pathways in the experimental tissue construct.
Figure 11C:
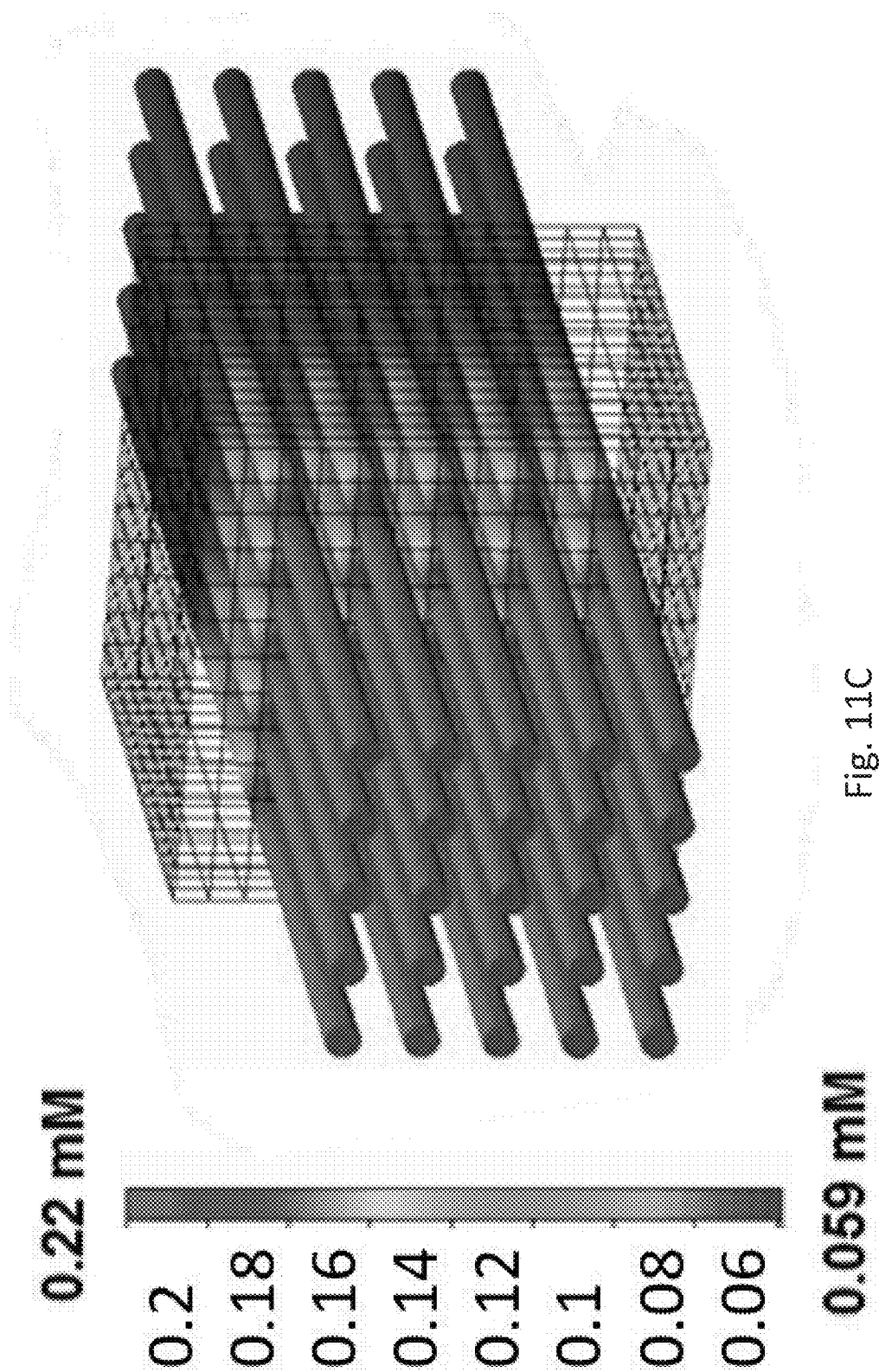
FIG. 11C illustrates the oxygen saturation from the inlet to the outlet.

FIG. 11A shows the tissue construct having the channels in an array, with a channel separation distance of "s" being 1041 microns and a diameter of "d" being 750 microns. The flow rate "q" is 15.31 µL/sec, 53.1 µL/sec, and 106.0 µL/sec for three different tissue constructs. The effect of channel flow rate is studied. The number of rows "n" is five. FIG. 11B shows the result of the study showing the effect of channel diameter on oxygen perfusion through the tissue construct. The concentration of oxygen in the inlet medium was 0.22 mM, and the oxygen metabolism kinetics can be studied. The tissue construct was 1 cm in each dimension square. FIG. 11C shows the oxygen diffusion changing along the length of the channel from the 0.2 mM to 0.06 mM.

Figure 12A:
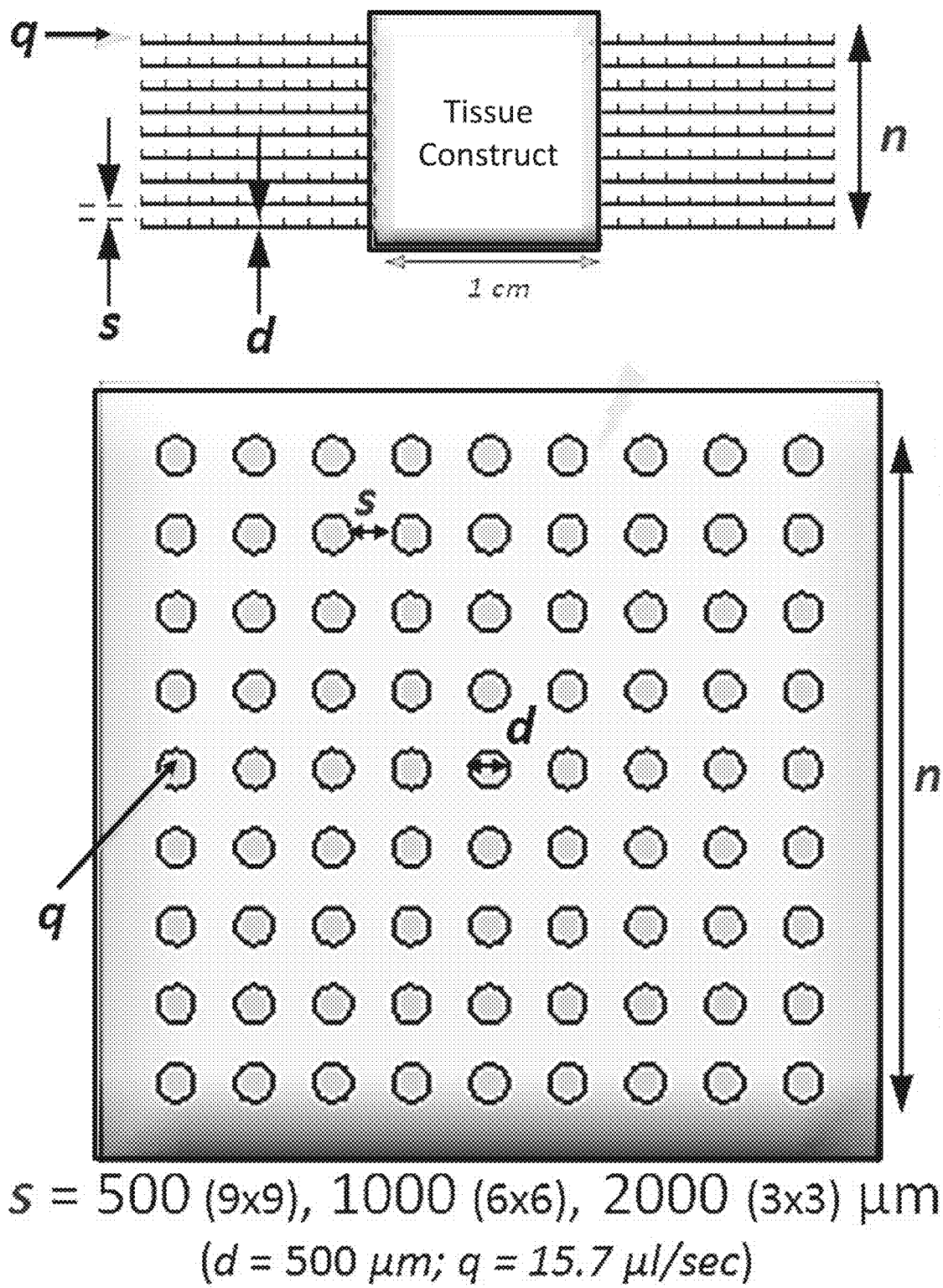
FIG. 12A illustrates an experimental tissue construct with variable parameters for studying cell oxygenation and other parameters.
Figure 12B:
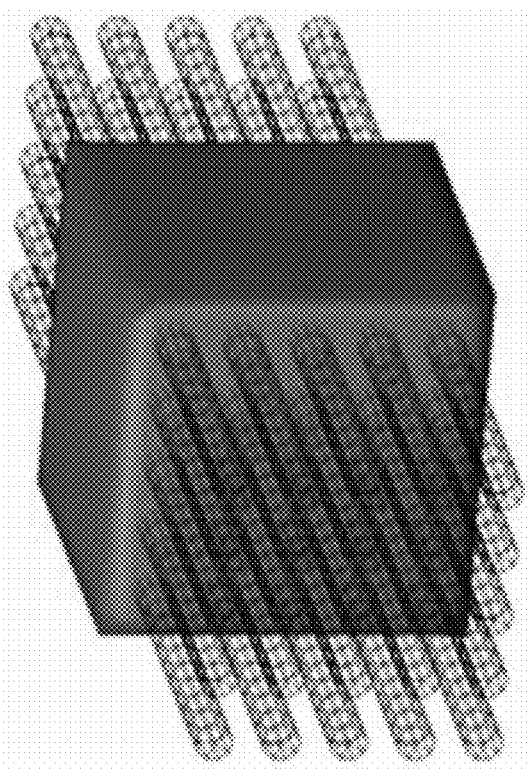
FIG. 12B illustrates oxygen diffusion from the vasculature pathways in the experimental tissue construct.
Figure 12B:
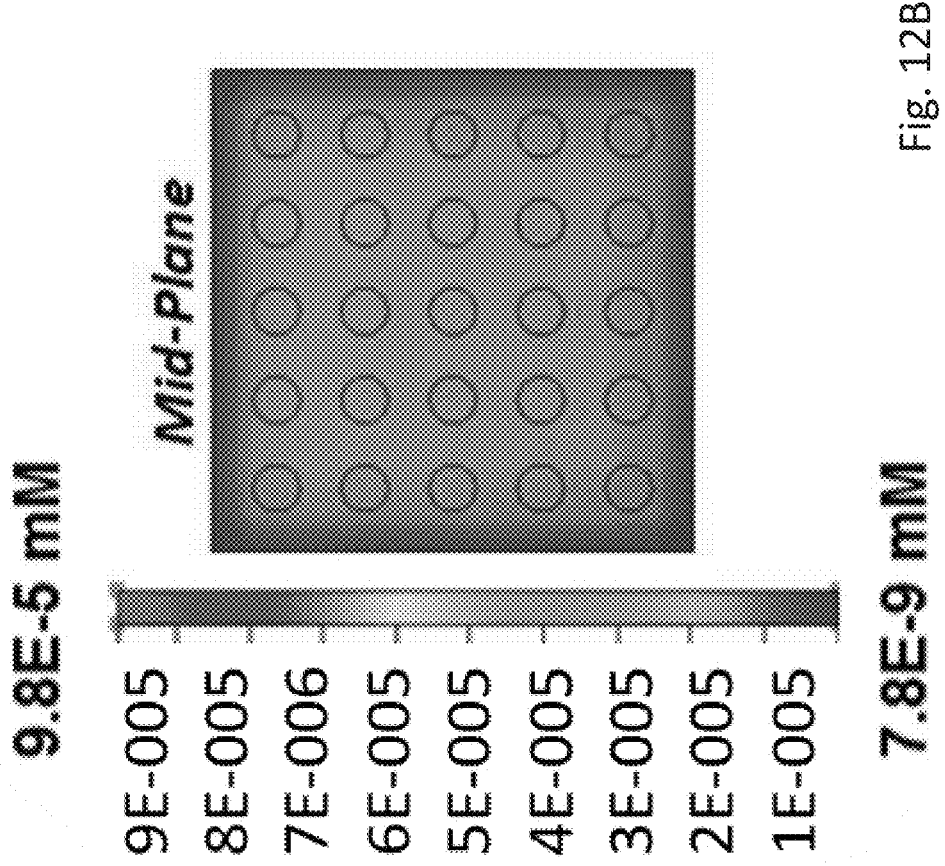
Figure 12C:
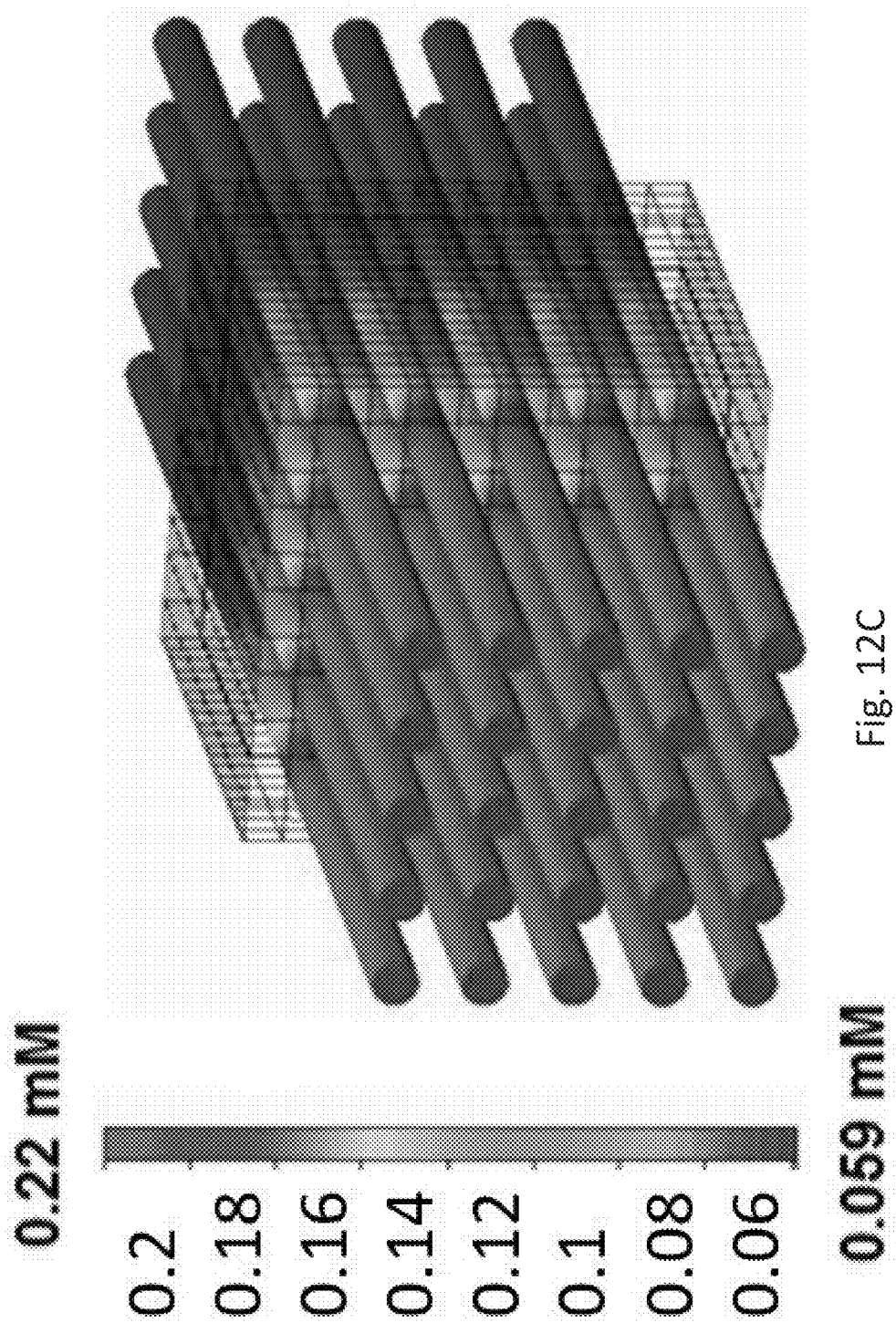
FIG. 12C illustrates the oxygen saturation from the inlet to the outlet.

FIG. 12A shows the tissue construct having the channels in an array, with a channel separation distance of "s" being 500 microns (n is 9), 1000 microns (n is 6), and 2000 microns (n is 3). A diameter of "d" being 500 microns. The flow rate "q" is 15.7 µL/sec. FIG. 12B shows the result of the study showing the effect of channel diameter on oxygen perfusion through the tissue construct. The concentration of oxygen in was 0.22 mM, and the oxygen metabolism kinetics can be studied. The tissue construct was 1 cm in each dimension square. FIG. 12C shows the oxygen diffusion changing along the length of the channel from the 0.2 mM to 0.06 mM.

Figure 13A:
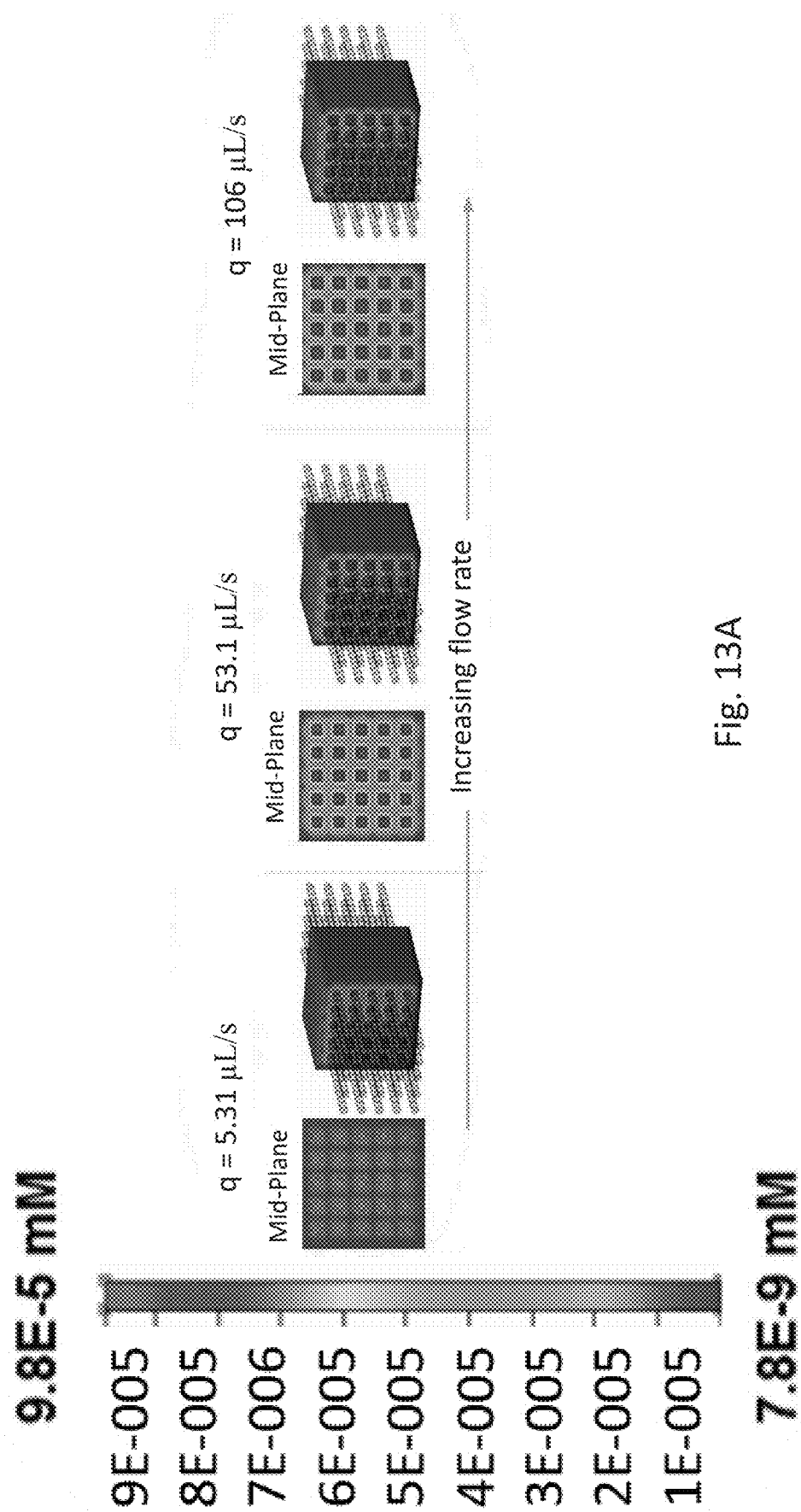
FIG. 13A includes simulation data that shows oxygen perfusion in a tissue construct having channels in an array.
Figure 13B:
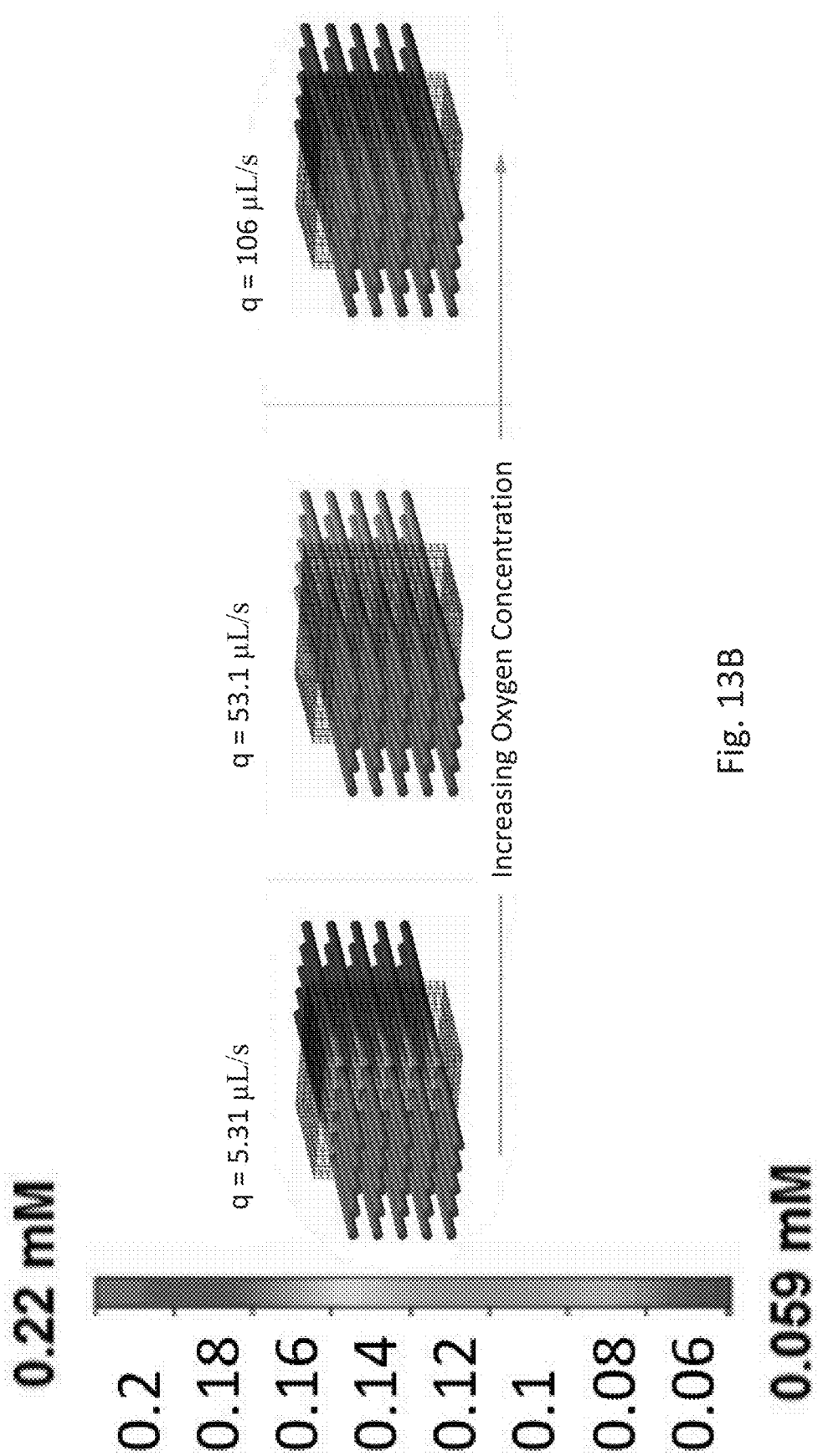
FIG. 13B includes simulation data that shows the oxygen concentration for the tissue constructs of FIG. 13A.
Figure 13C:
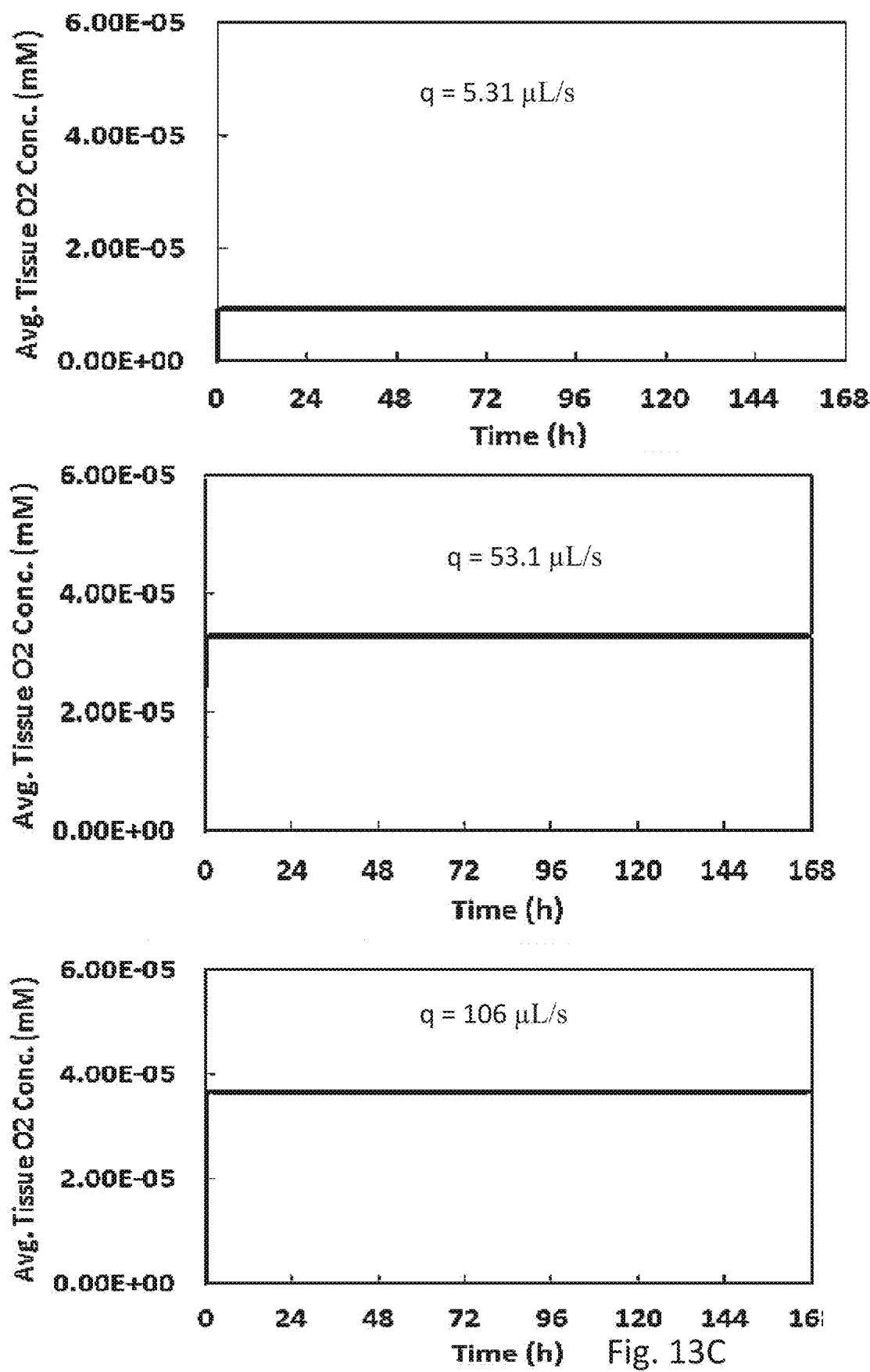
FIG. 13C includes graphs that show the average tissue oxygen concentration (mM) over time for the tissue constructs of FIG. 13A.

FIG. 13A shows oxygen perfusion in a tissue construct having channels in an array, with a channel diameter of 750 microns and a flow rate of 5.31 µL/s, 53.1 µL/s, and 106 µL/s. FIG. 13B shows the oxygen concentration for the tissue constructs of FIG. 13A. FIG. 13C shows the average tissue oxygen concentration (mM) over time for the tissue constructs of FIG. 13A. The similarity of the flowrates of 53.1 µL/s and 106 µL/s indicate a maximum flow rate with saturation can be achieved.

Figure 14A:
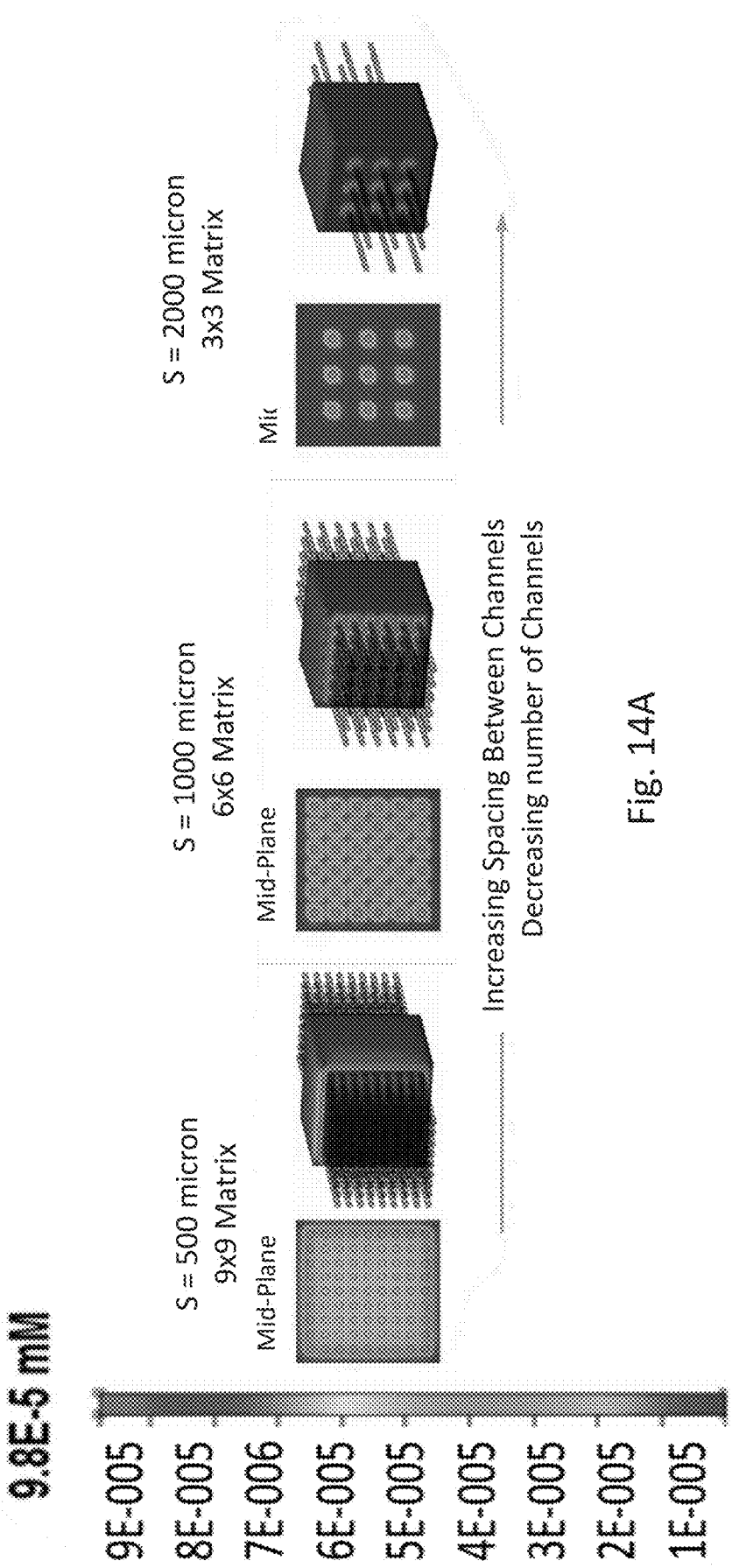
FIG. 14A includes simulation data that shows oxygen perfusion in a tissue construct having channels in an array, with a channel diameter of 500 microns and a flow rate "q" is 15.7 L/sec.
Figure 14B:
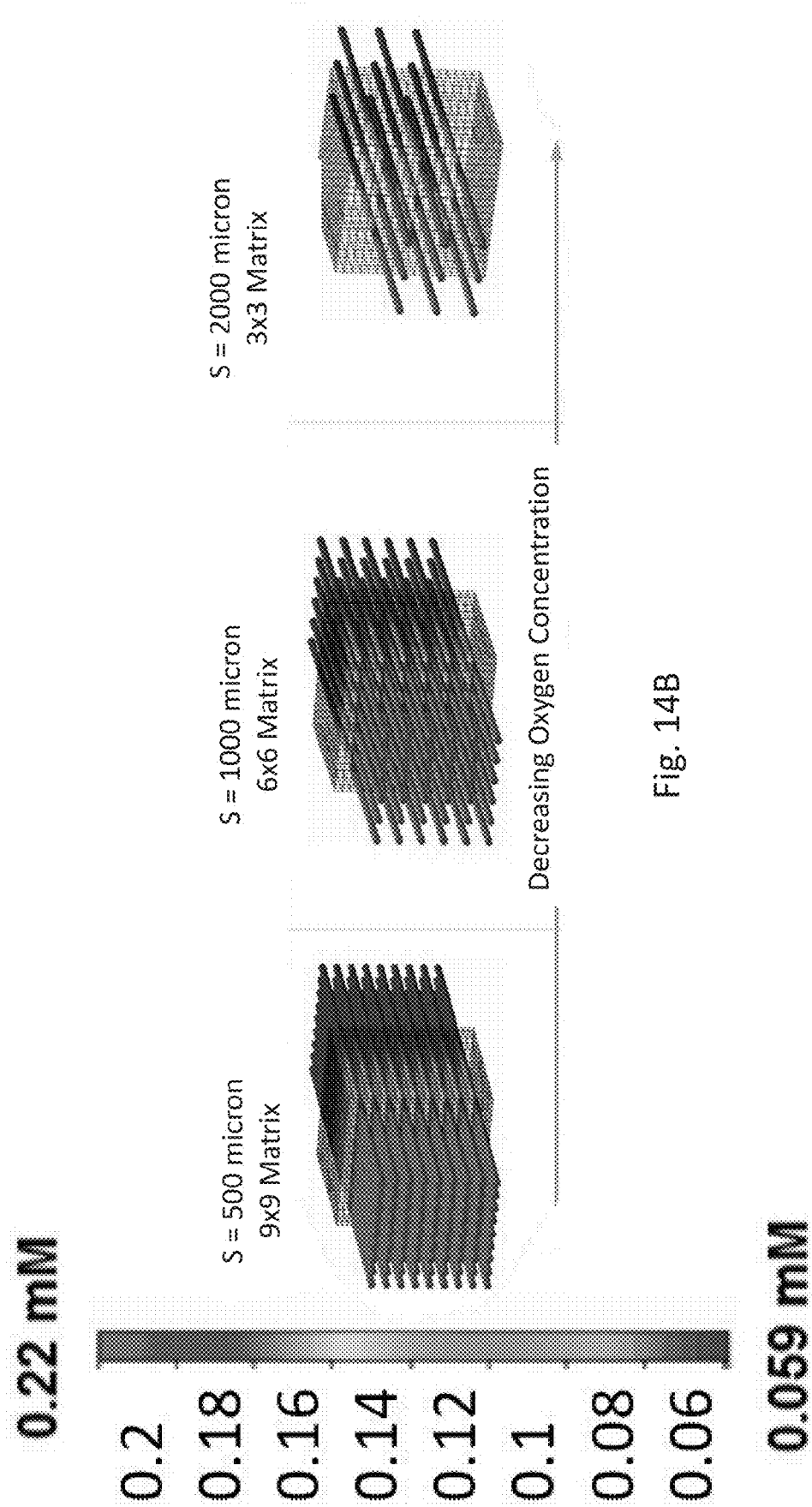
FIG. 14B includes simulation data that shows the oxygen concentration for the tissue constructs with spacing being "s" is 500 microns with a 9×9 matrix, 1000 microns with a 6×6 matrix, or 2000 microns with a 3×3 matrix.
Figure 14C:
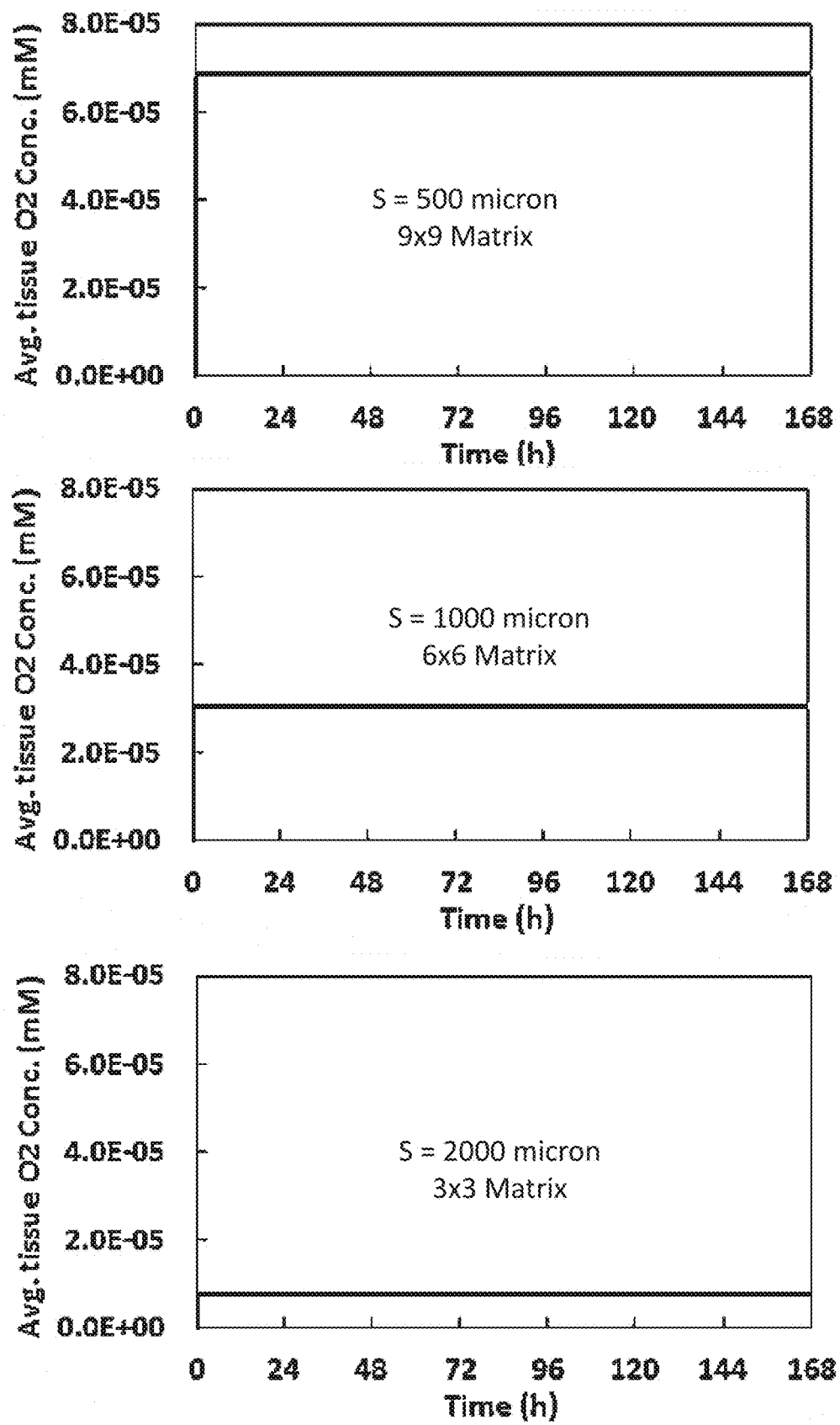
FIG. 14C includes graphs that show the average tissue oxygen concentration (mM) being constant over time for the tissue constructs of FIG. 14A, but with different values depending on the spacing.

FIG. 14A shows oxygen perfusion in a tissue construct having channels in an array, with a channel diameter of 500 microns and a flow rate of "q" is 15.7 µL/sec. The variable in FIGS. 14A-14C is the spacing and thereby number of channels in the construct. FIG. 14B shows the oxygen concentration for the tissue constructs with spacing being "s" is 500 microns with a 9×9 matrix, 1000 microns with a 6×6 matrix, or 2000 microns with a 3×3 matrix. FIG. 14C shows the average tissue oxygen concentration (mM) being constant over time for the tissue constructs of FIG. 14A, but with different values depending on the spacing. As shown, the increased spacing decreases the average tissue oxygen concentration.

Figure 15:
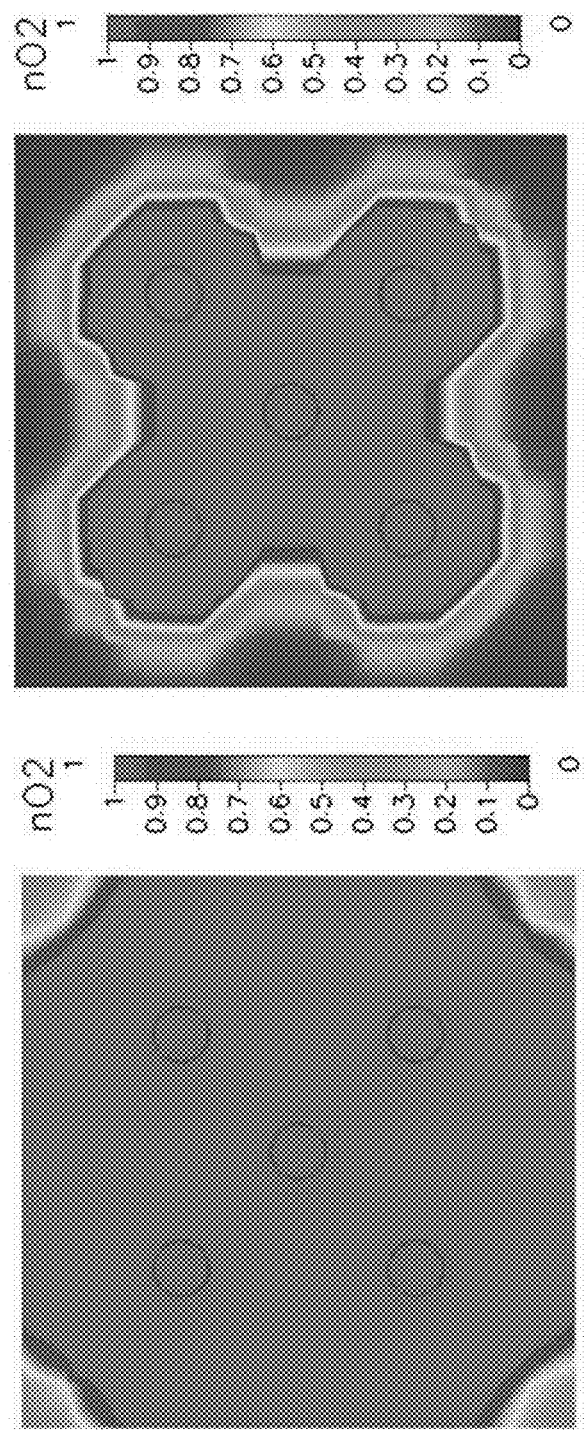
FIG. 15 includes simulation data that shows the oxygen permeation to achieve an oxygen concentration percentage, where the left panel shows the oxygen concentration percent maximum after 5 hours with 500,000 hepatocytes per mL and the right panel shows the oxygen concentration percent maximum after 5 hours with 500,000 cardiomyocytes per mL.
Figure 16:
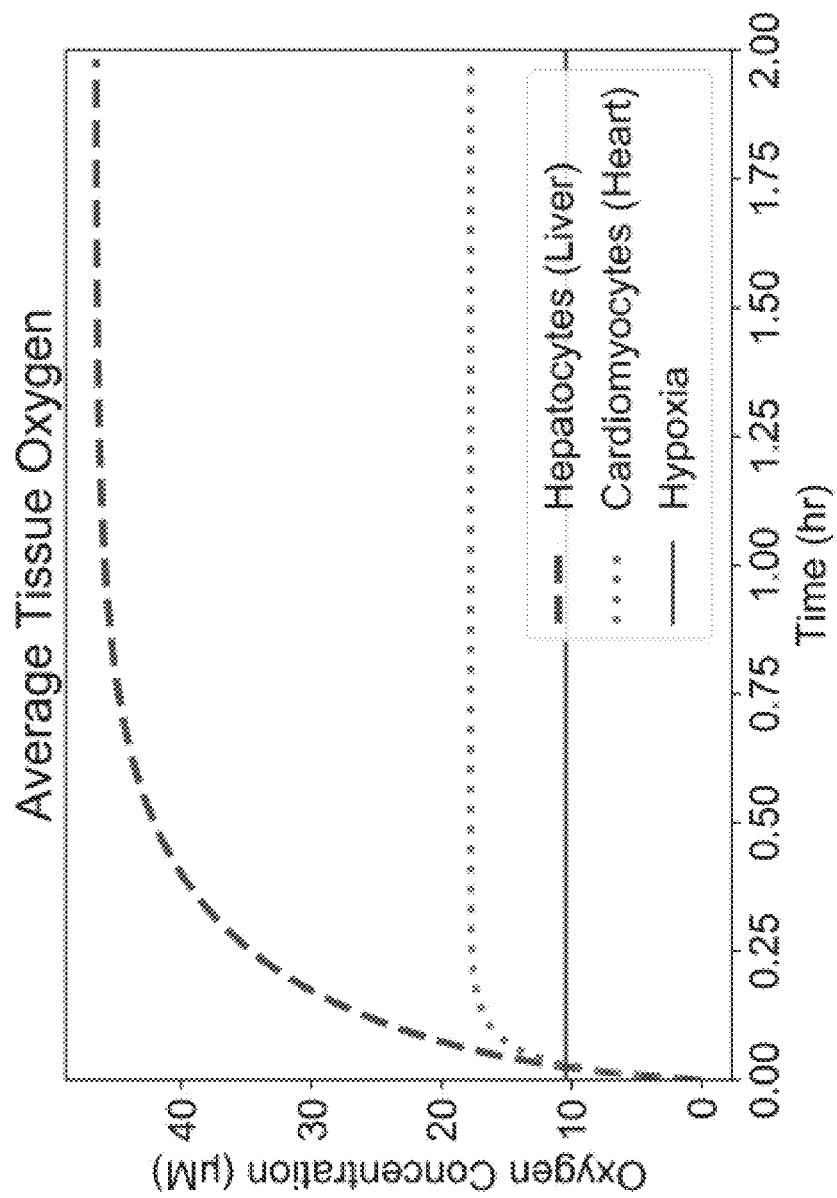
FIG. 16 includes a graph that shows the change in oxygen concentration (micromolar) for the hepatocytes and cardiomyocytes.

FIG. 15 shows the oxygen permeation to achieve an oxygen concentration percentage. The left panel shows the oxygen concentration percent maximum after 5 hours with 500,000 hepatocytes per mL. The right panel shows the oxygen concentration percent maximum after 5 hours with 500,000 cardiomyocytes per mL. Clearly, there is more oxygen concentration in the hepatocytes compared to the cardiomyocytes when at the same concentration and same conditions. Accordingly, it is clear that certain tissues need different oxygenation and nutrients, and thereby need different lumen networks in the tissue construct for better simulation of the certain tissue. FIG. 16 shows the change in oxygen concentration (micromolar) for the hepatocytes and cardiomyocytes. The hypoxia line is also shown. Clearly, the cardiomyocytes are closer to hypoxia, and thereby likely need more lumens to provide the required oxygen and nutrients compared to the hepatocytes. Thus, different organ tissue constructs will have different lumen networks, with different numbers of lumen, different luminal diameters, different shapes, or other modulations. Thus, each organ tissue construct can be tailored with a sufficient lumen network for the specific organ type.

The software CoBi for the multiscale modeling capability in which a 3D mesh is used to represent the tissue block geometry and quasi-3D (Q3D) CoBi "wire" models represent the channels/vascular network as shown in FIGS. 10A, 11A, and 12A. This modeling approach combines a traditional, voxel based 3D meshed model with a 1D mesh for the wire. This approach significantly decreases computation time compared to modeling the entire network as a true 3D model. In addition to the flow parameters described above, homogeneously distributed cells may be incorporated into the network and create a consumption term for oxygen, glucose, and other compounds (e.g. drugs). Oxygen consumption described by Michaelis-Menten kinetics (EQ 6) requires both the maximum reaction rate ($V_{max}$) and the concentration at which half of the maximum reaction rate is achieved ($K_m$). These kinetic constants vary according to the cellular source as demonstrated by the Table 1 for cardiac, lung immune cells, and liver.

Boundary conditions, required to solve the problem, include the inlet oxygen concentration (0.22 mM [R.M.-T.E.P.C. Methods, undefined 2016, Analytic models of oxygen and nutrient diffusion, metabolism dynamics, and architecture optimization in three-dimensional tissue constructs with applications and, Liebertpub.Com. 22 (2016) 221-249. doi.org/10.1089/ten.tec.2015.0375]), channel fluid viscosity ($0.78 \times 10^{-3}$ N s/m$^2$ [C. Wang, H. Lu, M. S.-J. of biomechanics, undefined 2012, A novel in vitro flow system for changing flow direction on endothelial cells, Elsevier. (n.d.)]), density (1.007 g/mL [P. M. Hinderliter, et al., ISDD: A computational model of particle sedimentation, diffusion and target cell dosimetry for in vitro toxicity studies, Part. Fibre Toxicol. 7 (2010)]), hydrogel porosity (50% [S. Pradhan, et al . . . , undefined 2017, PEG-fibrinogen hydrogels for three-dimensional breast cancer cell culture, Wiley Online Libr. 105 (2017) 236-252]), and diffusion coefficients for oxygen in medium ($3.0 \times 10^{-9}$ m$^2$/s [R.M.-T.E.P.C. Methods, undefined 2016, Analytic models of oxygen and nutrient diffusion, metabolism dynamics, and architecture optimization in three-dimensional tissue constructs with applications and, Liebertpub.Com. 22 (2016) 221-249]) and for oxygen in tissue ($3.33 \times 10^{-10}$ m$^2$/s calculated by Mackie Meares). Further, the inlet and outlet were considered to be the only boundaries across which transport occurred.

| Cell/Tissue Type | $V_{max}$ | $K_m$ (µM) |
|---|---|---|
| Cardiac | 1.5 nmol/min/10$^6$ cells | 6.875 |
| Lung Immune Cells | 1.46E-8 mol/cm$^3$/s | 13.4 |
| Liver | 3.42-3.92 pmol/s/10$^6$ cells | 0.0263 |

Figure 18:
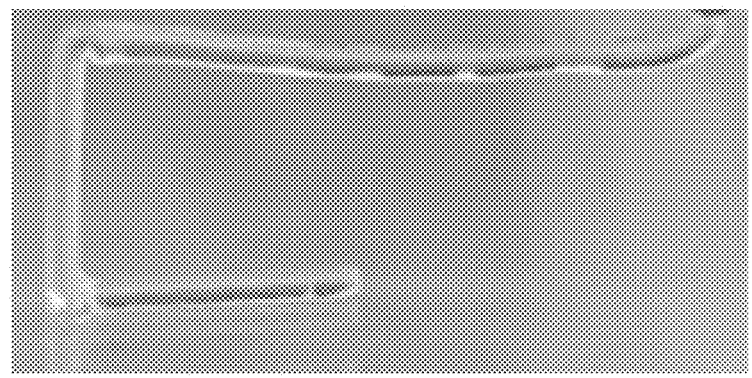
FIG. 18 includes images that show nozzle printed constructs for use in forming the vascular lumen networks in the hydrogels of the tissue constructs.
Figure 18:
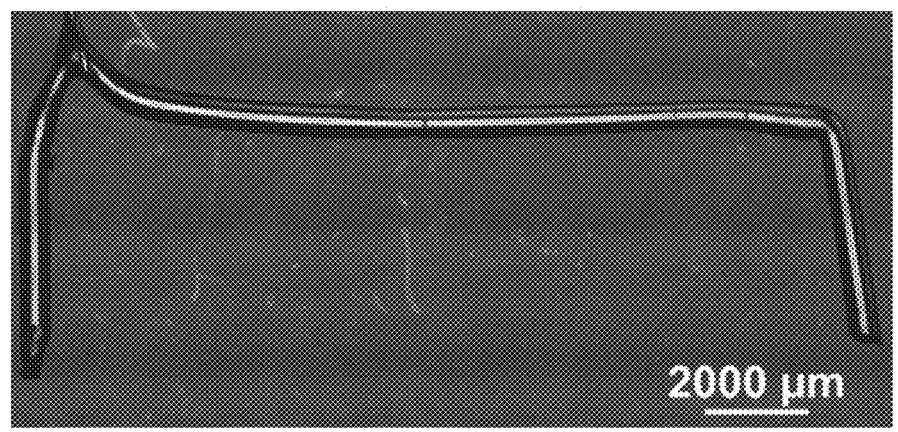
Figure 18:
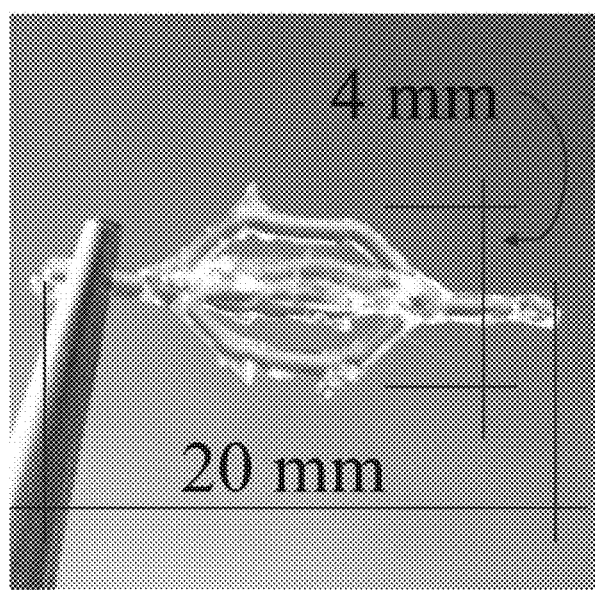

With reference back to FIG. 17, a tubular network can be prepared that is used for the lumen network to simulate the vascular network in the tissue construct. FIG. 18 shows some examples of such tubular networks as formed. The top image shows that the material can be printed to form shapes. The middle image shows that coaxial printing can form an outer shell and an inner core that can be removed to provide a lumen in the shell. The middle image also provides a dimension bar to show the relative size. The bottom image shows a complex shape that can be formed, which can be a sacrificial material for forming a hydrogel around. These preformed structures can then be used in a hydrogel for forming the lumen network that simulates the vasculature in the tissue construct.

Figure 19:
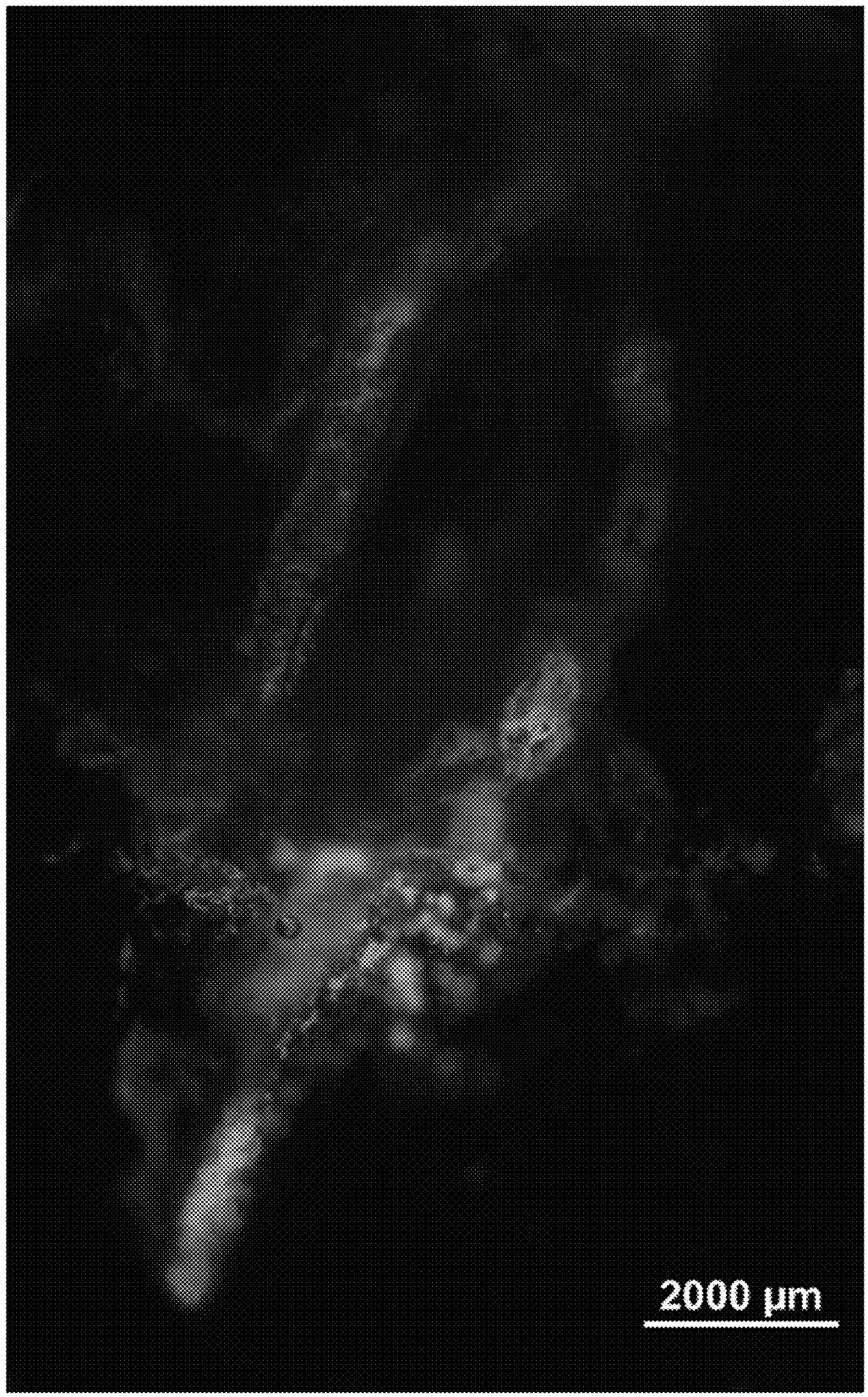
FIG. 19 includes an image of fluorescent beads flowing through a simulated vascular lumen in a hydrogel of a tissue construct, where no leaking is shown, which indicates a fluid tight seal at the interface of the bioreactor tubes and hydrogel luminal vascular networks.

The structure of the bottom image of FIG. 18 was used in forming a hydrogel having a lumen network as described herein. The bioreactor was then prepared to include the hydrogel with the lumen network having the shape as shown in the bottom image of FIG. 18. Fluorescent beads were passed through the lumen network with a flowing liquid, and imaged to provide FIG. 19. FIG. 19 shows the lumen network is functional in the hydrogel. FIG. 19 also shows the fluid tight coupling that can be achieved with constraining the hydrogel around in inlet tubes and outlet tubes. As shown, no fluorescent beads escape the lumen network, which shows the interface of the hydrogel and in/out tubes is fluid tight.

Definitions

A "hydrogel" is a solid highly hydrated polymer network composed mostly of water with a low fraction of either natural or synthetic polymer.

A "hydrogel precursor solution" is a liquid form of a hydrogel which undergoes a phase transition to solid upon some reaction (chemical, physical, light based).

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (μP), a microcontroller (C), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. The program data can include determination data 628 that is obtained by a determination application 622. Application 622 may include a determination application 626 that is arranged to perform the operations as described herein, including those described with respect to methods described herein. The determination application 626 can obtain determination data 628, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, a computer program product can include a non-transient, tangible memory device having computer-executable instructions that when executed by a processor, cause performance of a method that can include: providing a dataset having object data for an object and condition data for a condition; processing the object data of the dataset to obtain latent object data and latent object-condition data with an object encoder; processing the condition data of the dataset to obtain latent condition data and latent condition-object data with a condition encoder; processing the latent object data and the latent object-condition data to obtain generated object data with an object decoder; processing the latent condition data and latent condition-object data to obtain generated condition data with a condition decoder; comparing the latent object-condition data to the latent-condition data to determine a difference; processing the latent object data and latent condition data and one of the latent object-condition data or latent condition-object data with a discriminator to obtain a discriminator value; selecting a selected object from the generated object data based on the generated object data, generated condition data, and the difference between the latent object-condition data and latent condition-object data; and providing the selected object in a report with a recommendation for validation of a physical form of the object. The non-transient, tangible memory device may also have other executable instructions for any of the methods or method steps described herein. Also, the instructions may be instructions to perform a non-computing task, such as synthesis of a molecule and or an experimental protocol for validating the molecule. Other executable instructions may also be provided.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A tissue culture device comprising:
a body defining a tissue culture chamber having a primary chamber cavity, an inlet cavity, and an outlet cavity;
at least one inlet port through the body into the inlet cavity of the tissue culture chamber;
an inlet port member located in each inlet port, each inlet port member including an inlet tube extending into the inlet cavity;
at least one outlet port through the body into the outlet cavity of the tissue culture chamber;
an outlet port member located in each outlet port, each outlet port member including an outlet tube extending into the outlet cavity; and
an optical cover coupled with the body to define a wall of the primary chamber cavity of the tissue culture chamber, wherein the optical cover is optically transmissive.

2. The tissue culture device of claim 1, wherein the body includes an inlet shoulder containing the inlet cavity, an outlet shoulder containing the outlet cavity, each inlet port is through the inlet shoulder, and each outlet port is through the outlet shoulder.

3. The tissue culture device of claim 1, wherein the optical cover is shaped as a lid that is removably couplable with the body.

4. The tissue culture device of claim 3, wherein the lid is threadedly coupled with the body.

5. The tissue culture device of claim 3, wherein the lid includes a viewing recess having a bottom wall being optically transmissive into the tissue culture chamber.

6. The tissue culture device of claim 1, further comprising a hydrogel in the tissue culture chamber, inlet cavity, and outlet cavity, so as to be around the inlet tube and outlet tube.

7. The tissue culture device of claim 6, wherein the inlet cavity is configured to constrain the hydrogel around the inlet tube and the outlet cavity is configured to constrain the hydrogel around the outlet tube.

8. The tissue culture device of claim 7, further comprising a fluid tight seal at an interface of the hydrogel and the inlet tube and a fluid tight seal at an interface of the hydrogel and the outlet tube.

9. The tissue culture device of claim 6, further comprising at least one lumen in the hydrogel fluidly coupling the inlet tube and the outlet tube.

10. A bioreactor comprising:
a body defining a tissue culture chamber;
at least one inlet port through the body into the tissue culture chamber;
an inlet port member located in each inlet port, each inlet port member including an inlet tube extending into the tissue culture chamber;
at least one outlet port through the body into the tissue culture chamber;
an outlet port member located in each outlet port, each outlet port member including an outlet tube extending into the tissue culture chamber;
an optical cover coupled with the body to define a wall of the primary chamber cavity of the tissue culture chamber, wherein the optical cover is optically transmissive; and
a hydrogel in the tissue culture chamber having at least one lumen fluidly coupling the inlet tube to the outlet tube, wherein an inlet interface region of the hydrogel is constrained around the inlet tube and an outlet interface region of the hydrogel is constrained around the outlet tube.

11. The bioreactor of claim 10, wherein the tissue culture chamber has a primary chamber cavity, an inlet cavity, and an outlet cavity, and:
each inlet port is through the body into the inlet cavity of the tissue culture chamber;
each inlet port member includes the inlet tube extending into the inlet cavity;
each outlet port is through the body into the outlet cavity of the tissue culture chamber; and
each outlet port member includes the outlet tube extending into the outlet cavity.

12. The bioreactor of claim 11, wherein the body includes an inlet shoulder containing the inlet cavity, an outlet shoulder containing the outlet cavity, each inlet port is through the inlet shoulder, and each outlet port is through the outlet shoulder.

13. The bioreactor of claim 12, wherein the optical cover is shaped as a lid that is removably couplable with the body, and wherein the lid includes a viewing recess having a bottom wall being optically transmissive into the tissue culture chamber.

14. The bioreactor of claim 10, further comprising a fluid tight seal at an interface of the hydrogel and the inlet tube and a fluid tight seal at an interface of the hydrogel and the outlet tube.

15. The bioreactor of claim 10, further comprising cells in the hydrogel.

16. The bioreactor of claim 10, further comprising vascular endothelial cells on lumen walls of the lumen.

17. The bioreactor of claim 16, further comprising tissue cells in the hydrogel.

18. The bioreactor of claim 15, wherein the cells are stem cells, red blood cells, white blood cells, platelet cells, epithelial cells, nerve cells, muscle cells, cartilage cells, bone cells, connective tissue cells, skin cells, endothelial cells, fat cells, sex cells, organ cells, or combinations thereof.

19. The bioreactor of claim 18, wherein the at least one lumen is configured in diameter and spacing based on an organ, such that oxygen and/or nutrients diffuse from media in the at least one lumen to the cells in the organ in the hydrogel.

20. The bioreactor of claim 10, wherein the at least one lumen includes a sacrificial material therein.

21. A bioreactor system comprising:
the bioreactor of claim 10; and
an imaging system having at least one camera optically coupled with the tissue culture chamber.

22. A bioreactor system comprising:
the bioreactor of claim 10; and
a pressure system fluidly coupled with the inlet tube and/or outlet tube.

23. The bioreactor system of claim 22, further comprising a media system comprising a media for flowing through the at least one lumen.

24. The bioreactor system of claim 23, further comprising a collection system configured for receiving output media from the outlet tube.

25. A bioreactor system comprising:
the tissue culture device of claim 10; and
an analytical system configured to analyze output samples from the outlet tube.

26. A method of manufacturing a bioreactor comprising:
providing the tissue culture device of claim 1;
forming a hydrogel in the tissue culture chamber that has at least one lumen fluidly coupling the inlet tube to the outlet tube of the tissue culture device, wherein an inlet interface region of the hydrogel is constrained around the inlet tube and an outlet interface region of the hydrogel is constrained around the outlet tube.

27. The method of claim 26, further comprising:
forming a sacrificial material in the hydrogel in the shape of the at least one lumen; and
removing the sacrificial material from the hydrogel to result in the at least one lumen being fluidly coupled with the inlet tube and outlet tube.

28. The method of claim 27, further comprising:
printing the sacrificial material on a portion of the hydrogel; and
forming the hydrogel with the sacrificial material therein.

29. The method of claim 26, further comprising:
determining a type of tissue for a tissue construct;
obtaining a design for the at least one lumen in the hydrogel for the tissue construct based on the type of tissue; and
forming the hydrogel to include the design for the at least one lumen in the hydrogel.

30. The method of claim 29, wherein the design includes a diameter of each lumen and spacing between a plurality of the lumen.

* * * * *